(12) United States Patent
Bhat et al.

(10) Patent No.: US 12,711,040 B1
(45) Date of Patent: Aug. 18, 2026

(54) DETECTING MALFUNCTIONING ARTIFICIAL INTELLIGENCE AGENTS

(71) Applicant: Citibank, N.A., New York, NY (US)

(72) Inventors: Ganesh Prasad Bhat, West Orange, NJ (US); James Myers, New York, NY (US); Sofia Rahman, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/347,890

(22) Filed: Oct. 2, 2025

(51) Int. Cl.
*G06F 11/3604* (2025.01)
*G06N 3/042* (2023.01)

(52) U.S. Cl.
CPC ......... *G06F 11/3608* (2013.01); *G06N 3/042* (2023.01)

(58) Field of Classification Search
CPC .. G06F 21/577; G06F 21/57; G06F 2221/033; G06F 2221/034; G06N 20/00; G06N 3/08; G06N 3/045; G06N 3/042
See application file for complete search history.

(56) References Cited

U.S. PATENT DOCUMENTS 11,128,737 B1 * 9/2021 Fox ...................... G06N 3/0499
11,256,590 B1 * 2/2022 Hulick, Jr. ............. G06Q 10/06
12,111,747 B1 * 10/2024 Jain ...................... G06N 3/0455
12,430,308 B1 * 9/2025 Myers ................... G06F 16/215
12,443,894 B1 * 10/2025 Bhat ...................... G06N 20/20
12,481,517 B1 * 11/2025 Zhang ................. G06F 9/45504
12,493,540 B1 * 12/2025 Fedoruk .............. G06F 21/6209
2019/0243739 A1 * 8/2019 Song .................. G06F 11/1402
2021/0211361 A1 * 7/2021 Yuan ....................... G06F 9/485
2021/0357508 A1 * 11/2021 Elovici ............... G06F 11/3612
2022/0138069 A1 * 5/2022 Hulick, Jr. ............ G06F 11/302
702/186
2022/0156614 A1 * 5/2022 Dalli ........................ G06N 5/01
2024/0135382 A1 * 4/2024 Nair ....................... G06N 20/00
2024/0289209 A1 8/2024 Ghalehtaki et al.
2024/0303146 A1 * 9/2024 Shteingart ........... G06F 11/2025
2024/0345926 A1 * 10/2024 Obogbaimhe ...... G06F 11/3414
2025/0013560 A1 * 1/2025 Gandhi ............... G06F 11/3093
2025/0111256 A1 * 4/2025 Rosenoer ................ G06N 7/01
2025/0165296 A1 5/2025 Hwang
2025/0190873 A1 * 6/2025 Kuppa ................... G06N 20/00
2025/0259043 A1 * 8/2025 Crabtree ................ G06N 3/042
2025/0259115 A1 * 8/2025 Jeyashekar .......... G06N 3/0455
2025/0322229 A1 * 10/2025 Tran ......................... G06N 3/08
2025/0322244 A1 * 10/2025 Mysore ................ G06N 3/0895
2025/0348707 A1 * 11/2025 Myers ..................... G06F 8/443
(Continued)

FOREIGN PATENT DOCUMENTS

WO WO-2020169963 A1 * 8/2020 ............ G06F 18/24

*Primary Examiner* — Tae K Kim
(74) *Attorney, Agent, or Firm* — Perkins Coie LLP

(57) ABSTRACT

The present disclosure provides a malfunction interdiction system with monitoring, detection, and response capabilities specifically designed for distributed AI environments. The system may first detect any AI agents that are malfunctioning and then remediate any malfunctions via quarantine and/or AI agent termination. Upon detection of a malfunction, the system may automatically isolate the compromised agent through a quarantine process. The system may alternatively or additionally, initiate graduated deactivation procedures ranging from partial restrictions to full deactivation.

20 Claims, 12 Drawing Sheets

(56) References Cited

U.S. PATENT DOCUMENTS

| | | | | |
|---|---|---|---|---|
| 2025/0356026 | A1* | 11/2025 | Myers | G06F 11/3684 |
| 2025/0358240 | A1* | 11/2025 | Bhat | G06F 8/35 |
| 2025/0378001 | A1* | 12/2025 | Fedoruk | G06F 21/6209 |
| 2025/0378411 | A1* | 12/2025 | Tiwari | G06Q 10/0639 |
| 2025/0383938 | A1 | 12/2025 | Trubin et al. | |
| 2026/0017386 | A1* | 1/2026 | Ohayon | G06F 21/577 |
| 2026/0080304 | A1* | 3/2026 | Turner | G06N 20/00 |
| 2026/0087402 | A1* | 3/2026 | Singh | G06N 20/00 |

* cited by examiner

160
Communication Subsystem 162
Malfunction Detection Subsystem 164
Malfunction Response Subsystem 166
Network 140
130
Agent
150
Agent
170
Agent
100

DETECTING MALFUNCTIONING ARTIFICIAL INTELLIGENCE AGENTS

BACKGROUND

The proliferation of distributed artificial intelligence systems and multi-agent architectures has created new opportunities for collaborative intelligence and decentralized problem-solving across various domains. These systems enable multiple AI agents to work together, sharing computational resources and coordinating their actions to accomplish complex tasks that would be difficult for individual agents to handle alone. However, security and malfunction detection are needed to monitor and manage these collaborations to make sure that these collaborations are executed properly.

SUMMARY

Distributed artificial intelligence (AI) systems may face substantial security challenges from malicious actors who deploy compromised or adversarial agents designed to corrupt system operations, manipulate outcomes, or extract sensitive information. These "poison agents" can infiltrate multi-agent networks and cause significant damage through various attack vectors, including data poisoning, model manipulation, consensus attacks, and resource exhaustion.

Current multi-agent systems often operate with limited visibility into individual agent behaviors and interactions, making it difficult to detect anomalous activities until damage has occurred. Many existing systems rely on basic authentication mechanisms that may be compromised and lack sophisticated reputation tracking or behavioral analysis capabilities. When suspicious agents are identified, most systems provide only binary choices between full access and complete exclusion, limiting the ability to investigate threats while maintaining system safety.

The increasing sophistication of AI-driven attacks, including adversarial machine learning and automated exploit generation, demands new approaches to multi-agent security. Traditional security measures designed for human actors or simple software systems are inadequate against AI-powered threats that can adapt, learn, and evolve their attack strategies in real-time. There exists a need for comprehensive defense mechanisms that can provide real-time monitoring, detection, and response capabilities specifically tailored for distributed AI environments.

The present disclosure provides a malfunction interdiction system that addresses these challenges through comprehensive monitoring, detection, and response capabilities specifically designed for distributed AI environments. The system may first detect any AI agents that are malfunctioning (e.g., "poison agents"). The malfunction interdiction system may receive responses from artificial intelligence agents operating within a distributed network environment. The system may also retrieve agent parameters including communication, resource, and timing data along with corresponding agent profiles for behavioral analysis. The malfunction interdiction system may input these parameters into machine learning models trained to recognize normal behavioral patterns and detect deviations from established agent profiles. The system may employ ensemble anomaly detection models that analyze historical data to identify anomalies in agent responses and behaviors. The malfunction interdiction system may further determine whether an artificial intelligence agent is malfunctioning based on behavioral analysis and anomaly detection results. When a malfunction is detected, the system may automatically redirect requests to alternative functioning agents to maintain system operations and prevent compromised agents from affecting overall system performance.

According to an aspect of the present disclosure, a malfunction interdiction system may be used for detecting malfunctions in artificial intelligence agents is provided. The malfunction interdiction system may collect information from AI agents when they respond to tasks or requests and may use that information to identify malfunctions or other issues with AI agents. The malfunction interdiction system may receive, from a first artificial intelligence agent of a plurality of artificial intelligence agents, a response to a request. Each artificial intelligence agent may be associated with a corresponding computer-executable operation set configured to be autonomously executed by a corresponding artificial intelligence agent on a software application set. For example, the malfunction interdiction system may receive a response from an AI agent that has processed a data analysis request, where the AI agent operates using a specific set of algorithms designed to run automatically on designated software platforms.

The malfunction interdiction system may gather detailed information about how the AI agent behaves and operates. In particular, the malfunction interdiction system may retrieve a plurality of agent parameters associated with the first artificial intelligence agent, an agent profile associated with the first artificial intelligence agent, and a plurality of sets of historical agent parameters. The plurality of agent parameters may include one or more of communication parameters, resource parameters or timing parameters, and the agent profile may include one or more of a communications profile, a resource profile, or a timing profile. For example, the system may collect data showing how frequently the AI agent sends messages, how much memory it uses, and how long it takes to complete tasks, then compare this against the agent's established behavioral patterns.

The malfunction interdiction system may analyze whether the AI agent is behaving according to its normal patterns. In particular, the malfunction interdiction system may input the plurality of agent parameters and the agent profile into a machine learning model (and/or large language model) to obtain a behavior parameter that indicates whether the plurality of agent parameters matches the agent profile. The machine learning model may be trained, using historical communication data, historical resource data, and historical timing data associated with the first artificial intelligence agent, to recognize patterns within the plurality of agent parameters to match with corresponding patterns within the agent profile. For example, the system may use a neural network trained on months or years of the AI agent's past behavior to determine if current communication patterns match the agent's typical messaging frequency and response times.

The malfunction interdiction system may check for unusual or suspicious activities that deviate from normal agent operations. In particular, the malfunction interdiction system may input the plurality of agent parameters into an ensemble anomaly detection model to obtain an anomaly parameter whether the plurality of agent parameters indicate an anomaly with the response. The ensemble anomaly detection model may be trained to identify anomalies between the plurality of agent parameters for a particular agent response and timeseries data associated with the historical agent parameters associated with historical agent responses. For example, the system may use multiple detection algorithms working together to identify if an AI agent suddenly starts consuming excessive computational resources or exhibits communication patterns that differ significantly from its historical behavior.

The malfunction interdiction system may make a determination about whether the AI agent has problems that need to be addressed. In particular, the malfunction interdiction system may determine based on the behavior parameter and the anomaly parameter whether the first artificial intelligence agent is malfunctioning. For example, the system may combine behavioral analysis results with anomaly detection scores to conclude whether an AI agent is compromised or is otherwise malfunctioning.

The malfunction interdiction system may redirect work to healthy AI agents when problems or malfunctions are detected. In particular, based on determining that the first artificial intelligence agent is malfunctioning, the malfunction interdiction system may transmit the request to a second artificial intelligence agent. For example, if the system determines that the first AI agent is behaving suspiciously, it may automatically route the original request to a different, properly functioning AI agent to ensure the task is completed safely.

In some implementations, the malfunction interdiction system may use reputation data to identify malfunctions. The malfunction interdiction system may track how well AI agents have performed in the past to help make decisions about their trustworthiness. In particular, the malfunction interdiction system may retrieve, using a first agent identifier associated with the first artificial intelligence agent, reputation data associated with the first artificial intelligence agent. The reputation data may include response accuracy information for a plurality of responses received from the first artificial intelligence agent. The malfunction interdiction system may then input the reputation data into a reputation machine learning model to obtain a reputation parameter associated with the first artificial intelligence agent. The reputation machine learning model may have been trained to output a corresponding reputation parameter based on degree of accuracy of past responses and recency of the past responses. The reputation parameter may be used to determine whether the first artificial intelligence agent is malfunctioning. For example, the system may maintain a score for each AI agent based on how accurate its past responses have been, giving more weight to recent performance, and use this score as additional evidence when determining if an agent is compromised.

The malfunction interdiction system may ask AI agents to estimate their resource needs before processing tasks and cancel requests that seem excessive. This may include transmitting the request to the first artificial intelligence agent. The request may include a task and a parameter query. The parameter query may request the first artificial intelligence agent to respond with one or more estimates for communication load, resource load, and action sequence load for performing the task. In response to determining that the communication load, the resource load, or the action sequence load meets a threshold, the malfunction interdiction system may transmit a cancel request to the first artificial intelligence agent. For example, the system may ask an AI agent to estimate how much network bandwidth, processing power, and steps it needs to complete a task, and if these estimates are unusually high, the system may cancel the request to prevent potential resource abuse.

In some implementations, the malfunction interdiction system may use multiple specialized detection methods working together to identify different types of problems. In particular, the ensemble anomaly detection model may generate, using an isolation forest model, outlier data that indicates whether one or more outliers are present in the timeseries data associated with the historical agent parameters of the first artificial intelligence agent. The isolation forest model may be trained to detect outliers within datasets. Furthermore, the ensemble anomaly detection model may generate, using an autoencoder model, reconstruction error data. The autoencoder model may be trained to minimize error values for the historical agent parameters of the first artificial intelligence agent.

In some implementations, the ensemble anomaly detection model may generate, using a long-term short-term memory network, temporal anomaly data indicating whether one or more temporal anomalies exist within the timeseries data associated with the historical agent parameters of the first artificial intelligence agent. Furthermore, the ensemble anomaly detection model may generate, using a graph neural net, interaction anomaly data indicating whether one or more anomalies exist in interaction patterns between the first artificial intelligence agent and other entities.

In some implementations, the ensemble anomaly detection model may generate, using a support vector machine model, boundary data indicating whether one or more boundaries exist with the timeseries data associated with the historical agent parameters of the first artificial intelligence agent. The one or more boundaries may indicate one or more anomalies within the timeseries data. Additionally or alternatively, the ensemble anomaly detection model may generate, using a transformer model, attention data indicating whether one or more attention anomalies exist within the historical agent parameters of the first artificial intelligence agent. The one or more attention anomalies may indicate disproportionate focus on a portion of the historical agent parameters of the first artificial intelligence agent. Once the data has been generated, the ensemble anomaly detection model may determine, using the outlier data, the reconstruction error data, the temporal anomaly data, the interaction anomaly data, the boundary data, and the attention data, one or more anomalies associated with the first artificial intelligence agent. For example, the system may simultaneously or sequentially run six different AI detection algorithms, each specialized for different types of problems, such as one that finds unusual data points, another that detects timing irregularities, and another that identifies strange communication patterns, then combines all their findings to make a comprehensive assessment.

In some implementations, the malfunction interdiction system may continuously collect detailed information about AI agent activities to build comprehensive behavioral profiles. In particular, the malfunction interdiction system may periodically receive, from the first artificial intelligence agent, a corresponding set of agent parameters including corresponding communication parameters, corresponding resource parameters, corresponding decision parameters, timing parameters, and corresponding application programming interface parameters for the first artificial intelligence agent. The malfunction interdiction system may then match a first set of agent parameters to processing of the request and generate the plurality of agent parameters based on the first set of agent parameters. For example, the system may regularly collect data about how each AI agent is communicating, using resources, making decisions, and interacting with software interfaces, then match this data to specific requests to understand how the agent behaves during different types of tasks.

In some implementations, the malfunction interdiction system may create detailed profiles of normal AI agent behavior by analyzing historical patterns in communication and resource usage. In particular, the malfunction interdiction system may generate, using historical message frequency data, historical payload size data, and historical response destination data associated with the first artificial intelligence agent, a communication profile for the first artificial intelligence agent. The communication profile may be generated by aggregating the historical message frequency data, the historical payload size data, and the historical response destination data. Furthermore, the malfunction interdiction system may generate, using historical processor usage data, historical memory pattern data, and historical input-output data, the resource profile for the first artificial intelligence agent. The resource profile may be generated by aggregating the historical processor usage data, the historical memory pattern data, and the historical input-output data. For example, the system may analyze weeks of data showing how often an AI agent sends messages, how large those messages typically are, where they are sent, how much processing power the agent normally uses, and how it accesses data, then combine all this information into comprehensive behavioral profiles.

The malfunction interdiction system may create additional behavioral profiles covering decision-making patterns and timing characteristics. In particular, the malfunction interdiction system may generate, for the first artificial intelligence agent using vote data accuracy data and timing data, a decision profile for the first artificial intelligence agent. Furthermore, the malfunction interdiction system may determine, for the first artificial intelligence agent, a plurality of temporal cycles, a plurality of bursts, and a plurality of trends based on historical data generated when processing a plurality of requests. The malfunction interdiction system may then add the plurality of temporal cycles, the plurality of bursts, and the plurality of trends into a temporal profile. Furthermore, the malfunction interdiction system may generate the agent profile by aggregating the communication profile, the resource profile, the decision profile and the temporal profile. For example, the system may analyze how accurately an AI agent votes in group decisions and how long it takes to respond, identify patterns like daily activity cycles or sudden bursts of activity, then combine all these behavioral aspects into a complete profile that represents the agent's normal operating characteristics.

When a malfunction is detected the malfunction interdiction system may attempt to address the malfunction. In some implementations, the malfunction interdiction system may quarantine malfunctioning artificial intelligence agents. In particular, the malfunction interdiction system may identify AI agents that have problems and determine how serious those problems are. In some implementations, the malfunction interdiction system may detect both a malfunction within an artificial intelligence agent and determine a malfunction level associated with that malfunction. The malfunction interdiction system may then determine, based on the malfunction level, whether the artificial intelligence agent should be temporarily isolated from providing responses to requests. When isolation is determined necessary, the malfunction interdiction system may modify one or more network configuration settings associated with the artificial intelligence agent to place it into isolation, which blocks the agent from communicating with network devices while still allowing communication with malfunction monitoring devices.

In some implementations, the malfunction interdiction system may also transmit a request to the isolated artificial intelligence agent to obtain a response to that request. The malfunction interdiction system may retrieve a plurality of execution parameters related to how the artificial intelligence agent executed the request, including packet capture data, application programming interface call data, or execution trace data. The malfunction interdiction system may then execute one or more of code inspection, memory analysis, or pattern matching using these execution parameters to determine whether the malfunction can be corrected and to identify specific correction operations needed to fix the artificial intelligence agent. Furthermore, the malfunction interdiction system may execute the identified correction operations to correct the malfunction and, upon determining that the malfunction has been successfully corrected, remove the artificial intelligence agent from isolation thereby restoring its ability to communicate with network devices.

In some aspects, the malfunction interdiction system may detect, using a plurality of machine learning models, a malfunction within an artificial intelligence agent and a malfunction level associated with the malfunction. For example, the system may use multiple AI detection algorithms to identify that an agent is behaving suspiciously and classify the severity of the problem, such as determining whether it's a minor glitch or a major security threat.

The malfunction interdiction system may then decide whether to temporarily separate problematic AI agents from the main network for safety. In particular, the malfunction interdiction system may determine, based on the malfunction level associated with the artificial intelligence agent whether the artificial intelligence agent is to be temporarily isolated from providing responses to requests. For example, if the system detects that an AI agent is showing signs of compromise, but the threat level is moderate, it may decide to isolate the agent for further investigation rather than immediately terminating it.

The malfunction interdiction system may modify network settings to isolate problematic AI agents while still allowing monitoring. The operation may include, based on determining that the malfunction level indicates that the artificial intelligence agent is to be temporarily isolated, modifying one or more network configuration settings associated with the artificial intelligence agent to place the artificial intelligence agent into isolation resulting in blocking the artificial intelligence agent from communicating with network devices while allowing the artificial intelligence agent to communicate with malfunction monitoring devices. For example, the system may change firewall rules and network access controls so that the suspicious AI agent cannot communicate with other agents or external systems but can still be monitored and tested by security analysis tools.

The malfunction interdiction system may test isolated AI agents by sending them controlled requests to observe their behavior. The process may include transmitting a request to the artificial intelligence agent to obtain a response to the request. For example, the system may send a carefully crafted test request to the isolated AI agent to see how it responds and whether it exhibits any malicious behavior in a controlled environment.

The malfunction interdiction system may collect detailed technical information about how isolated AI agents process requests. The operations may include retrieving a plurality of execution parameters related to execution of the request by the artificial intelligence agent. The plurality of execution parameters may include one or more of packet capture data, application programming interface call data, or execution trace data. For example, the system may record all network traffic generated by the isolated agent, log every software function it calls, and trace the exact sequence of operations it performs while processing the test request.

The malfunction interdiction system may analyze the collected technical data to understand what is wrong with the AI agent and how to fix it. The operations may include executing, using the plurality of execution parameters, one or more of code inspection, memory analysis, or pattern matching to determine whether the malfunction is correctable and to obtain one or more correction operations in relation to the artificial intelligence agent to correct the malfunction. For example, the system may examine the agent's code for malicious modifications, analyze its memory usage for signs of corruption, and compare its behavior patterns against known attack signatures to identify specific problems and determine appropriate fixes.

The malfunction interdiction system may also attempt to repair the AI agent and return it to normal operation if the fixes are successful. The process may include executing the one or more correction operations to correct the malfunction and based on determining that the malfunction has been corrected, removing the artificial intelligence agent from the isolation thereby unblocking the artificial intelligence agent from communicating with the network devices. For example, the system may apply software patches, reset corrupted data, or retrain machine learning models within the agent, then test the agent again to confirm it's working properly before allowing it to rejoin the network.

In some implementations, the malfunction interdiction system may identify specific types of problems and threats when determining malfunction severity. The malfunction interdiction system may, when detecting the malfunction level associated with the malfunction, further determine an anomaly score associated with a plurality of responses generated by the artificial intelligence agent, a malicious pattern associated with the artificial intelligence agent, and detect data exfiltration attempts associated with the artificial intelligence agent. In some implementations, the malfunction interdiction system may detect an attack signature associated with the AI agent. For example, the system may calculate numerical scores indicating how abnormal the agent's responses are, identify patterns that match known attack methods, and detect signs that the agent is attempting to steal or leak sensitive information.

The malfunction interdiction system may verify that isolated AI agents can handle appropriate tasks and compare their responses with known good agents. In particular, prior to transmitting the request to the artificial intelligence agent, the malfunction interdiction system may determine, based on agent capabilities of the artificial intelligence agent, that the artificial intelligence agent is capable of completing the request. Furthermore, the malfunction interdiction system may transmit the request to a second artificial intelligence agent to obtain an additional response to the request and input the response and the additional response into a similarity machine learning model to obtain a degree of similarity between the response and the additional response. Based on determining that the degree of similarity matches a threshold, the malfunction interdiction system may determine, using the degree of similarity, whether to remove the artificial intelligence agent from isolation. For example, the system may first confirm that the isolated agent has the technical capabilities to handle a specific type of request, then send the same request to both the isolated agent and a trusted agent and use AI algorithms to compare how similar their responses are to help decide if the isolated agent is safe to release.

The malfunction interdiction system may continuously test isolated AI agents with multiple tasks to ensure they are consistently behaving properly. In particular, the malfunction interdiction system may periodically identify, based on agent capabilities of the artificial intelligence agent, a plurality of task requests for the artificial intelligence agent. The plurality of task requests may have been sent to one or more other artificial intelligence agents. The one or more other artificial intelligence agents may have sent a plurality of responses to the plurality of task requests. Furthermore, the malfunction interdiction system may transmit the plurality of task requests to the artificial intelligence agent to obtain a second plurality of responses to the plurality of task requests. In particular, the malfunction interdiction system may determine, based on comparing using a similarity machine learning model, whether a similarity metric between corresponding responses within the plurality of responses and the second plurality of responses meets a threshold. Based on determining that the similarity metric between the corresponding responses within the plurality of responses and the second plurality of responses does not meet the threshold, the malfunction interdiction system may generate and transmit an alert to an operator indicating that the artificial intelligence agent is still malfunctioning. For example, the system may regularly send the isolated agent the same types of requests that other agents have successfully handled, compare all the responses using AI similarity analysis, and alert human operators if the isolated agent's responses remain significantly different from the expected answers.

In some implementations, the malfunction interdiction system may apply graduated restrictions to AI agents that have moderate-level problems rather than full isolation. In particular, based on determining that the malfunction level indicates that the artificial intelligence agent is to be limited, the malfunction interdiction system may generate a set of parameters for the artificial intelligence agent including a quota parameter that limits the response of the artificial intelligence agent, a throttled communication parameter that limits a volume of data allowed to be sent by the artificial intelligence agent, a resource limit parameter that limits an amount of computing resources the artificial intelligence agent is allowed to use, and a priority parameter that reduces a priority associated with the artificial intelligence agent. The malfunction interdiction system may then transmit a command to the artificial intelligence agent to implement the set of parameters. For example, if an AI agent shows minor suspicious behavior, the system may restrict it to handling only a few requests per hour, limit how much data it can send in messages, cap its processing power usage, and lower its priority in task assignment queues.

In some implementations, the malfunction interdiction system may use time manipulation techniques to accelerate testing of isolated AI agents. In particular, while the artificial intelligence agent is isolated, the malfunction interdiction system may periodically communicate to the artificial intelligence agent a corresponding inaccurate date and time, thereby generating an accelerated timeline for the artificial intelligence agent. The malfunction interdiction system may then periodically transmit task requests to the artificial intelligence agent. The artificial intelligence agent may respond to the task requests using the future time. This may enable the malfunction interdiction system to determine whether a response pattern changes over time based on the accelerated timeline. Based on determining that the response pattern changes over time based on the accelerated timeline, the malfunction interdiction system may generate and transmit an alert to an operator. For example, the system may tell the isolated agent that days or weeks are passing when only hours have actually elapsed, then observe whether the agent's behavior changes in ways that suggest it has time-based malicious programming, such as a logic bomb set to activate on a specific date.

In some implementations, the malfunction interdiction system may attempt to repair AI agents by retraining their machine learning components. In particular, the malfunction detection system may transmit one or more training datasets to the artificial intelligence agent to retrain one or more machine learning models associated with the artificial intelligence agent. The malfunction interdiction system may then resend one or more tasks to the artificial intelligence agent for testing. Based on a plurality of responses from the artificial intelligence agent, the malfunction interdiction system may determine whether the malfunction has been corrected. For example, the system may send clean training data to help the agent relearn proper behavior patterns, then test the agent with various tasks and evaluate whether its responses indicate that the retraining successfully fixed the underlying problems.

According to another aspect of the present disclosure, a method and system for deactivating malfunctioning artificial intelligence agents is provided. The malfunction interdiction system may address the malfunction by deactivating a particular AI agent. In some implementations, the malfunction interdiction system may detect a malfunction within an artificial intelligence agent and determine a malfunction level associated with the malfunction based on resource utilization, data exfiltration probability, or reputation degradation rate. The malfunction interdiction system may determine whether the artificial intelligence agent should be partially deactivated based on the malfunction level. When partial deactivation is determined, the malfunction interdiction system may disable the application programming interface used to communicate with the artificial intelligence agent, preventing it from receiving requests. The malfunction interdiction system may also block the agent's access to computational resources including network resources, computing resources, or data resources. When full deactivation is determined, the malfunction interdiction system may stop agent processes associated with the artificial intelligence agent, including network processes or computing processes. The malfunction interdiction system may also generate an agent representation that captures the agent's state, including the artificial intelligence state of machine learning models and the resource state representing resources in use by the agent.

In particular, the malfunction interdiction system may identify AI agents with problems and assess the severity based on multiple risk factors. In some implementations, the malfunction interdiction system may detect a malfunction within an artificial intelligence agent and a malfunction level associated with the malfunction based on one or more of: a resource utilization, data exfiltration probability, or reputation degradation rate associated with the artificial intelligence agent. For example, the system may detect that an AI agent is malfunctioning by observing that it's using excessive computing resources, showing signs of attempting to steal data, or experiencing a rapid decline in its performance reputation scores.

The malfunction interdiction system may decide whether to partially shut down problematic AI agents based on the severity of their problems. In particular, the malfunction interdiction system may determine, based on the malfunction level associated with the artificial intelligence agent, whether the artificial intelligence agent is to be partially deactivated. For example, if the system determines that an AI agent has moderate-level problems that don't warrant complete termination, it may choose to partially disable the agent's capabilities while keeping it available for analysis.

The malfunction interdiction system may disable communication interfaces for AI agents that need partial deactivation. Based on determining that the artificial intelligence agent is to be partially deactivated, the malfunction interdiction system may disable, for the artificial intelligence agent, an application programming interface used to communicate with the artificial intelligence agent, rendering the artificial intelligence agent unable to receive requests. For example, the system may shut down the software interfaces that other systems use to send tasks to the problematic AI agent, effectively preventing it from receiving new work assignments while keeping the agent itself running.

The malfunction interdiction system may also block access to various computational resources for partially deactivated AI agents, including blocking access to a plurality of computational resources including one or more of network resources, computing resources, or data resources. For example, the system may prevent the problematic AI agent from accessing the internet, limit its ability to use processing power and memory, and block its access to databases and file systems.

In some implementations, the malfunction interdiction system may completely terminate AI agents that pose serious threats. Based on determining that the artificial intelligence agent is to be fully deactivated, the malfunction interdiction system may stop one or more agent processes associated with the artificial intelligence agent. The one or more agent processes may include one or more of: network processes or computing processes. For example, if the system determines that an AI agent is severely compromised, it may terminate all the software processes that the agent uses to communicate over networks and perform computations.

The malfunction interdiction system may also preserve the state of fully deactivated AI agents for forensic analysis, including generating an agent representation representing an agent state associated with the artificial intelligence agent. The agent representation may include an artificial intelligence state representing one or more states of one or more machine learning models associated with the artificial intelligence agent, and a resource state representing resources in use by the artificial intelligence agent. For example, before completely shutting down a compromised AI agent, the system may create a detailed snapshot that captures the current state of the agent's neural networks, learned parameters, memory contents, and resource allocations for later security analysis.

In some implementations, the malfunction interdiction system may identify specific security threats and attack patterns when assessing malfunction levels, including determining an anomaly score associated with a plurality of responses generated by the artificial intelligence agent or a malicious pattern associated with the artificial intelligence agent, and detecting data exfiltration associated with the artificial intelligence agent and an attack signature. For example, the system may calculate numerical scores indicating how abnormal the agent's recent responses have been, identify behavior patterns that match known cyber-attack methods, and detect evidence that the agent is attempting to steal sensitive information or exhibits signatures of known malware.

The malfunction interdiction system may disable AI agent communication by modifying operating system permissions. Based on determining that the artificial intelligence agent is to be partially deactivated, the malfunction interdiction system may identify one or more operating system processes associated with the artificial intelligence agent, and modifying permissions associated with the one or more operating system processes associated with the artificial intelligence agent to prevent the one or more operating system processes from using required network resources. For example, the system may identify all the software processes that belong to the problematic AI agent and change their operating system permissions so they cannot access network interfaces, effectively cutting off the agent's ability to communicate.

In some implementations, the malfunction interdiction system may perform other actions on malfunctioning agents. For example, the malfunction interdiction system may prevent AI agents from participating in group decision-making processes. The malfunction interdiction system may also block AI agents from accessing specific data sources used for enhanced capabilities and invalidate security credentials for fully deactivated AI agents.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
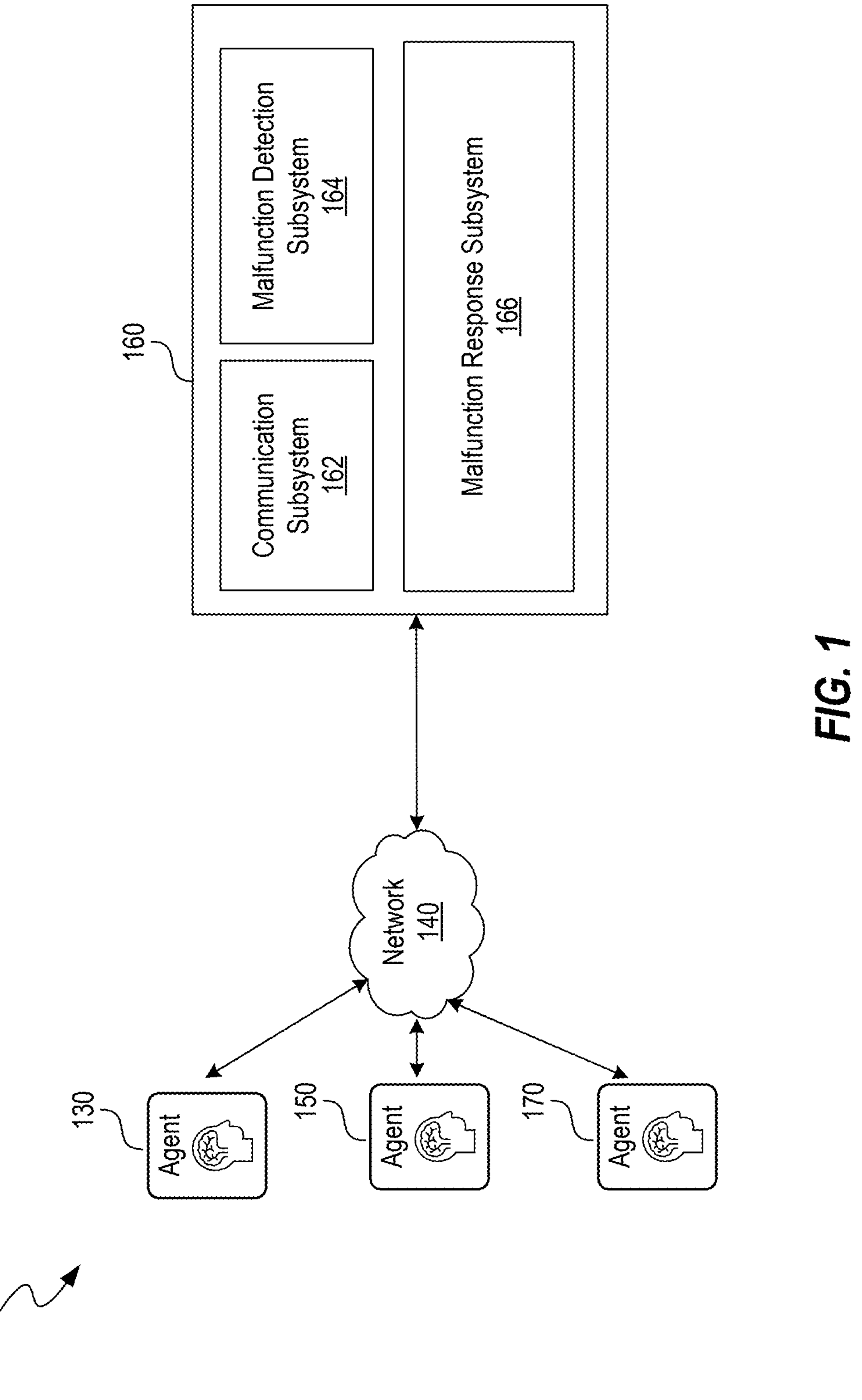
FIG. 1 shows an illustrative system for detecting malfunction in artificial intelligence agents in accordance with one or more embodiments of this disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein. Furthermore, in the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement.

The present disclosure relates to systems and methods for detecting and responding to malfunctioning artificial intelligence agents in distributed computing environments. In distributed AI systems, multiple autonomous agents may operate concurrently and/or sequentially to perform various computational tasks, process data, and make decisions collaboratively. These agents may execute computer-executable operations independently while interacting with other agents through network communications and shared resources. However, such distributed environments may face challenges when individual agents begin to malfunction, exhibit anomalous behavior, or become compromised by malicious actors. In another example, bad actors may insert "poisoned agents" into the environment for various purposes such as exfiltrating data, breaking the system etc.

Malfunctioning agents in distributed systems may pose various risks to overall system integrity and performance. Such agents may consume excessive computational resources, generate incorrect responses to requests, communicate inappropriately with other system components, or exhibit behavioral patterns that deviate from established norms. In some cases, malfunctioning agents may result from software bugs, corrupted training data, adversarial attacks, or gradual degradation of machine learning models over time. The distributed nature of these systems may make it challenging to detect and isolate problematic agents before they impact other components or compromise system-wide operations.

Traditional approaches to system monitoring and security may prove insufficient for addressing the complexities of AI agent malfunctions in distributed environments. Conventional monitoring systems may focus primarily on hardware metrics or basic software performance indicators, without considering the behavioral patterns and decision-making processes that characterize AI agents. Furthermore, the autonomous nature of AI agents may require specialized detection mechanisms that can analyze communication patterns, resource utilization, and response quality in real-time. The dynamic and adaptive characteristics of AI systems may also necessitate monitoring approaches that can evolve and learn from observed behaviors over time.

The disclosed systems and methods may address these challenges by providing comprehensive monitoring, detection, and response capabilities specifically designed for distributed AI environments. The approach may encompass multiple layers of analysis, including behavioral profiling, anomaly detection, reputation management, and graduated response mechanisms. By implementing continuous monitoring of agent activities and employing machine learning models to identify deviations from normal behavior, the system may enable early detection of malfunctioning agents before they cause significant disruption. Additionally, the system may provide flexible response options ranging from temporary isolation and analysis to complete agent termination, depending on the severity and nature of detected malfunctions.

Referring to FIG. 1, environment 100 may provide a distributed computing infrastructure for operating multiple artificial intelligence agents in a coordinated manner. The environment 100 may include a plurality of AI agents, such as AI agent 130, AI agent 150, and AI agent 170, which may operate autonomously within the distributed system. Each artificial intelligence agent of the plurality of artificial intelligence agents may be associated with a corresponding computer-executable operation set configured to be autonomously executed by a corresponding artificial intelligence agent on a software application set. Environment 100 may enable these AI agents to perform various computational tasks, process data requests, and collaborate on complex problem-solving activities while maintaining independent operational capabilities.

A computer-executable operation set may refer to a collection of programmatic instructions, algorithms, and computational procedures that define the specific capabilities and functions that an artificial intelligence agent can perform independently. These operation sets may include machine learning inference routines, data processing algorithms, communication protocols, decision-making logic, and task execution procedures that are tailored to the agent's designated role within the distributed system. The software application set may encompass the runtime environment, frameworks, libraries, and platform components upon which these operations execute, such as containerized environments, virtual machines, cloud computing platforms, or specialized AI inference engines. For example, an AI agent designed for natural language processing may have an operation set that includes text analysis algorithms, language model inference procedures, and response generation functions, all configured to run autonomously on a software stack comprising a Python runtime environment, machine learning frameworks like TensorFlow or PyTorch, and containerization platforms like Docker. The autonomous execution aspect means that once deployed, the agent can perform its designated operations without direct human intervention, making decisions and executing tasks based on its programmed logic and learned behaviors while interacting with the underlying software infrastructure to access computational resources, memory, and network capabilities. An AI agent may be configured to perform a task (e.g., order airline tickets) autonomously or may be configured to provide information (e.g., answers to user's questions). In some implementations, an AI agent can be enabled to perform both functions.

In some implementations, the malfunction interdiction system may receive, from a first artificial intelligence agent of a plurality of artificial intelligence agents, a response to a request. As discussed above, each artificial intelligence agent may be associated with a corresponding computer-executable operation set configured to be autonomously executed by a corresponding artificial intelligence agent on a software application set. The response represents the result of computational processing performed by the first artificial intelligence agent in reaction to a previously submitted request. This response may take various forms depending on the nature of the original request, such as processed data, analytical results, decision outputs, or generated content that reflects the agent's specialized capabilities and training.

Furthermore, each artificial intelligence agent within the plurality operates with a corresponding computer-executable operation set that defines its specific functional capabilities. As described herein, these operation sets may include machine learning inference routines, data processing algorithms, communication protocols, decision-making logic, and task execution procedures that are tailored to each agent's designated role within the distributed system. The autonomous execution aspect means that once deployed, each agent can perform its designated operations without direct human intervention, making decisions and executing tasks based on its programmed logic and learned behaviors.

In some implementations, the software application set encompasses the runtime environment, frameworks, libraries, and platform components upon which these operations execute. This may include containerized environments, virtual machines, cloud computing platforms, or specialized AI inference engines that provide the necessary infrastructure for the AI agents to function. For example, an AI agent designed for natural language processing may operate on a software stack comprising a Python runtime environment, machine learning frameworks like TensorFlow or PyTorch, and containerization platforms like Docker, enabling it to process requests and generate responses autonomously while interacting with the underlying software infrastructure to access computational resources, memory, and network capabilities.

The AI agents within environment 100 may communicate and coordinate their activities through network 140. Network 140 may provide the communication infrastructure that enables data exchange, task distribution, and collaborative decision-making among the distributed AI agents. AI agent 130 may connect to network 140 to send and receive messages, share computational results, and participate in collective operations with other agents in the system. Similarly, AI agent 150 and AI agent 170 may maintain network connections that allow them to interact with other system components and respond to incoming requests. Network 140 may support various communication protocols and data formats to accommodate the diverse operational requirements of different AI agents.

As further shown in FIG. 1, environment 100 may incorporate a malfunction interdiction system 160 that monitors and manages the behavior of AI agents operating within the distributed network. Malfunction interdiction system 160 may implement a zero-trust architecture where no agent may be permanently trusted and trust may be dynamically calculated based on ongoing behavioral analysis, cryptographic proofs, and peer attestations. Malfunction interdiction system 160 may connect to network 140 to observe agent communications, analyze behavioral patterns, and intervene when malfunctioning agents are detected. This system may provide comprehensive oversight capabilities that extend beyond traditional network monitoring to encompass the complex behavioral characteristics of autonomous AI agents.

Malfunction interdiction system 160 may include several specialized subsystems that work together to provide comprehensive agent monitoring and response capabilities. A communication subsystem 162 may handle the collection and analysis of communication data flowing between AI agents through network 140. Communication subsystem 162 may monitor message frequencies, payload sizes, response destinations, and communication patterns to establish baseline behaviors for each agent. A malfunction detection subsystem 164 may analyze the collected data to identify anomalous behaviors, reputation degradation, and potential security threats. Malfunction detection subsystem 164 may employ machine learning models and statistical analysis techniques to distinguish between normal operational variations and genuine malfunctions that require intervention.

With continued reference to FIG. 1, a malfunction response subsystem 166 may execute appropriate countermeasures when malfunction detection subsystem 164 identifies problematic agents. Malfunction response subsystem 166 may implement graduated response mechanisms ranging from enhanced monitoring and rate limiting to complete agent isolation and termination. When AI agent 130 exhibits suspicious behavior, malfunction response subsystem 166 may modify network access permissions, redirect requests to alternative agents such as AI agent 150 or AI agent 170, or place the malfunctioning agent into a quarantine environment for detailed analysis. Malfunction response subsystem 166 may also coordinate with communication subsystem 162 to ensure that response actions do not disrupt legitimate agent operations or compromise overall system performance.

Figure 2:
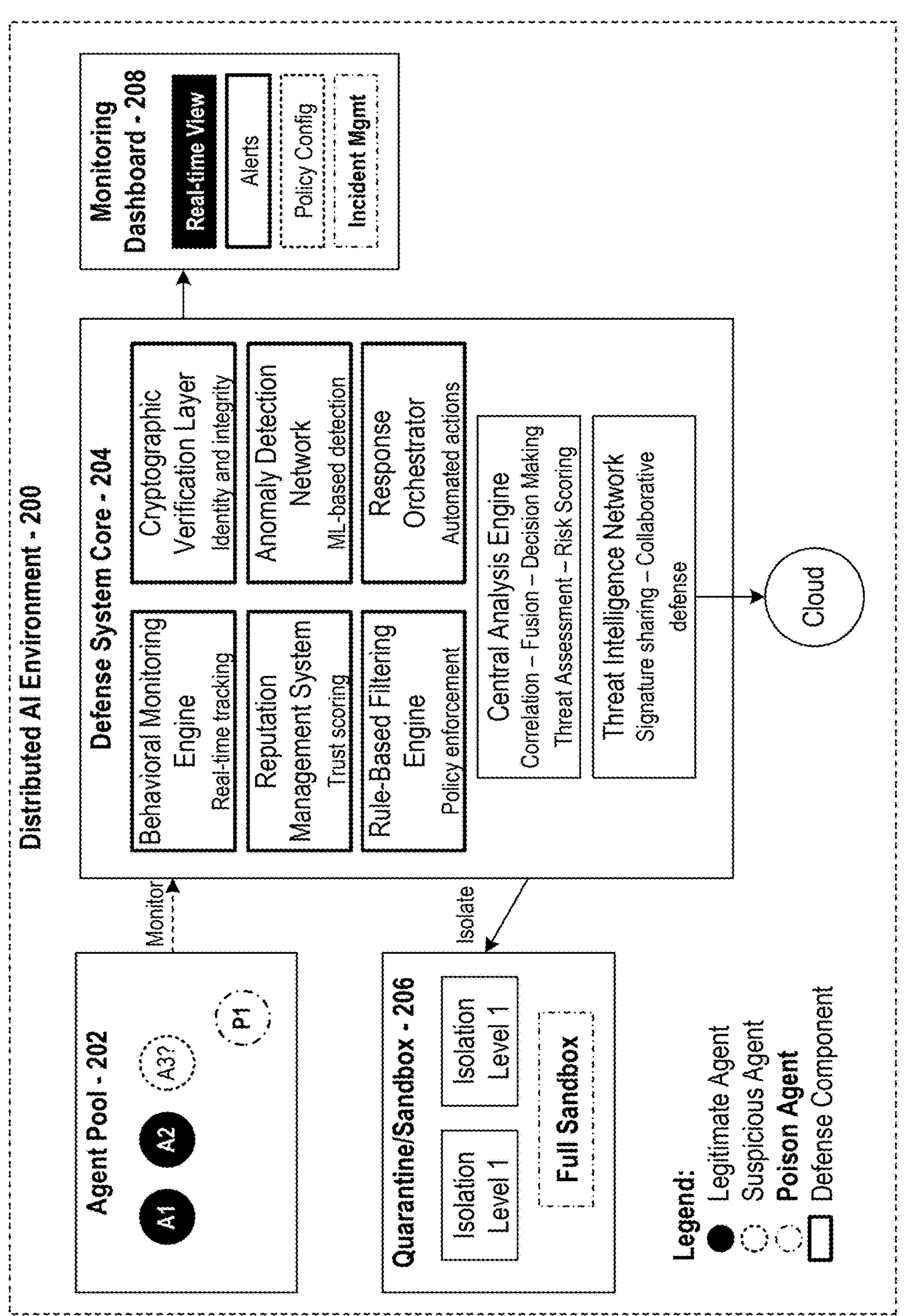
FIG. 2 illustrates a distributed artificial intelligence environment, in accordance with one or more embodiments of this disclosure.

Referring to FIG. 2, a distributed environment 200 may provide an advanced architectural framework for managing and securing multiple artificial intelligence agents within a collaborative computing infrastructure. Distributed environment 200 may implement a comprehensive defense strategy that encompasses multiple interconnected components working in coordination to detect, analyze, and respond to potential threats from malfunctioning or malicious agents. This architectural approach may enable the system to maintain operational continuity while providing robust security measures that can adapt to evolving threat patterns and agent behaviors. Distributed environment 200 may support scalable deployment across various computing platforms, including cloud infrastructures, edge computing environments, and hybrid distributed systems.

An agent pool 202 within distributed environment 200 may serve as the operational domain where multiple artificial intelligence agents execute their designated tasks and interact with system resources. Agent pool 202 may contain both legitimate agents performing authorized functions and potentially suspicious agents that may exhibit anomalous behaviors or malicious characteristics. Agents within agent pool 202 may communicate through standardized protocols, share computational resources, and collaborate on complex problem-solving activities while being continuously monitored for behavioral deviations. Agent pool 202 may implement dynamic agent registration and de-registration processes that allow new agents to join the system while maintaining security controls and behavioral tracking capabilities.

As further shown in FIG. 2, a defense system core 204 may function as the central intelligence and coordination hub for all security operations within distributed environment 200. Defense system core 204 may include multiple specialized components that work together to provide comprehensive threat detection and response capabilities. These components may include a behavioral monitoring engine that tracks agent activities in real-time, a cryptographic verification layer that validates agent identities and message integrity, a reputation management system that maintains historical performance records, and a rule-based filtering engine that enforces security policies. Defense system core 204 may also incorporate an anomaly detection network that employs ensemble machine learning models to identify suspicious patterns, a response orchestrator that coordinates countermeasures, a central analysis engine that processes threat intelligence, and a threat intelligence network that enables secure sharing of threat signatures and attack patterns between deployments using federated learning to improve detection capabilities while preserving privacy.

Defense system core 204 may maintain continuous connectivity with cloud infrastructure components to access additional computational resources, threat intelligence databases, and backup systems when processing complex security analyses. Defense system core 204 may monitor agent pool 202 through multiple data collection mechanisms that capture communication patterns, resource utilization metrics, decision-making behaviors, and temporal activity profiles. When suspicious activities are detected, defense system core 204 may initiate graduated response protocols that range from enhanced monitoring to complete agent isolation, depending on the assessed threat level and potential impact on system operations.

With continued reference to FIG. 2, a quarantine sandbox 206 may provide isolated execution environments where suspicious agents can be contained and analyzed without posing risks to the broader distributed system. Quarantine sandbox 206 may include graduated isolation levels including monitoring mode, rate limiting, sandbox isolation, suspended state, and termination with simulated agent interactions for behavioral analysis. The monitoring mode may allow agents to continue operating while collecting enhanced telemetry data about their activities. Rate limiting may restrict agent communication frequencies and resource consumption to prevent potential damage while maintaining operational capabilities. Sandbox isolation may place agents in completely isolated virtual environments where their behaviors can be observed and analyzed using simulated system components and honeypot data.

Quarantine sandbox 206 may implement suspended state capabilities that freeze agent execution while preserving their current operational state for forensic analysis. Termination procedures within quarantine sandbox 206 may safely remove malicious agents from the system while maintaining detailed logs and evidence for security investigations. Quarantine sandbox 206 may also provide simulated agent interactions that allow security analysts to observe how suspicious agents respond to various stimuli and environmental conditions, enabling comprehensive behavioral profiling and threat assessment.

A monitoring dashboard 208 may provide comprehensive visualization and control capabilities for security personnel managing distributed environment 200. Monitoring dashboard 208 may include a visual monitoring interface with real-time dashboards showing agent interaction graphs with anomaly highlighting, resource usage heat maps, reputation score trends, and alert timelines with severity coding. Monitoring dashboard 208 may receive continuous data streams from defense system core 204 to display current system status, active threats, and ongoing security operations. Interactive controls within monitoring dashboard 208 may enable security administrators to configure policies, initiate response actions, and manage quarantine operations through intuitive graphical interfaces.

Monitoring dashboard 208 may implement real-time view capabilities that provide immediate visibility into agent behaviors, communication patterns, and resource utilization across distributed environment 200. Alert management features within monitoring dashboard 208 may categorize and prioritize security notifications based on threat severity, potential impact, and confidence levels from detection algorithms. Policy configuration options may allow administrators to define custom rules, adjust detection thresholds, and modify response protocols without requiring system downtime. Incident management features may provide comprehensive tracking and documentation capabilities for security events, enabling detailed forensic analysis and compliance reporting.

In some implementations, the malfunction interdiction system may retrieve (1) a plurality of agent parameters associated with the first artificial intelligence agent, (2) an agent profile associated with the first artificial intelligence agent, and (3) a plurality of sets of historical agent parameters. The plurality of agent parameters may include one or more of communication parameters, resource parameters or timing parameters. The agent profile may include one or more of a communications profile, a resource profile, or a timing profile. Thus, three distinct categories of data related to artificial intelligence agent monitoring and analysis may be retrieved. The agent parameters may be multiple measurable characteristics or metrics that describe the current operational state and behavior of a specific AI agent. These parameters may represent quantifiable aspects of the agent's activities that can be monitored and analyzed in real-time, as discussed herein.

The agent profile as discussed herein may be comprehensive behavioral baseline or characterization that represents the expected or normal operational patterns for that specific agent. This profile may serve as a reference standard against which current behaviors can be compared to identify deviations or anomalies. Historical sets of agent parameters may encompass multiple collections of previously recorded parameter data for the agent, creating a temporal dataset that captures the agent's behavioral evolution over time. These historical datasets enable trend analysis and pattern recognition across different operational periods. These parameters may include communication parameters, resource parameters or timing parameters. Communication parameters may include message frequencies, payload sizes, response destinations, and protocol usage patterns. Resource parameters may encompass processor usage data, memory consumption patterns, and input-output operations. Timing parameters may include response latencies, activity cycles, and temporal sequences that characterize operational behaviors. In some implementations, the agent profile may be constructed from aggregated baseline patterns in these same three categories. The communications profile represents normal communication behavior patterns, the resource profile captures typical resource utilization characteristics, and the timing profile reflects standard temporal operational patterns for the specific agent.

Malfunction interdiction system 160 may implement sophisticated profile generation mechanisms that enable comprehensive characterization of agent behavioral patterns across multiple operational dimensions. The system may analyze extensive historical datasets to establish baseline behavioral profiles that serve as reference standards for ongoing agent monitoring and anomaly detection activities. These profile generation processes may provide the foundational behavioral models necessary for accurate malfunction detection and threat assessment within distributed environment 200.

The malfunction interdiction system 160 may generate communication profiles through systematic analysis of historical communication data patterns associated with each artificial intelligence agent operating within environment 100. The system may collect historical message frequency data that captures the typical rates at which agents transmit messages during normal operational periods. This data may encompass various communication patterns including periodic status updates, request-response cycles, and collaborative messaging activities that characterize normal agent interactions. The system may also gather historical payload size data that represents the typical data volumes transmitted by agents during different types of operational activities. The payload size analysis may include examination of message content sizes, data transfer volumes, and communication overhead patterns that reflect normal agent communication behaviors.

Malfunction interdiction system 160 may further collect historical response destination data that documents the typical communication targets and routing patterns employed by agents during normal operations. This destination analysis may include identification of frequently contacted agents, preferred communication pathways, and standard protocol usage patterns that characterize legitimate agent interactions. The system may aggregate the historical message frequency data, the historical payload size data, and the historical response destination data through statistical analysis techniques that combine multiple data dimensions into comprehensive behavioral representations. The aggregation process may employ temporal windowing mechanisms that account for operational cycles, weighted averaging techniques that emphasize recent behavioral patterns, and normalization procedures that standardize measurements across different operational contexts.

Malfunction interdiction system 160 may also generate resource profiles through detailed analysis of computational resource utilization patterns exhibited by artificial intelligence agents during normal operational periods. The system may collect historical processor usage data that captures typical computational load patterns, processing intensity variations, and CPU utilization characteristics associated with different types of agent activities. This processor analysis may include examination of peak usage periods, idle time patterns, and computational efficiency metrics that reflect normal agent processing behaviors. The system may also gather historical memory pattern data that documents typical memory allocation behaviors, data structure usage patterns, and memory management characteristics exhibited during normal operations.

In some implementations, malfunction interdiction system 160 may collect historical input-output data that represents typical data access patterns, file system interactions, and network communication behaviors associated with normal agent operations. The input-output analysis may include examination of data retrieval frequencies, storage access patterns, and communication bandwidth utilization that characterize legitimate agent activities. The system may aggregate the historical processor usage data, the historical memory pattern data, and the historical input-output data through comprehensive statistical analysis that combines multiple resource utilization dimensions into unified behavioral profiles. The aggregation process may employ correlation analysis techniques that identify relationships between different resource usage patterns, trend analysis methods that capture temporal variations in resource consumption, and baseline establishment procedures that define normal operational ranges for each resource category.

Alternatively or additionally, malfunction interdiction system 160 may generate decision profiles through comprehensive analysis of collaborative decision-making behaviors exhibited by artificial intelligence agents during group activities and consensus-building processes. The system may collect vote data accuracy data that captures the precision and reliability of decisions made by each agent when participating in collective problem-solving scenarios. This vote accuracy analysis may include examination of how frequently an agent's decisions align with optimal outcomes, the consistency of decision-making patterns across different problem domains, and the reliability of the agent's contributions to group consensus activities. The system may also gather timing data that documents the temporal characteristics of decision-making processes, including response latencies for decision requests, deliberation periods before vote submission, and consistency of timing patterns across different decision scenarios.

The decision profile generation process may analyze historical patterns of agent participation in collaborative activities, including frequency of participation in group decisions, quality of contributions to consensus-building processes, and behavioral consistency during different types of decision-making scenarios. The system may evaluate decision accuracy metrics by comparing agent choices against verified optimal outcomes or expert assessments. The timing analysis may examine patterns in decision response times, identifying normal ranges for deliberation periods and detecting deviations that may indicate compromised decision-making capabilities. The system may aggregate the vote data accuracy data and timing data through statistical modeling techniques that combine decision quality metrics with temporal behavioral patterns to create comprehensive decision-making profiles.

Furthermore, malfunction interdiction system 160 may determine temporal profiles by analyzing cyclical patterns, burst activities, and trending behaviors exhibited by artificial intelligence agents across extended operational periods. The system may identify a plurality of temporal cycles that represent recurring patterns in agent activities, such as daily operational rhythms, weekly activity variations, or periodic maintenance cycles that characterize normal agent behaviors. These temporal cycles may include analysis of communication frequency variations throughout different time periods, resource utilization patterns that follow predictable schedules, and decision-making activities that exhibit cyclical characteristics. The system may also detect a plurality of bursts that represent sudden increases in activity levels or communication patterns that occur during specific operational scenarios.

The burst analysis may examine patterns of intensive activity periods, including communication spikes during collaborative projects, resource consumption increases during complex computational tasks, and decision-making bursts during time-sensitive scenarios. The system may identify a plurality of trends that capture gradual changes in agent behaviors over extended time periods, including evolving communication patterns, shifting resource utilization characteristics, and developing decision-making preferences. The trend analysis may employ time-series analysis techniques that identify long-term behavioral evolution patterns, seasonal variations in agent activities, and gradual shifts in operational characteristics. The system may add the plurality of temporal cycles, the plurality of bursts, and the plurality of trends into a temporal profile that provides comprehensive characterization of agent behavioral patterns across multiple time scales.

The temporal profile generation process may employ advanced time-series analysis techniques including Fourier transforms for cycle detection, wavelet analysis for burst identification, and regression modeling for trend characterization. The system may analyze historical operational data spanning multiple months or years to establish robust temporal baselines that account for seasonal variations, operational changes, and natural behavioral evolution. The temporal profiling may include correlation analysis between different temporal patterns to identify relationships between cyclical behaviors, burst activities, and long-term trends that characterize individual agent operational signatures.

Malfunction interdiction system 160 may then generate comprehensive agent profiles by aggregating the communication profile, the resource profile, the decision profile, and the temporal profile through sophisticated data fusion techniques that combine multiple behavioral dimensions into unified agent characterizations. The aggregation process may employ weighted combination methods that assign appropriate importance levels to different profile components based on their relevance to specific operational contexts and threat detection scenarios. The system may implement correlation analysis techniques that identify relationships between different profile dimensions, enabling detection of behavioral patterns that span multiple operational aspects.

The agent profile aggregation may include normalization procedures that standardize measurements across different profile categories, ensuring that communication patterns, resource utilization behaviors, decision-making characteristics, and temporal patterns contribute appropriately to the overall behavioral characterization. The system may employ dimensionality reduction techniques such as principal component analysis to identify the most significant behavioral features while maintaining comprehensive coverage of agent operational characteristics. The aggregated agent profile may serve as a comprehensive behavioral baseline that enables accurate detection of deviations, anomalies, and potential security threats through comparison with real-time operational parameters.

The profile aggregation process may implement adaptive weighting mechanisms that adjust the relative importance of different profile components based on operational context, threat intelligence, and historical detection accuracy. The system may maintain version control for agent profiles, enabling tracking of behavioral evolution over time and supporting forensic analysis of behavioral changes that may indicate developing security threats or operational degradation.

Figure 3:
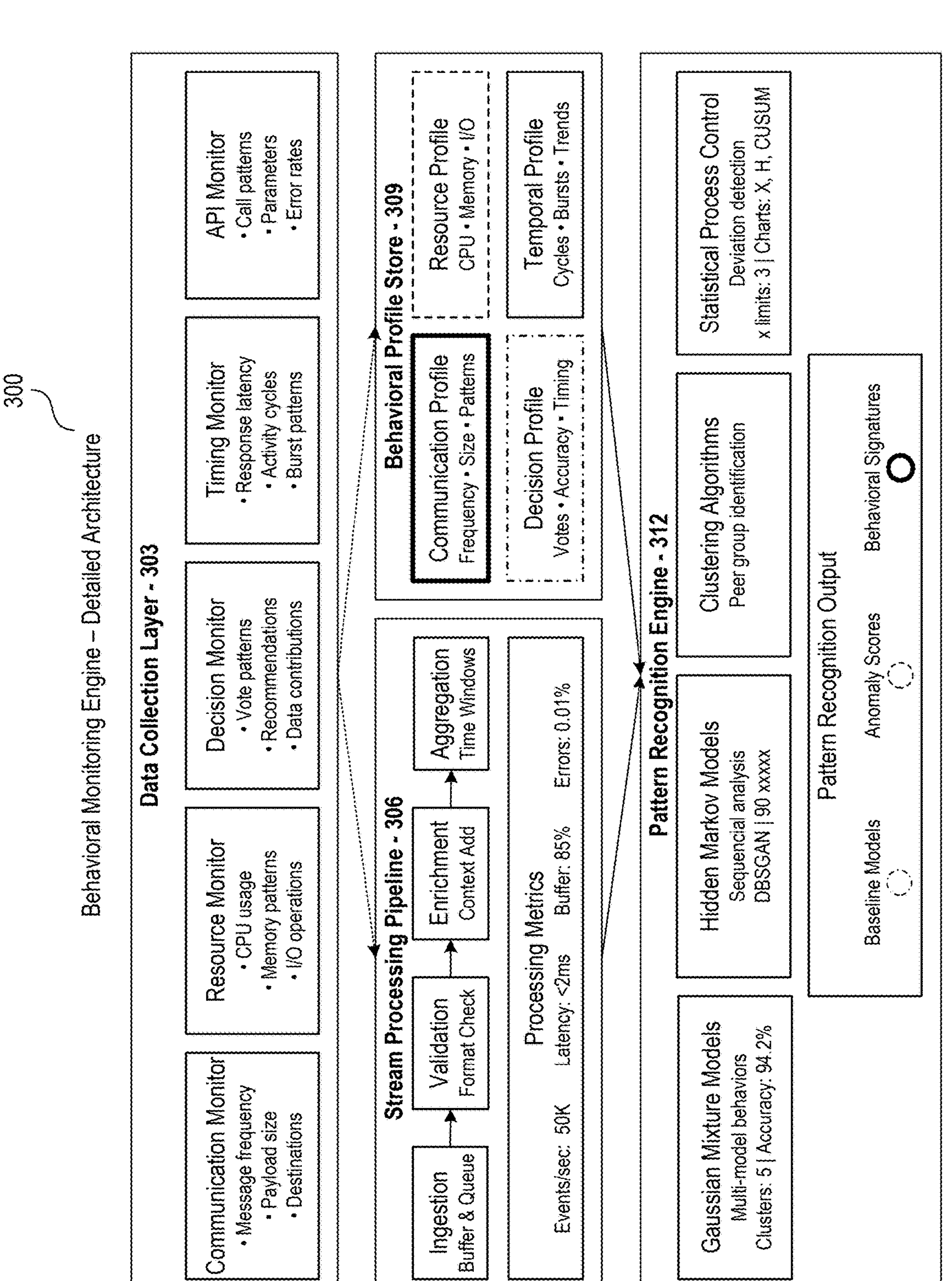
FIG. 3 illustrates a behavioral monitoring engine, in accordance with one or more embodiments of this disclosure.

Referring to FIG. 3, a behavioral monitoring system 300 may provide comprehensive real-time surveillance and analysis capabilities for tracking the activities and behavioral patterns of artificial intelligence agents operating within distributed environment 200. Behavioral monitoring system 300 may implement a zero-trust architecture where no agent may be permanently trusted and trust may be dynamically calculated based on ongoing behavioral analysis, cryptographic proofs, and peer attestations. This architectural approach may ensure that all agents undergo continuous evaluation regardless of their historical performance or established reputation within the system. Behavioral monitoring system 300 may operate as a foundational component of malfunction detection subsystem 164, providing the data collection and analysis infrastructure necessary for identifying anomalous behaviors and potential security threats. The system may maintain persistent monitoring capabilities that capture detailed behavioral information across multiple dimensions of agent activity, enabling comprehensive profiling and pattern recognition for each agent in agent pool 202.

A data collection layer 303 within behavioral monitoring system 300 may implement lightweight instrumentation across all agent interaction points including communication channels, resource utilization, decision contributions, and timing patterns with multi-dimensional profiling capabilities. Data collection layer 303 may monitor communication parameters by capturing message frequencies, payload sizes, response destinations, and protocol usage patterns for each agent interaction. Resource parameters may be collected through continuous monitoring of processor usage data, memory pattern data, and input-output data that reflect how agents consume computational resources during task execution. Timing parameters may be gathered by measuring response latencies, activity cycles, burst patterns, and temporal sequences that characterize agent operational behaviors. Data collection layer 303 may also track decision parameters by recording vote accuracy data, timing data for decision-making processes, and participation patterns in collective decision-making activities. Application programming interface parameters may be monitored to capture application programming interface (API) call frequencies, endpoint usage patterns, and data access behaviors that provide insights into agent operational characteristics.

As further shown in FIG. 3, a stream processing pipeline 306 may handle the continuous ingestion, validation, enrichment, and aggregation of behavioral data collected from agents throughout distributed environment 200. Stream processing pipeline 306 may process incoming data streams in real-time, applying validation rules to ensure data integrity and filtering out corrupt or incomplete measurements. The pipeline may enrich collected data by correlating agent parameters with contextual information such as system load conditions, network status, and concurrent agent activities. Aggregation processes within stream processing pipeline 306 may compute statistical summaries, moving averages, and trend indicators that provide meaningful insights into agent behavioral patterns over time. Stream processing pipeline 306 may maintain processing metrics including events per second, latency measurements, buffer usage statistics, and error rates to ensure optimal performance and data quality. The pipeline may also implement data partitioning and load balancing mechanisms that enable scalable processing of high-volume behavioral data streams from multiple agents operating simultaneously.

A behavioral profile store 309 may maintain comprehensive historical records and behavioral profiles for each agent operating within the system. Behavioral profile store 309 may generate communication profiles using historical message frequency data, historical payload size data, and historical response destination data associated with each artificial intelligence agent. The communication profile may be generated by aggregating the historical message frequency data, the historical payload size data, and the historical response destination data to create comprehensive communication behavior baselines. Resource profiles may be generated using historical processor usage data, historical memory pattern data, and historical input-output data, such that the resource profile may be generated by aggregating the historical processor usage data, the historical memory pattern data, and the historical input-output data. Decision profiles may be generated for each artificial intelligence agent using vote data accuracy data and timing data that capture decision-making behaviors and participation patterns in collaborative activities. Temporal profiles may be created by determining the plurality of temporal cycles, a plurality of bursts, and a plurality of trends based on historical data generated when processing a plurality of requests, with the plurality of temporal cycles, the plurality of bursts, and the plurality of trends being added into the temporal profile.

With continued reference to FIG. 3, behavioral profile store 309 may generate comprehensive agent profiles by aggregating the communication profile, the resource profile, the decision profile, the temporal profile for each agent or any combination thereof. The agent profile may include one or more of a communications profile, a resource profile, or a timing profile that collectively characterize the expected behavioral patterns for each agent. Behavioral profile store 309 may periodically receive, from each artificial intelligence agent, a corresponding set of agent parameters including corresponding communication parameters, corresponding resource parameters, corresponding decision parameters, timing parameters, and/or corresponding application programming interface parameters. The system may match a first set of agent parameters to processing of specific requests and generate a plurality of agent parameters based on the first set of agent parameters. Behavioral profile store 309 may maintain historical agent parameters as time-series data that enables trend analysis and behavioral evolution tracking over extended operational periods.

Pattern recognition engine 312 may employ advanced analytical techniques to identify behavioral patterns and detect deviations from established norms within the collected agent data. Pattern recognition engine 312 may employ Gaussian mixture models for multi-modal behavior patterns, Hidden Markov Models for sequential behavior analysis, clustering algorithms for peer group identification, and/or statistical process control for deviation detection. The Gaussian mixture models may analyze multi-dimensional behavioral data to identify distinct operational modes and behavioral clusters that characterize normal agent operations. Hidden Markov Models may process sequential behavioral data to identify temporal patterns and state transitions that indicate normal or anomalous agent behaviors. Clustering algorithms may group agents with similar behavioral characteristics to establish peer groups and identify outliers that deviate from expected behavioral norms. Statistical process control techniques may monitor behavioral metrics over time to detect gradual shifts or sudden changes that may indicate developing malfunctions or security threats. Pattern recognition engine 312 may produce baseline models, anomaly scores, and behavioral signatures that provide quantitative assessments of agent behavioral characteristics and deviations from expected patterns.

The malfunction detection system may input the plurality of agent parameters and the agent profile into a machine learning model or multiple machine learning models (e.g., within the behavioral engine) to obtain a behavior parameter that indicates whether the plurality of agent parameters matches the agent profile. Each machine learning model may be trained, using historical communication data, historical resource data, and historical timing data associated with the first artificial intelligence agent, to recognize patterns within the plurality of agent parameters to match with corresponding patterns within the agent profile. Machine learning models may employ various architectures including neural networks, decision trees, or ensemble methods to perform this pattern matching analysis.

The training process for these machine learning models may involve extensive analysis of the agent's historical behavioral data to establish baseline patterns that represent normal operational characteristics. For example, the historical communication data may include message frequencies, payload sizes, and response destinations that characterize typical communication behaviors. The historical resource data may encompass processor usage patterns, memory consumption trends, and input-output operation frequencies that define normal resource utilization. The historical timing data may capture response latencies, activity cycles, and temporal sequences that represent standard operational timing patterns for the specific agent.

The behavior parameter generated by the machine learning model may provide a quantitative assessment of how closely the current agent parameters align with the established agent profile. This parameter may be expressed as a similarity score, confidence level, or probability value that indicates the degree of match between observed and expected behaviors. When the behavior parameter indicates a significant deviation from the agent profile, this may suggest potential malfunctioning, compromise, or anomalous activity that requires further investigation through additional detection mechanisms such as the ensemble anomaly detection model.

In some implementations, the malfunction interdiction system 160 may implement sophisticated parameter collection and correlation mechanisms that enable continuous monitoring and analysis of agent behaviors across multiple operational contexts. The system may establish persistent data collection channels with each artificial intelligence agent operating within environment 100, creating ongoing communication pathways that facilitate regular parameter transmission without disrupting normal agent operations.

The system may periodically receive comprehensive sets of agent parameters from each artificial intelligence agent, including corresponding communication parameters that capture message transmission patterns, response routing behaviors, and protocol utilization characteristics. The corresponding resource parameters may encompass memory allocation patterns, computational load distributions, and input-output operation frequencies that reflect how each agent utilizes available system resources during different operational phases. The corresponding decision parameters may include voting behaviors, consensus participation patterns, and collaborative decision-making contributions that characterize how agents interact within collective problem-solving scenarios. The timing parameters may capture response latencies, processing durations, and temporal sequences that define the agent's operational rhythm and performance characteristics. The corresponding application programming interface parameters may include API call frequencies, endpoint access patterns, and data retrieval behaviors that provide insights into how agents interact with external services and data sources.

The malfunction interdiction system 160 may maintain comprehensive interaction tracking capabilities that monitor and analyze agent-to-agent communications throughout distributed environment 200. The system may record detailed interaction logs that capture the identity of contacted agents, the nature of collaborative activities, and the temporal patterns of inter-agent communications during task execution. These interaction records may include metadata about communication protocols used, data exchanged between agents, and the operational context surrounding each interaction. The system may correlate these interaction patterns with agent reputation scores and behavioral profiles to identify potential security risks or performance degradation indicators that may emerge from problematic agent associations.

The system may implement reputation-based interaction analysis that evaluates the trustworthiness and operational history of agents that interact with monitored agents during collaborative activities. When an artificial intelligence agent communicates with other agents in agent pool 202, the system may cross-reference the contacted agents against reputation databases that maintain historical performance metrics, accuracy ratings, and security incident records. The system may flag interactions with agents that have been previously identified as sources of inaccurate responses, compromised operational capabilities, or associations with malicious actors. This reputation correlation process may enable early detection of potential contamination risks when agents interact with compromised or unreliable counterparts within the distributed network.

Behavioral monitoring system 300 may analyze interaction patterns to identify cascading malfunction scenarios where compromised agents may influence or corrupt other agents through collaborative activities. The system may track communication frequencies, data sharing patterns, and collaborative decision-making processes to detect anomalous interaction behaviors that deviate from established operational norms. When an agent exhibits unusual communication patterns with known malfunctioning agents, the system may calculate elevated risk scores that indicate potential secondary contamination or coordinated malicious activities. The interaction analysis may encompass temporal correlation mechanisms that identify clusters of malfunctioning agents that have recently communicated, suggesting possible propagation of security threats or operational degradation through agent networks.

The system may implement forensic reconstruction capabilities that enable detailed analysis of agent interaction histories to support security investigations and threat assessment procedures. Defense system core 204 may maintain comprehensive audit trails that document all inter-agent communications, including message content analysis, timing correlations, and behavioral changes that occur following specific interactions. The forensic analysis may identify interaction sequences that precede malfunction detection, enabling the system to trace potential attack vectors or contamination pathways through the agent network. This historical reconstruction capability may support incident response procedures by providing detailed evidence of how security threats or operational problems may have propagated between agents through collaborative activities.

Graph neural network 410 within anomaly detection network 400 may process interaction data to identify unusual communication structures and collaboration patterns that may indicate coordinated malicious activities or systematic operational degradation. The system may construct dynamic interaction graphs that represent communication relationships between agents over time, enabling detection of anomalous network structures that deviate from normal collaborative patterns. The graph analysis may identify agents that serve as communication hubs for suspicious activities, agents that exhibit unusual isolation from normal collaborative networks, or agents that participate in communication patterns consistent with coordinated attacks. The interaction graph analysis may provide quantitative assessments of network-level security risks and enable targeted intervention strategies that address both individual agent malfunctions and broader network-level security threats.

The system may implement temporal correlation mechanisms that enable precise matching of parameter sets to specific operational activities. When a particular request enters the system for processing, malfunction interdiction system 160 may monitor the associated agent's behavioral characteristics during the execution period. The system may capture a first set of agent parameters that corresponds directly to the agent's operational state while processing that specific request. This temporal alignment may ensure that the collected parameters accurately reflect the agent's behavior in the context of the particular computational task being performed.

The system may generate the plurality of agent parameters by processing and consolidating the first set of agent parameters that were captured during request execution. This generation process may involve data normalization procedures that standardize parameter formats across different measurement contexts. The system may apply statistical aggregation techniques to combine related parameter measurements into coherent behavioral indicators. Temporal windowing mechanisms may be employed to ensure that the generated parameter set represents a comprehensive view of the agent's behavior during the relevant operational period.

The correlation process may enable the system to establish direct relationships between specific requests and the behavioral patterns exhibited by agents during request processing. This matching capability may facilitate detailed analysis of how individual agents respond to different types of computational challenges. The system may maintain correlation databases that link parameter sets to request characteristics, enabling pattern recognition algorithms to identify behavioral variations across different operational scenarios. The temporal precision of this matching process may support forensic analysis capabilities that can reconstruct agent behaviors during specific operational incidents or security events.

Figure 4:
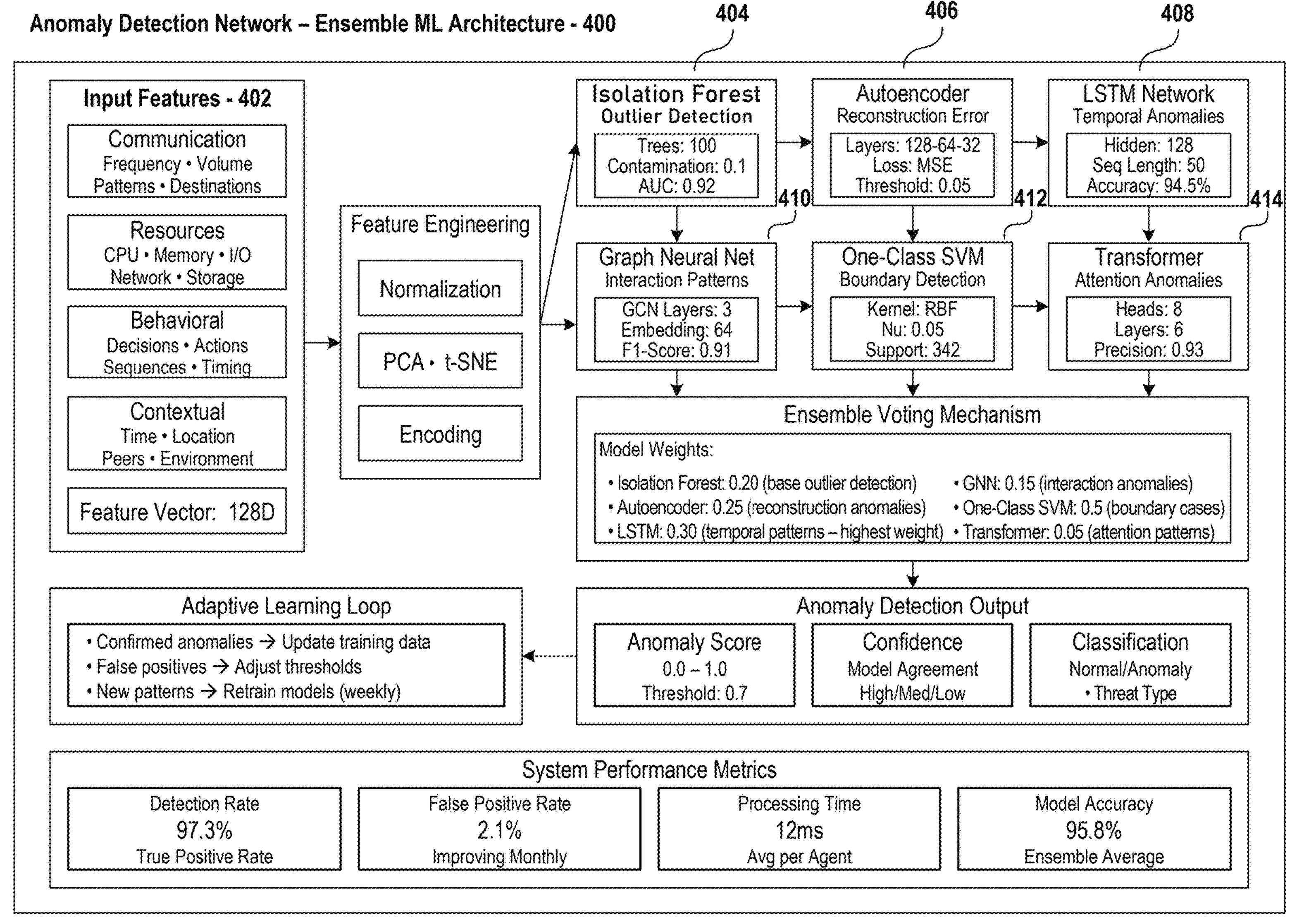
FIG. 4 illustrates an anomaly detection network in accordance with one or more embodiments of this disclosure.

The malfunction interdiction system may use an anomaly detection network to identify malfunctioning AI agents. Referring to FIG. 4, an anomaly detection network 400 may provide sophisticated ensemble machine learning capabilities for identifying suspicious behaviors and potential threats among artificial intelligence agents operating within distributed environment 200. Anomaly detection network 400 may function as a component of malfunction detection subsystem 164, implementing multiple parallel or sequential detection algorithms that analyze agent behavioral data from different analytical perspectives to achieve comprehensive threat identification. The ensemble approach may enable anomaly detection network 400 to detect subtle anomalies that might be missed by individual detection methods while reducing false positive rates through consensus-based decision making. Anomaly detection network 400 may process behavioral data collected by behavioral monitoring system 300 and stored in behavioral profile store 309, applying advanced machine learning techniques to identify deviations from established behavioral patterns. The network may operate continuously in real-time, analyzing incoming agent parameter streams and generating anomaly assessments that inform response decisions within malfunction response subsystem 166.

An input feature module 402 within anomaly detection network 400 may process and prepare behavioral data for analysis by the ensemble of machine learning models. Input feature module 402 may receive communication patterns, resource utilization metrics, behavioral data, and contextual information from data collection layer 303 and stream processing pipeline 306. The module may implement feature engineering capabilities including normalization procedures that standardize data ranges across different parameter types, dimensionality reduction techniques such as Principal Component Analysis (PCA) and t-distributed Stochastic Neighbor Embedding (t-SNE), and encoding mechanisms that convert categorical behavioral attributes into numerical representations suitable for machine learning analysis. Input feature module 402 may also perform data validation and quality checks to ensure that incoming behavioral parameters meet the requirements for accurate anomaly detection processing. The processed features may be distributed to multiple detection modules operating in parallel within anomaly detection network 400.

As further shown in FIG. 4, an isolation forest module 404 may implement outlier detection capabilities specifically designed to identify agents exhibiting unusual behavioral patterns compared to the broader agent population. Isolation forest module 404 may generate, using an isolation forest model, outlier data that indicates whether one or more outliers are present in the timeseries data associated with the historical agent parameters of artificial intelligence agents. The isolation forest model may be trained to detect outliers within datasets by constructing random decision trees that isolate individual data points based on their feature characteristics. Isolation forest module 404 may operate with configurable parameters, for example, including one hundred trees for robust outlier detection and a contamination factor of 0.1 that assumes approximately 10% of agents may exhibit anomalous behaviors. The module may analyze multi-dimensional behavioral feature spaces to identify agents whose parameter combinations deviate significantly from normal operational patterns, generating outlier scores that quantify the degree of behavioral deviation for each monitored agent.

An autoencoder module 406 may provide reconstruction-based anomaly detection by learning compressed representations of normal agent behaviors and identifying deviations through reconstruction error analysis. Autoencoder module 406 may generate, using an autoencoder model, reconstruction error data that quantifies how well the model can recreate observed behavioral patterns. The autoencoder model may be trained to minimize error values for the historical agent parameters of artificial intelligence agents by learning efficient compressed representations of normal behavioral patterns during training phases. Autoencoder module 406 may implement multiple layers including encoder networks that compress behavioral data into lower-dimensional latent representations and decoder networks that reconstruct the original behavioral parameters from the compressed representations. The module may calculate Mean Squared Error (MSE) loss between original and reconstructed behavioral parameters, with higher reconstruction errors indicating potential anomalies that deviate from learned normal patterns.

With continued reference to FIG. 4, a Long Short-Term Memory (LSTM) module 408 may analyze temporal sequences in agent behavioral data to identify anomalous patterns that develop over time. LSTM module 408 may generate, using a long term short term memory network, temporal anomaly data indicating whether one or more temporal anomalies exist within the timeseries data associated with the historical agent parameters of artificial intelligence agents. The LSTM network may process sequential behavioral data through hidden layers that maintain memory of previous behavioral states while analyzing current agent activities. LSTM module 408 may implement sequence processing capabilities that can identify gradual behavioral changes, sudden behavioral shifts, and temporal patterns that deviate from established agent operational cycles. The module may analyze timeseries data including communication frequencies over time, resource usage patterns across different operational periods, and/or decision-making behaviors that evolve during extended agent operations.

A graph neural network 410 may analyze interaction patterns and communication relationships between agents to identify anomalous social behaviors and communication structures. Graph neural network 410 may generate, using a graph neural net, interaction anomaly data indicating whether one or more anomalies exist in interaction patterns between artificial intelligence agents and other entities within distributed environment 200. The graph neural network may utilize specialized GNN layers that process graph-structured data representing agent communication networks, collaboration patterns, and resource sharing relationships. Graph neural network 410 may implement embedding techniques that create vector representations of agents based on their position and behavior within the communication graph structure. The module may identify agents that exhibit unusual communication patterns, form unexpected connections with other agents, or participate in communication structures that deviate from normal collaborative behaviors observed in agent pool 202.

A support vector machine 412 may implement boundary-based anomaly detection by learning decision boundaries that separate normal and anomalous agent behaviors in high-dimensional feature spaces. Support vector machine 412 may generate, using a support vector machine model, boundary data indicating whether one or more boundaries exist with the timeseries data associated with the historical agent parameters of artificial intelligence agents. The one or more boundaries may indicate one or more anomalies within the timeseries data by defining regions of normal behavioral parameter combinations and identifying agents whose behaviors fall outside these established boundaries. Support vector machine 412 may utilize Radial Basis Function (RBF) kernels that enable the detection of complex non-linear boundaries in behavioral feature spaces. The module may be trained on historical behavioral data from behavioral profile store 309 to learn optimal decision boundaries that distinguish between normal operational variations and genuine behavioral anomalies that may indicate malfunctioning or compromised agents.

As further shown in FIG. 4, a transformer module 414 may provide attention-based anomaly detection capabilities that identify unusual focus patterns and behavioral emphasis within agent operational data. Transformer module 414 may generate, using a transformer model, attention data indicating whether one or more attention anomalies exist within the historical agent parameters of artificial intelligence agents. The one or more attention anomalies may indicate disproportionate focus on a portion of the historical agent parameters, such as excessive attention to specific communication channels, unusual emphasis on particular resource types, or abnormal concentration on certain decision-making aspects. Transformer module 414 may implement multiple attention heads and layers that analyze different aspects of agent behavioral data simultaneously. The module may process behavioral sequences to identify agents that exhibit attention patterns significantly different from normal operational behaviors, potentially indicating compromised decision-making processes or malicious behavioral modifications.

Anomaly detection network 400 may implement ensemble voting mechanisms that combine outputs from isolation forest module 404, autoencoder module 406, LSTM module 408, graph neural network 410, support vector machine 412, and transformer module 414 to generate comprehensive anomaly assessments. The ensemble approach may determine, using the outlier data, the reconstruction error data, the temporal anomaly data, the interaction anomaly data, the boundary data, and the attention data, that one or more anomalies may be associated with artificial intelligence agents operating within distributed environment 200. Each detection module may contribute weighted votes based on their confidence scores, historical accuracy for specific threat types, environmental context, and recent false positive rates. Anomaly detection network 400 may output anomaly scores, confidence levels, and classifications that provide quantitative assessments of agent behavioral deviations and potential security threats.

Anomaly detection network 400 may include adaptive learning capabilities with online learning updates, federated learning incorporation, adversarial training for robustness, and concept drift detection for evolving normal behaviors. Online learning updates may enable the ensemble models to continuously adapt to new behavioral patterns and emerging threat types without requiring complete retraining cycles. Federated learning incorporation may allow anomaly detection network 400 to benefit from threat intelligence and behavioral insights gathered from other distributed deployments while preserving privacy and data confidentiality. Adversarial training may improve the robustness of detection models against evasion attempts by malicious agents that may try to disguise their anomalous behaviors. Concept drift detection may monitor changes in normal behavioral patterns over time, automatically adjusting detection thresholds and model parameters to maintain accuracy as agent behaviors evolve within distributed environment 200. The adaptive learning loop may process confirmed anomalies and false positives to continuously refine detection capabilities and reduce both missed threats and unnecessary alerts.

In some implementations, the malfunction interdiction system may input the plurality of agent parameters into an ensemble anomaly detection model to obtain an anomaly parameter indicating whether the plurality of agent parameters indicate an anomaly with the response. As discussed above, the ensemble anomaly detection model may be trained to identify anomalies between the plurality of agent parameters and timeseries data associated with the historical agent parameters. The ensemble anomaly detection model may include multiple machine learning models as described above.

Accordingly, the malfunction interdiction system may initiate the anomaly detection process by inputting the plurality of agent parameters into the ensemble anomaly detection model, which serves as a comprehensive analytical framework designed to identify behavioral deviations and potential security threats. The agent parameters, which may include communication parameters, resource parameters, and timing parameters collected from the first artificial intelligence agent, may be processed through multiple parallel detection pathways within the ensemble model. Input feature module 402 may prepare and standardize these parameters through normalization procedures, dimensionality reduction techniques, and encoding mechanisms to ensure compatibility with the various machine learning algorithms operating within the ensemble. The processed parameters may then be distributed simultaneously to multiple specialized detection modules that analyze different aspects of agent behavior from complementary analytical perspectives.

As discussed above, the ensemble anomaly detection model may employ multiple specialized machine learning algorithms operating in parallel to analyze the input parameters against established behavioral baselines. Isolation forest module 404 may construct random decision trees to identify outliers in multi-dimensional behavioral feature spaces, while autoencoder module 406 may calculate reconstruction errors by comparing observed behaviors against learned compressed representations of normal operational patterns. LSTM module 408 may process temporal sequences to detect anomalous patterns that develop over time, and graph neural network 410 may analyze interaction patterns and communication relationships between agents. Support vector machine 412 may implement boundary-based detection using RBF kernels to identify behaviors that fall outside established normal operational regions, while transformer module 414 may provide attention-based analysis to identify unusual focus patterns within agent operational data.

The ensemble model may compare the current agent parameters against timeseries data associated with historical agent parameters to identify deviations from established behavioral norms and operational patterns. Each detection module within the ensemble may generate specific anomaly indicators, including outlier data from the isolation forest, reconstruction error data from the autoencoder, temporal anomaly data from the LSTM network, interaction anomaly data from the graph neural network, boundary data from the support vector machine, and attention data from the transformer model. The ensemble voting mechanism may combine these multiple detection outputs using weighted contributions based on confidence scores, historical accuracy for specific threat types, environmental context, and recent false positive rates to generate a comprehensive assessment of behavioral anomalies.

The ensemble anomaly detection model may output an anomaly parameter that quantifies whether the plurality of agent parameters indicate an anomaly with the response received from the first artificial intelligence agent. This anomaly parameter may be expressed as a numerical score, probability value, or classification that indicates the degree of deviation from normal behavioral patterns observed in the historical agent parameters. The anomaly parameter may incorporate confidence levels and threat classifications that provide quantitative assessments of potential security risks and behavioral deviations. The malfunction interdiction system may utilize this anomaly parameter in conjunction with the behavior parameter obtained from the machine learning model to make comprehensive determinations about whether the first artificial intelligence agent is malfunctioning and requires intervention through request redirection or other response mechanisms.

The malfunction interdiction system may implement comprehensive cryptographic verification capabilities that enable secure authentication and validation of artificial intelligence agent identities and communications within distributed environment 200. The cryptographic verification layer may provide foundational security mechanisms that ensure only authorized agents can participate in system operations while maintaining the integrity of all inter-agent communications and data exchanges. This verification infrastructure may operate continuously to validate agent credentials, authenticate message origins, and detect potential impersonation attempts or communication tampering that could indicate compromised or malicious agents. The cryptographic verification layer may implement public key infrastructure (PKI) and zero-knowledge proofs to verify agent identities and validate the integrity of agent contributions without exposing sensitive information about agent internal operations or proprietary algorithms.

The system may extract cryptographic signatures from responses received from artificial intelligence agents to verify the authenticity and integrity of agent communications. When malfunction interdiction system 160 receives a response from the first artificial intelligence agent, the system may extract a cryptographic signature from the response that has been generated using a private key associated with the first artificial intelligence agent. The cryptographic signature may serve as a digital fingerprint that uniquely identifies the originating agent and provides mathematical proof that the response content has not been altered during transmission. The signature extraction process may involve parsing response headers, analyzing embedded signature data, and validating signature formatting to ensure compatibility with the established cryptographic protocols used throughout distributed environment 200. The extracted signature may then undergo verification procedures that confirm the response originated from the claimed agent and has maintained integrity throughout the communication process.

The cryptographic verification process may retrieve public keys associated with artificial intelligence agents to enable signature validation and identity confirmation. The system may retrieve a public key associated with the first artificial intelligence agent from a centralized key management infrastructure or distributed key registry that maintains current cryptographic credentials for all authorized agents. The public key retrieval process may involve querying secure key databases using agent identifiers, validating key authenticity through certificate chains, and ensuring that retrieved keys correspond to currently authorized agents within the system. The public key infrastructure may implement hierarchical certificate authorities that provide trusted validation of agent identities while supporting key rotation and revocation procedures that maintain security even when individual agent credentials become compromised. The retrieved public key may enable mathematical verification of digital signatures without requiring access to the agent's private cryptographic materials.

The system may determine whether cryptographic signatures are valid by performing mathematical verification procedures using the retrieved public keys. Malfunction interdiction system 160 may determine, using the public key associated with the first artificial intelligence agent, whether the cryptographic signature is valid through cryptographic algorithms that mathematically verify the relationship between the signature, the response content, and the public key. The validation process may employ established cryptographic standards such as RSA, Elliptic Curve Digital Signature Algorithm (ECDSA), or other digital signature schemes that provide strong mathematical guarantees of authenticity and integrity. The signature verification may include timestamp validation to prevent replay attacks, hash verification to ensure content integrity, and certificate chain validation to confirm the signing key's authenticity. When signature validation fails, this may indicate potential security threats including message tampering, agent impersonation, or compromised cryptographic credentials that require immediate response actions.

The malfunction interdiction system may implement automated response mechanisms when cryptographic verification failures are detected during agent communication validation. Based on determining that the cryptographic signature is invalid, the system may remove the response and transmit the request to the second artificial intelligence agent to ensure continued system operation while maintaining security protocols. The response removal process may involve quarantining the invalid response for forensic analysis, logging the security violation for audit purposes, and updating threat intelligence databases with information about the potential security incident. The request redirection mechanism may select alternative agents based on capability matching, current availability, and reputation scores to ensure that computational tasks continue to be processed despite the security incident. The system may also initiate additional security measures such as enhanced monitoring of the agent that produced the invalid signature, temporary isolation procedures, or complete agent suspension depending on the severity and context of the cryptographic verification failure.

In some implementations, malfunction interdiction system 160 may use a reputation management system to identify malfunctions. The reputation management system may provide comprehensive tracking and assessment of artificial intelligence agent performance and trustworthiness over extended operational periods. The system may retrieve reputation data associated with artificial intelligence agents using agent identifiers that enable correlation of performance metrics across multiple operational contexts and time periods. The system may retrieve, using a first agent identifier associated with the first artificial intelligence agent, reputation data associated with the first artificial intelligence agent that encompasses historical performance records, peer evaluations, and outcome accuracy measurements. The reputation data may include response accuracy information for a plurality of responses received from the first artificial intelligence agent, providing quantitative assessments of how frequently the agent produces correct, useful, and appropriate responses to various types of requests. The reputation tracking may encompass multiple performance dimensions including technical accuracy, response timeliness, resource efficiency, and collaborative effectiveness that collectively characterize the agent's overall contribution to system operations.

The reputation management system may employ machine learning models specifically trained to analyze historical performance data and generate quantitative reputation assessments for individual agents. The system may input the reputation data into a reputation machine learning model to obtain a reputation parameter associated with the first artificial intelligence agent that provides a numerical assessment of the agent's current trustworthiness and expected performance reliability. The reputation machine learning model may be trained to output a corresponding reputation parameter based on degree of accuracy of past responses and recency of the past responses, implementing temporal weighting mechanisms that emphasize recent performance while maintaining awareness of long-term behavioral patterns. The reputation parameter may be used to determine whether the first artificial intelligence agent is malfunctioning by comparing current reputation scores against established thresholds and identifying agents whose performance has degraded significantly from historical baselines.

The reputation machine learning model may implement sophisticated temporal analysis capabilities that account for the evolving nature of agent performance and the varying relevance of historical data over time. The model may employ exponential decay functions that gradually reduce the influence of older performance data while maintaining sensitivity to recent behavioral changes that may indicate developing malfunctions or security compromises. The training process for the reputation machine learning model may analyze extensive historical datasets that include response accuracy measurements, timing performance data, resource utilization efficiency metrics, and peer evaluation scores from collaborative activities. The model may learn to identify patterns in reputation degradation that precede agent malfunctions, enabling proactive detection of agents that may require intervention before they cause significant system disruption.

The malfunction interdiction system may implement proactive resource assessment capabilities that enable agents to provide estimates of computational requirements before task execution begins. The system may transmit requests to artificial intelligence agents that include both task specifications and parameter queries designed to elicit resource planning information. The system may transmit the request to the first artificial intelligence agent, such that the request may include a task and a parameter query that requests specific information about anticipated resource consumption. The parameter query may request the first artificial intelligence agent to respond with one or more estimates for communication load, resource load, and action sequence load for performing the task, enabling the system to assess whether the agent has realistic expectations about the computational requirements for successful task completion.

The resource estimation process may provide early indicators of agent malfunctioning when agents provide unrealistic or inconsistent estimates about their computational requirements. Agents that consistently underestimate resource requirements may indicate degraded performance assessment capabilities, while agents that dramatically overestimate requirements may suggest inefficient processing algorithms or compromised operational logic. The system may analyze these resource estimates in conjunction with historical performance data to identify agents whose resource planning capabilities have deteriorated from established baselines. In response to determining that the communication load, the resource load, or the action sequence load meets a threshold that indicates excessive or unrealistic resource requirements, the system may transmit a cancel request to the first artificial intelligence agent to prevent potential system resource exhaustion or performance degradation.

The rule-based filtering engine may provide a flexible policy framework that enables administrators to define specific behavioral constraints and operational boundaries for artificial intelligence agents operating within the distributed system. The rule-based filtering engine may allow administrators to define specific rules for agent behavior based on communication patterns, resource usage, decision patterns, or custom metrics that reflect organizational security policies and operational requirements. The filtering engine may implement rule categories that address different aspects of agent behavior, including communication rules that restrict message frequencies and destinations, resource rules that limit computational consumption, behavioral rules that constrain specific action sequences, and context rules that apply environment-specific restrictions. The rule-based system may operate in conjunction with the cryptographic verification layer and reputation management system to provide comprehensive behavioral governance that combines automated threat detection with policy-based operational controls.

Figure 5:
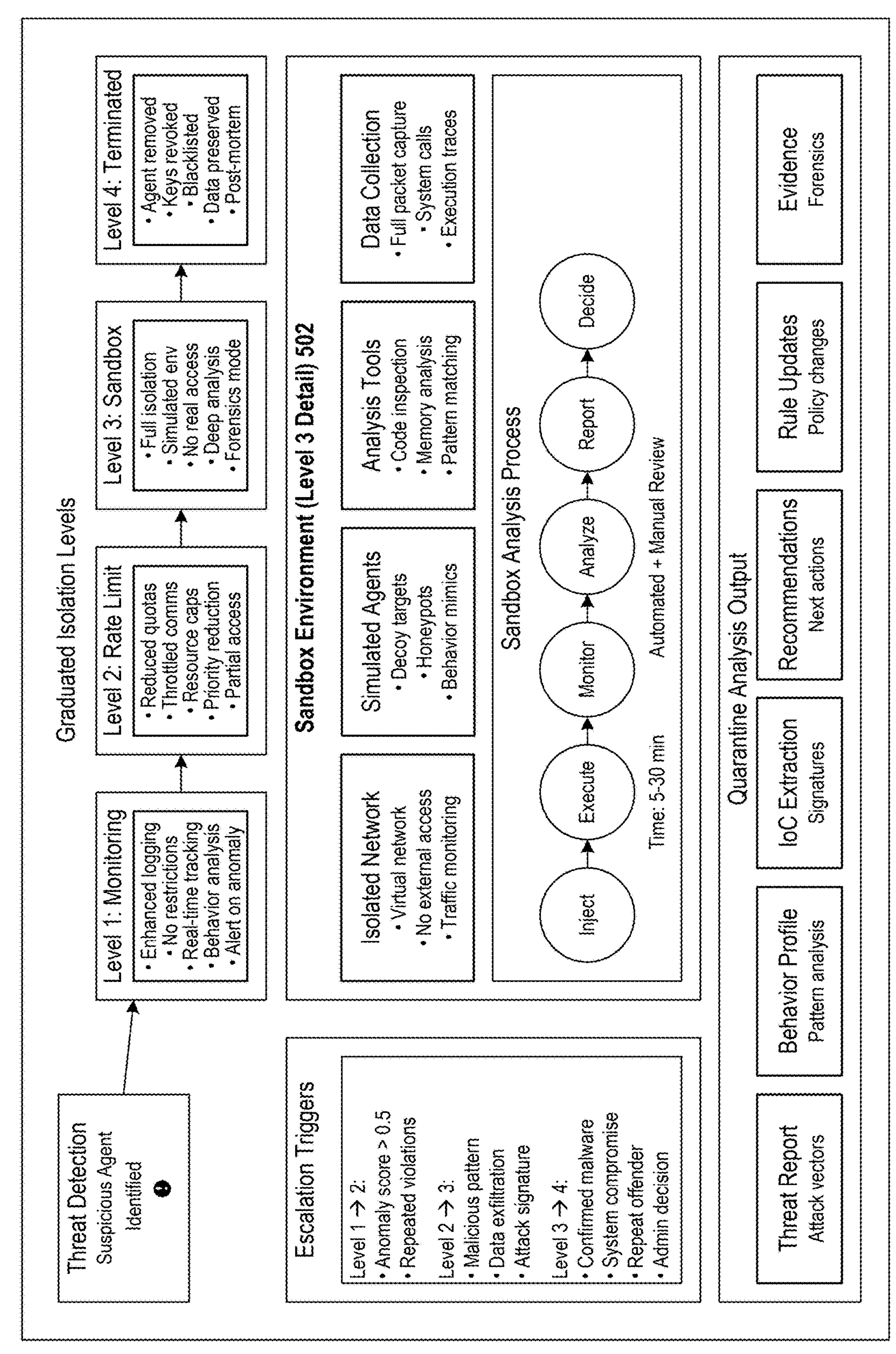
FIG. 5 illustrates a quarantine and analysis system, in accordance with one or more embodiments of this disclosure.

In some implementations, malfunction interdiction system 160 may quarantine malfunctioning AI agents. Referring to FIG. 5, a quarantine analysis system 500 may provide comprehensive isolation and analysis capabilities for containing and investigating suspicious artificial intelligence agents within distributed environment 200. Quarantine analysis system 500 may implement graduated response mechanisms that enable proportional containment measures based on the severity and nature of detected malfunctions or security threats. The system may operate as a component of malfunction response subsystem 166, providing secure environments where potentially compromised agents can be analyzed without posing risks to the broader distributed system. Quarantine analysis system 500 may support multiple isolation levels ranging from enhanced monitoring to complete agent termination, enabling security personnel to investigate suspicious behaviors while maintaining operational continuity for legitimate agents. The system may implement automated analysis capabilities that can process agent behaviors, extract threat intelligence, and generate comprehensive forensic reports that support security decision-making processes.

Quarantine analysis system 500 may detect, using a plurality of machine learning models (as discussed above), a malfunction within an artificial intelligence agent and a malfunction level associated with the malfunction. The detection process may enable the system to identify agents exhibiting anomalous behaviors, security violations, or performance degradation that may indicate compromise or operational failure. The plurality of machine learning models may include behavioral analysis algorithms, pattern recognition systems, and threat detection mechanisms that analyze agent activities across multiple operational dimensions. The malfunction level may provide a quantitative assessment of threat severity that determines appropriate containment and analysis procedures. For example, the system may employ ensemble anomaly detection models that analyze communication patterns, resource utilization metrics, and decision-making behaviors to calculate malfunction scores that range from minor operational deviations to severe security threats requiring immediate isolation.

Quarantine analysis system 500 may determine, based on the malfunction level associated with the artificial intelligence agent, whether the artificial intelligence agent is to be temporarily isolated from providing responses to requests. The isolation determination process may evaluate threat severity, potential system impact, and operational context to select appropriate containment measures. The system may implement threshold-based decision mechanisms that automatically trigger isolation procedures when malfunction levels exceed predetermined safety boundaries. Temporary isolation may enable detailed analysis of agent behaviors while preventing potential damage to system operations or data integrity. For example, the system may compare malfunction scores against configurable thresholds, such that agents with moderate anomaly scores may be subjected to enhanced monitoring, while agents with high malfunction scores may be immediately isolated for comprehensive forensic analysis.

Based on determining that the malfunction level indicates that the artificial intelligence agent is to be temporarily isolated, quarantine analysis system 500 may modify one or more network configuration settings associated with the artificial intelligence agent to place the artificial intelligence agent into isolation. The network configuration modifications may result in blocking the artificial intelligence agent from communicating with network devices while allowing the artificial intelligence agent to communicate with malfunction monitoring devices. The isolation process may implement selective network access controls that prevent potentially malicious agents from accessing production systems while maintaining connectivity to analysis infrastructure. The network configuration changes may include firewall rule modifications, routing table updates, and access control list adjustments that create secure communication channels between isolated agents and monitoring systems. For example, the system may configure network switches to redirect agent traffic to isolated network segments, implement virtual local area network (LAN) segregation to prevent lateral movement, and establish secure tunnels that enable monitoring devices to collect behavioral data from isolated agents.

As further shown in FIG. 5, quarantine analysis system 500 may include graduated isolation levels that provide flexible containment options based on threat assessment and analysis requirements. The graduated isolation levels may include monitoring mode that allows agents to continue operating while collecting enhanced telemetry data about agent activities, communication patterns, and resource utilization behaviors. Rate limiting isolation may restrict agent communication frequencies and resource consumption to prevent potential damage while maintaining operational capabilities for analysis purposes. Sandbox isolation may place agents in completely isolated virtual environments where agent behaviors can be observed and analyzed using simulated system components. Suspended state isolation may freeze agent execution while preserving current operational state for detailed forensic analysis. Termination procedures may safely remove malicious agents from the system while maintaining detailed logs and evidence for security investigations.

With continued reference to FIG. 5, a sandbox environment 502 within quarantine analysis system 500 may provide isolated execution environments where suspicious agents can be contained and analyzed without posing risks to the broader distributed system. Sandbox environment 502 may implement simulated agent interactions for behavioral analysis that enable security analysts to observe how suspicious agents respond to various stimuli and environmental conditions. The sandbox environment 502 may include an isolated network with virtual network capabilities that replicate production network conditions while preventing access to legitimate system resources. Simulated agents within sandbox environment 502 may include decoy targets and honeypots that provide realistic interaction opportunities for isolated agents while collecting intelligence about malicious behaviors and attack patterns. Analysis tools within sandbox environment 502 may perform code inspection and pattern matching to identify malicious code, behavioral signatures, and threat indicators that characterize compromised agents.

Quarantine analysis system 500 may transmit a request to the artificial intelligence agent to obtain a response to the request while the agent operates within the controlled isolation environment. The request transmission process may enable behavioral analysis by observing how isolated agents process and respond to various types of computational tasks. The system may select requests that are designed to elicit specific behavioral patterns or trigger potential malicious activities that can be safely observed within the sandbox environment 502. The response collection process may provide insights into agent operational capabilities, decision-making processes, and potential security vulnerabilities. For example, the system may transmit requests that include sensitive data access attempts, resource-intensive computational tasks, or collaborative decision-making scenarios to observe how isolated agents behave when presented with different operational challenges.

The quarantine analysis system 500 may retrieve a plurality of execution parameters related to execution of the request by the artificial intelligence agent. The plurality of execution parameters may include one or more of packet capture data, application programming interface call data, or execution trace data that provide comprehensive insights into agent operational behaviors. Packet capture data may document all network communications generated by the isolated agent, including message content, destination addresses, and protocol usage patterns. Application programming interface call data may record all API interactions attempted by the agent, including authentication attempts, data access requests, and service invocation patterns. Execution trace data may capture detailed information about agent internal processing, including function calls, memory access patterns, and computational sequences. For example, the system may employ network monitoring tools to capture packet-level communications, API logging mechanisms to record service interactions, and process tracing utilities to document internal agent execution flows.

Quarantine analysis system 500 may execute, using the plurality of execution parameters, one or more of code inspection, memory analysis, or pattern matching to determine whether the malfunction is correctable and to obtain one or more correction operations in relation to the artificial intelligence agent. Code inspection procedures may analyze agent executable code, configuration files, and operational scripts to identify malicious modifications, corrupted algorithms, or security vulnerabilities. Memory analysis may examine agent memory structures, data patterns, and runtime states to detect evidence of compromise, data corruption, or abnormal operational conditions. Pattern matching may compare observed behaviors against known threat signatures, attack patterns, and malicious behavioral indicators to classify the nature and severity of detected malfunctions. For example, the system may employ static code analysis tools to examine agent binaries, dynamic memory analysis utilities to inspect runtime data structures, and signature-based detection algorithms to identify known malware patterns or behavioral anomalies.

The quarantine analysis system 500 may execute the one or more correction operations to correct the malfunction and, based on determining that the malfunction has been corrected, remove the artificial intelligence agent from the isolation. The correction operations may include transmitting one or more training datasets to the artificial intelligence agent to retrain one or more machine learning models associated with the artificial intelligence agent. The retraining process may address model degradation, corrupted learning parameters, or biased training data that may have contributed to agent malfunctions. The system may also perform resending one or more tasks to the artificial intelligence agent for testing to validate that correction procedures have successfully restored normal operational capabilities. Based on a plurality of responses from the artificial intelligence agent, the system may determine whether the malfunction has been corrected by comparing post-correction behaviors against established baseline patterns. For example, the system may provide clean training datasets to restore compromised machine learning models, execute validation test suites to verify operational correctness, and monitor agent responses to ensure that behavioral patterns have returned to normal operational ranges.

Quarantine analysis system 500 may implement time acceleration features for long-term behavior observation within sandbox environment 502 by periodically communicating to the artificial intelligence agent a corresponding inaccurate date and time, thereby generating an accelerated timeline for the artificial intelligence agent. The time acceleration mechanism may enable rapid analysis of agent behaviors that might normally develop over extended periods, allowing security analysts to observe long-term behavioral patterns within compressed timeframes. The system may periodically transmit task requests to the artificial intelligence agent, such that the artificial intelligence agent responds to the task requests using the accelerated timeline. The accelerated timeline analysis may reveal behavioral changes, adaptation patterns, or malicious activities that become apparent only over extended operational periods. The system may determine whether a response pattern changes over time based on the accelerated timeline, and based on determining that the response pattern changes over time based on the accelerated timeline, generate and transmit an alert to an operator. For example, the system may manipulate system clocks to simulate weeks or months of operation within hours of analysis time, enabling detection of time-based malicious behaviors, gradual performance degradation, or adaptive attack strategies that evolve over extended periods.

Quarantine analysis system 500 may include honeypot data capabilities to observe attack patterns within sandbox environment 502 by providing simulated targets and decoy resources that attract malicious activities from isolated agents. The honeypot mechanisms may include fake databases containing synthetic sensitive information, simulated network services that appear to provide access to production systems, and decoy agents that present attractive targets for lateral movement attempts. The system may monitor interactions with honeypot resources to identify attack methodologies, data exfiltration attempts, and malicious behavioral patterns exhibited by compromised agents. The honeypot data collection may provide intelligence about attack vectors, threat actor capabilities, and malicious code functionality that can inform broader security improvements. For example, the system may deploy simulated financial databases with synthetic transaction records, fake authentication services that log credential theft attempts, and decoy communication channels that capture malicious message propagation patterns.

Quarantine analysis system 500 may support automated testing of agent responses to various stimuli by systematically exposing isolated agents to different operational scenarios, environmental conditions, and interaction patterns. The automated testing capabilities may include stress testing with high computational loads, social engineering scenarios with deceptive communication patterns, and resource scarcity conditions that may trigger abnormal behaviors. The system may generate comprehensive forensic analysis capabilities for investigating suspicious agents by correlating behavioral observations, execution parameters, and environmental responses into detailed threat assessment reports. The forensic analysis may include timeline reconstruction of agent activities, behavioral pattern analysis, and threat classification that supports security decision-making processes. For example, the system may execute automated test suites that simulate various attack scenarios, measure agent responses to different operational stressors, and generate detailed forensic reports that document agent capabilities, vulnerabilities, and potential security risks.

The malfunction interdiction system may implement sophisticated data exfiltration detection capabilities that analyze anomaly scores to identify agents attempting to steal or leak sensitive information from distributed environment 200. The system may calculate anomaly scores by analyzing communication patterns, data access behaviors, and resource utilization metrics that deviate from established baseline patterns for each artificial intelligence agent. The anomaly scoring mechanism may employ statistical analysis techniques that compare current agent behaviors against historical operational data to identify unusual activities that may indicate data theft attempts.

The system may monitor data access patterns by tracking which databases, files, and information repositories each artificial intelligence agent accesses during normal operations. The system may establish baseline access patterns that define typical data retrieval behaviors for each agent based on their designated operational roles and historical activities. When an agent begins accessing data sources outside their normal operational scope, the system may calculate elevated anomaly scores that reflect the deviation from expected access patterns. The anomaly scoring algorithm may weigh different types of data access violations based on the sensitivity of the accessed information and the frequency of unauthorized access attempts.

The system may analyze communication volume and destination patterns to detect potential data exfiltration activities through network communications. The system may establish baseline communication profiles that define normal message frequencies, payload sizes, and destination addresses for each artificial intelligence agent. When an agent begins transmitting unusually large volumes of data or communicating with unexpected external destinations, the system may generate anomaly scores that quantify the degree of deviation from normal communication behaviors. The scoring mechanism may incorporate temporal analysis to identify gradual increases in data transmission that may indicate slow data exfiltration attempts designed to avoid detection.

The system may examine resource utilization patterns to identify agents that consume excessive computational resources during potential data exfiltration activities. The system may monitor memory usage, processing power consumption, and input-output operations to establish baseline resource utilization profiles for each agent. When an agent begins consuming significantly more resources than typical for their operational tasks, the system may calculate anomaly scores that reflect potential data processing activities associated with information theft. The resource-based anomaly detection may identify agents that are compressing, encrypting, or otherwise processing large volumes of data in preparation for exfiltration.

The system may correlate multiple behavioral indicators to generate comprehensive anomaly scores that reflect the overall likelihood of data exfiltration attempts. The system may combine communication anomalies, data access violations, and resource utilization deviations into weighted composite scores that provide quantitative assessments of exfiltration risk. The correlation algorithm may account for temporal relationships between different anomalous behaviors to identify coordinated exfiltration activities that span multiple operational dimensions. The system may adjust anomaly score thresholds based on the sensitivity of available data and the operational context of each artificial intelligence agent.

The system may implement real-time anomaly score monitoring that enables immediate detection of data exfiltration attempts as they occur. The system may continuously calculate and update anomaly scores based on ongoing agent activities, providing dynamic threat assessments that reflect current operational conditions. When anomaly scores exceed predetermined thresholds that indicate high probability of data exfiltration, the system may trigger automated response mechanisms including enhanced monitoring, communication restrictions, or complete agent isolation. The real-time scoring capability may enable rapid intervention before significant data theft can occur.

The system may maintain historical anomaly score databases that enable trend analysis and pattern recognition across extended operational periods. The system may track anomaly score evolution over time to identify agents whose exfiltration risk gradually increases through subtle behavioral changes. The historical analysis may reveal seasonal patterns, operational cycles, or environmental factors that influence anomaly scores, enabling more accurate threat assessment and reduced false positive rates. The system may use machine learning algorithms to analyze historical anomaly score data and predict future exfiltration risks based on observed behavioral trends.

The malfunction interdiction system may implement sophisticated agent response comparison mechanisms to determine whether isolated artificial intelligence agents should be removed from quarantine environments. Prior to transmitting the request to the artificial intelligence agent, the system may determine, based on agent capabilities of the artificial intelligence agent, that the artificial intelligence agent may be capable of completing the request. The agent capabilities assessment may involve analyzing the agent's operational specifications, computational resources, and functional domains to ensure compatibility with the requested task parameters.

The system may evaluate the isolated agent's technical specifications against the requirements of the proposed request to verify operational feasibility. The capability determination process may include examining the agent's machine learning model architectures, available computational resources, and specialized functional modules that may be necessary for successful task completion. The system may access agent capability databases that maintain detailed profiles of each agent's operational characteristics, including supported data formats, processing algorithms, and output generation capabilities.

The system may transmit the request to a second artificial intelligence agent to obtain an additional response to the request, creating a comparative baseline for evaluating the isolated agent's performance. The second artificial intelligence agent may be selected from a pool of verified, non-compromised agents that possess similar operational capabilities to the isolated agent. The selection process may prioritize agents with established reputation scores and recent successful task completion histories to ensure reliable baseline responses.

The system may coordinate simultaneous or sequential request processing to minimize temporal variations that could affect response comparison accuracy. The request transmission mechanism may employ standardized communication protocols and data formats to ensure consistent task presentation across different agents. The system may monitor the response generation process for both agents to collect timing metrics, resource utilization patterns, and intermediate processing states that may inform the comparative analysis.

The system may input the response and the additional response into a similarity machine learning model to obtain a degree of similarity between the response and the additional response. The similarity machine learning model may be trained on extensive datasets of agent response pairs to recognize patterns of semantic equivalence, functional correctness, and stylistic consistency across different response formats. The model may employ natural language processing techniques, vector similarity calculations, and domain-specific comparison algorithms to generate quantitative similarity assessments.

The similarity analysis may encompass multiple dimensions of response comparison, including content accuracy, structural organization, computational efficiency, and adherence to specified output formats. The machine learning model may generate similarity scores that reflect both surface-level textual similarities and deeper semantic relationships between the compared responses. The system may weight different similarity dimensions based on the specific task requirements and the operational context of the comparison.

Based on determining that the degree of similarity matches a threshold, the system may determine, using the degree of similarity, whether to remove the artificial intelligence agent from the isolation. The threshold matching process may involve comparing the calculated similarity score against predetermined acceptance criteria that reflect acceptable levels of response deviation for different task categories. The threshold values may be dynamically adjusted based on the sensitivity of the operational environment, the criticality of the tasks being performed, and the historical performance patterns of similar agents.

The system may implement graduated threshold mechanisms that account for different levels of response similarity and their implications for agent trustworthiness. High similarity scores may indicate that the isolated agent continues to function normally and may be suitable for immediate release from quarantine. Moderate similarity scores may trigger additional testing phases or extended monitoring periods before release decisions are made. Low similarity scores may indicate persistent malfunctions or security compromises that require continued isolation or more intensive remediation efforts.

The system may correlate similarity assessment results with other behavioral indicators collected during the isolation period to make comprehensive release decisions. The decision-making process may incorporate reputation scores, resource utilization patterns, communication behaviors, and temporal consistency metrics to provide holistic evaluations of agent readiness for operational reintegration. The system may maintain detailed logs of similarity comparisons and release decisions to support forensic analysis and continuous improvement of the comparison algorithms.

The malfunction interdiction system may implement comprehensive periodic testing mechanisms to validate the behavioral consistency of quarantined artificial intelligence agents through systematic comparison with verified operational agents. The system may periodically identify, based on agent capabilities of the artificial intelligence agent, a plurality of task requests for the artificial intelligence agent. The plurality of task requests may have been sent to one or more other artificial intelligence agents. The one or more other artificial intelligence agents may have sent a plurality of responses to the plurality of task requests.

The system may analyze the operational capabilities and functional specifications of the quarantined artificial intelligence agent to determine appropriate task categories for comparative testing. The capability assessment process may examine the agent's machine learning model architectures, computational resource requirements, and specialized functional domains to ensure that selected tasks align with the agent's designated operational scope. The system may access comprehensive capability databases that maintain detailed profiles of agent operational characteristics, including supported data formats, processing algorithms, and output generation capabilities.

In addition, the system may select task requests from historical operational data that represent typical workloads and challenge scenarios encountered during normal system operations. The task selection process may prioritize requests that have been successfully processed by multiple verified agents to establish robust comparative baselines. The system may ensure that selected tasks span different complexity levels, data types, and operational contexts to provide comprehensive evaluation coverage of the quarantined agent's behavioral patterns.

The system may also transmit the plurality of task requests to the artificial intelligence agent to obtain a second plurality of responses to the plurality of task requests. The transmission process may employ standardized communication protocols and data formatting to ensure consistent task presentation across different testing scenarios. The system may monitor the quarantined agent's response generation process to collect detailed performance metrics, including processing times, resource utilization patterns, and intermediate computational states.

Furthermore, the system may implement temporal coordination mechanisms to ensure that comparative testing occurs under similar operational conditions. The system may account for system load variations, network latency fluctuations, and environmental factors that may influence response generation characteristics. The system may maintain detailed logs of testing conditions to support accurate interpretation of comparative results.

Using a similarity machine learning model, the system may determine whether a similarity metric between corresponding responses within the plurality of responses and the second plurality of responses meets a threshold. The similarity machine learning model may be trained on extensive datasets of agent response pairs to recognize patterns of semantic equivalence, functional correctness, and stylistic consistency across different response formats. The model may employ natural language processing techniques, vector similarity calculations, and domain-specific comparison algorithms to generate quantitative similarity assessments.

The similarity analysis may encompass multiple dimensions of response comparison, including content accuracy, structural organization, computational efficiency, and adherence to specified output formats. The machine learning model may generate similarity scores that reflect both surface-level textual similarities and deeper semantic relationships between the compared responses. The system may weight different similarity dimensions based on the specific task requirements and the operational context of the comparison.

The malfunction interdiction system may implement statistical analysis techniques to evaluate the consistency of similarity scores across the plurality of task requests. The system may calculate aggregate similarity metrics that account for variations in individual task performance while identifying overall behavioral patterns. The system may employ confidence interval calculations to assess the reliability of similarity measurements and account for natural variations in agent response characteristics.

The malfunction interdiction system may correlate similarity metrics with other behavioral indicators collected during the quarantine period to provide comprehensive assessments of agent operational readiness. The correlation process may incorporate reputation scores, resource utilization patterns, communication behaviors, and temporal consistency metrics to generate holistic evaluations of agent trustworthiness. The system may maintain detailed correlation databases that link similarity assessments with broader behavioral profiles.

Based on determining that the similarity metric between the corresponding responses within the plurality of responses and the second plurality of responses does not meet the threshold, the malfunction interdiction system may generate and transmit an alert to an operator indicating that the artificial intelligence agent is still malfunctioning. The alert generation process may include detailed analysis reports that document specific areas of response deviation, performance inconsistencies, and potential security concerns identified during the comparative testing process.

The malfunction interdiction system may implement graduated alert mechanisms that provide different levels of notification based on the severity and nature of detected deviations. The alert system may categorize malfunctions based on their potential impact on system operations, security risks, and remediation complexity. The system may provide operators with detailed forensic information, including response comparisons, behavioral analysis results, and recommended intervention strategies.

Furthermore, the malfunction interdiction system may maintain comprehensive audit trails of all comparative testing activities, similarity assessments, and alert generation events to support forensic analysis and continuous improvement of the quarantine evaluation process. The audit system may track the evolution of agent behaviors during quarantine periods, enabling identification of patterns that may indicate successful remediation or persistent security threats.

The malfunction interdiction system may implement graduated response mechanisms that enable proportional containment measures for artificial intelligence agents exhibiting varying degrees of operational anomalies or security threats. The malfunction interdiction system may assess malfunction levels through comprehensive analysis of behavioral deviations, resource utilization patterns, and threat indicators to determine appropriate limitation strategies that balance security requirements with operational continuity.

The system may detect malfunction levels that indicate an artificial intelligence agent should be subjected to operational limitations rather than complete isolation or termination. The malfunction level assessment may incorporate multiple risk factors including anomaly scores, reputation degradation rates, resource consumption patterns, and communication behavior deviations. The malfunction interdiction system may evaluate these factors collectively to determine whether an agent poses moderate security risks that may be mitigated through controlled operational restrictions.

Based on determining that the malfunction level indicates that the artificial intelligence agent is to be limited, the malfunction interdiction system may generate a comprehensive set of parameters that define specific operational constraints for the affected agent. The parameter generation process may create customized limitation profiles that address the specific nature and severity of detected malfunctions while maintaining the agent's ability to perform essential functions under controlled conditions.

The malfunction interdiction system may generate a quota parameter that limits the response capacity of the artificial intelligence agent by restricting the number of requests the agent may process within specified time periods. The quota parameter may establish daily, hourly, or per-session limits that prevent potentially compromised agents from processing excessive volumes of requests that could amplify security risks or system disruption. The quota limitations may be dynamically adjusted based on ongoing behavioral monitoring and threat assessment results.

The malfunction interdiction system may further create a throttled communication parameter that limits the volume of data allowed to be transmitted by the artificial intelligence agent during normal operations. The communication throttling may restrict message sizes, transmission frequencies, and total data throughput to prevent potential data exfiltration attempts or network resource abuse. The throttled communication parameter may implement bandwidth limitations, message queue restrictions, and payload size constraints that maintain operational capabilities while reducing security exposure.

The malfunction interdiction system may also establish a resource limit parameter that constrains the amount of computing resources the artificial intelligence agent may utilize during task execution. The resource limitations may include memory allocation caps, processing time restrictions, and input-output operation limits that prevent resource exhaustion attacks or performance degradation of other system components. The resource limit parameter may dynamically adjust based on system load conditions and the agent's historical resource utilization patterns.

In some implementations, the malfunction interdiction system may define a priority parameter that reduces the scheduling priority associated with the artificial intelligence agent within the distributed computing environment. The priority reduction may ensure that limited agents receive lower precedence in task assignment queues, resource allocation decisions, and system attention compared to fully trusted agents. The priority parameter may implement weighted scheduling algorithms that gradually restore normal priority levels as agent behavior demonstrates sustained improvement.

The malfunction interdiction system may then transmit a command to the artificial intelligence agent to implement the generated set of parameters through secure communication channels that ensure parameter enforcement cannot be circumvented or tampered with by potentially compromised agents. The command transmission process may employ cryptographic authentication mechanisms to verify the integrity and authenticity of limitation commands. The system may monitor parameter implementation to ensure that restricted agents comply with imposed limitations and detect any attempts to bypass or violate operational constraints.

The system may implement real-time monitoring capabilities that track the effectiveness of imposed limitations and assess whether restricted agents demonstrate behavioral improvements or continued security risks. The monitoring process may collect performance metrics, behavioral indicators, and compliance measurements that inform decisions about parameter adjustment, limitation escalation, or restriction removal. The system may maintain detailed logs of limitation enforcement activities to support forensic analysis and continuous improvement of graduated response mechanisms.

Computing Environment

Figure 6:
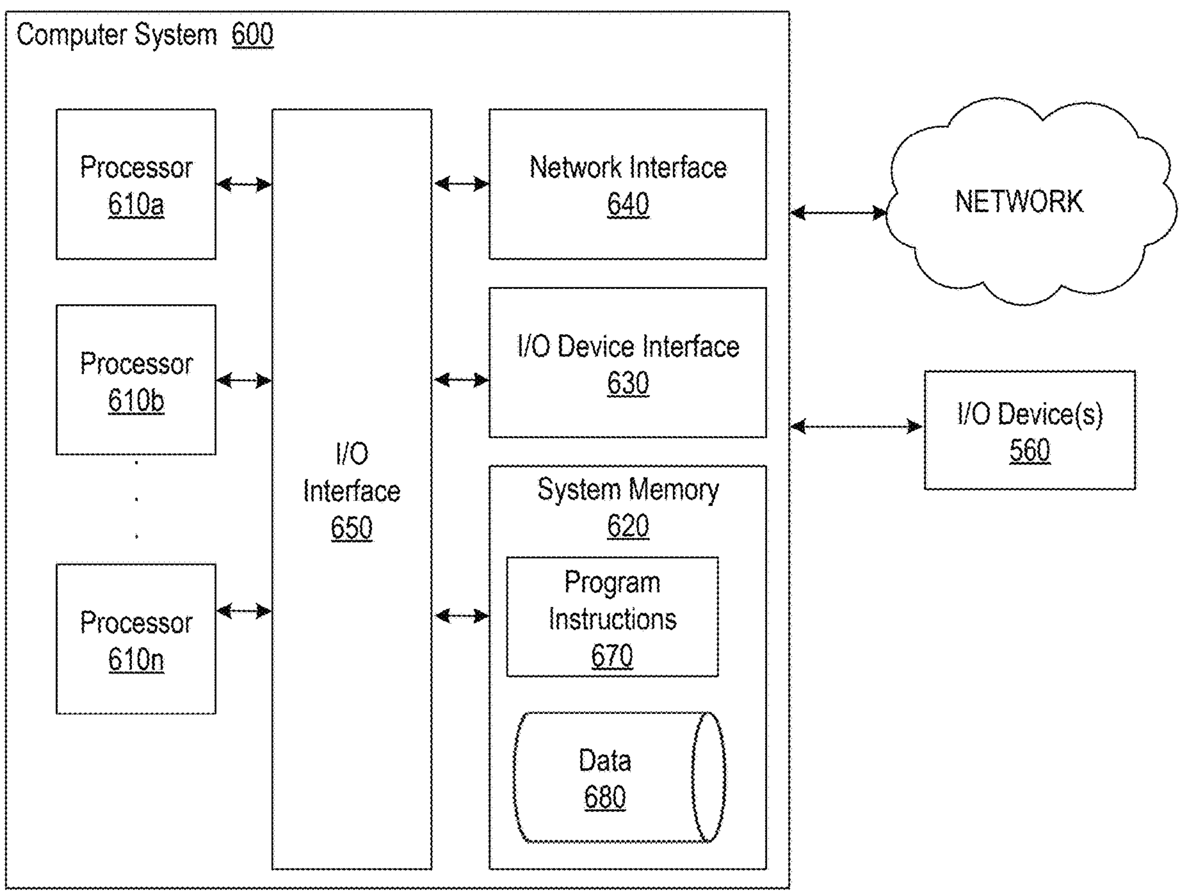
FIG. 6 illustrates an exemplary computing system, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably.

The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
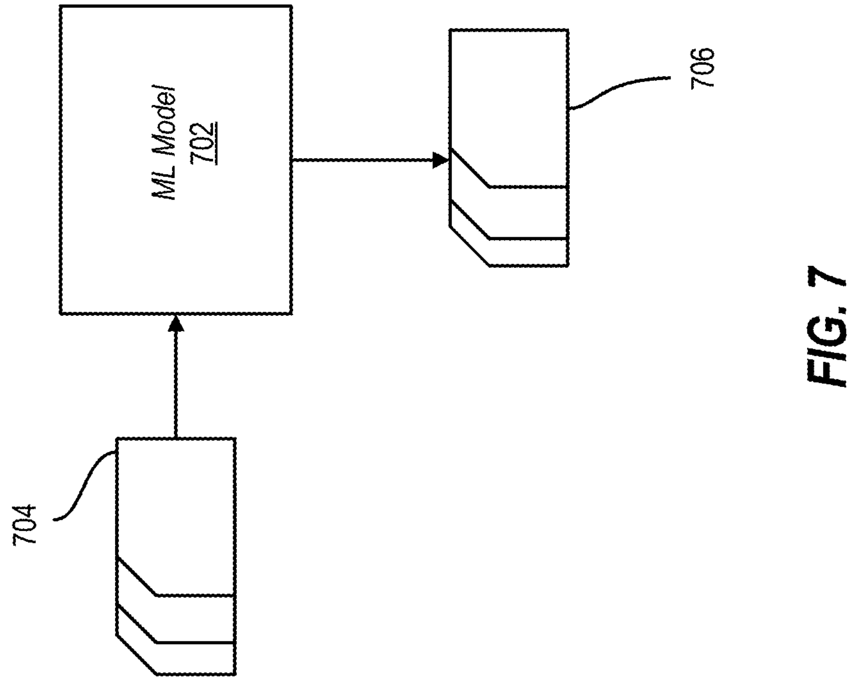
FIG. 7 illustrates exemplary machine learning models, in accordance with one or more embodiments of this disclosure.

FIG. 7 illustrates an exemplary machine learning model 702. According to some examples, the machine learning model may be any model, such as a model for data imputation. For example, the machine learning model may be trained to intake input 704. As a result of inputting the input 704 into the machine learning model, the model may then output an output 706, which may include, for example, an imputed value. Furthermore, as described, the machine learning model may be configured to output a confidence interval or other metric for certainty regarding the outputs. Output 706 may include output parameters.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from publicly available sources. Such a technique may be used to identify values and generate a corpus that can be accessed to impute values. For example, in some embodiments, if a value is missing, the model may access the corpus to identify relevant information for the missing value. For example, the values can be used to calculate the missing value. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. The specific training samples may be used to generate language in a certain style or in a certain format.

Some concepts in ML-based language models will now be discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 8:
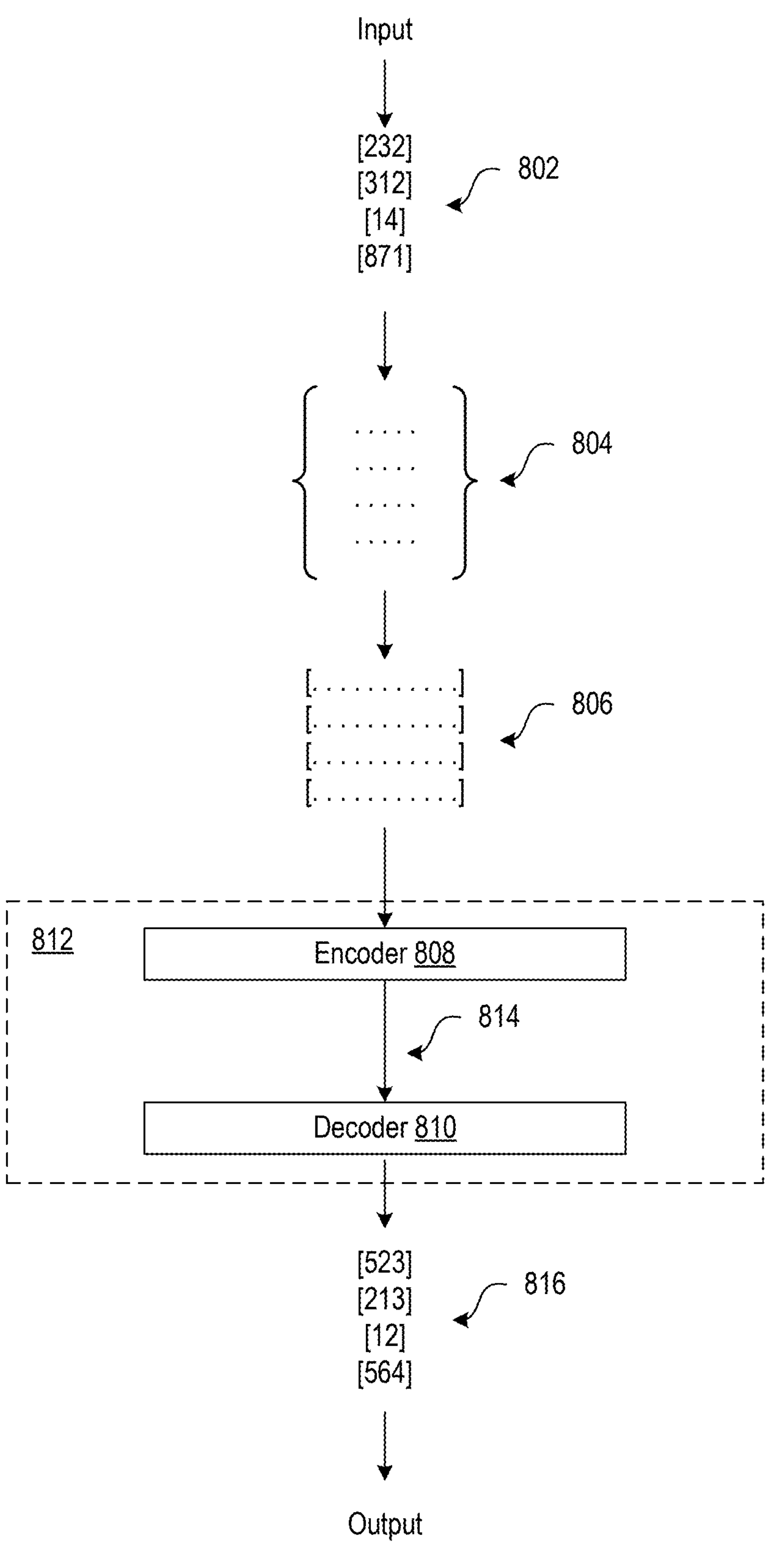
FIG. 8 is a block diagram of an example transformer that may be used for detecting malfunctions in AI agents, in accordance with one or more embodiments of this disclosure.

FIG. 8 is a block diagram of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

Transformer 812 may include an encoder 808 (which may include one or more encoder layers/blocks connected in series) and a decoder 810 (which may include one or more decoder layers/blocks connected in series). Generally, encoder 808 and decoder 810 may each include multiple neural network layers, at least one of which may be a self-attention layer. The parameters of the neural network layers may be referred to as the parameters of the language model.

Transformer 812 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. As described herein, it may take existing content from publicly available sources (e.g., text, images, etc.) to help in imputing missing values. Brainstorming ideas may include generating a list of ideas based on provided input. For example, the ML model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, transformer 812 is trained to perform certain functions on other input formats than natural language input. For example, the input may include objects, images, audio content, or video content, or a combination thereof. In some examples, this may be used to generate commands for authorizing and completing the transaction, for example.

Transformer 812 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 8 illustrates an example of how transformer 812 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens can provide formatting information, etc.

In FIG. 8, a short sequence of tokens 802 corresponding to the input text is illustrated as input to transformer 812. Tokenization of the text sequence into tokens 802 may be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted into transformer 812 may be of any length up to a maximum length defined based on the dimensions of transformer 812. Each token 802 in the token sequence is converted into an embedding 806 (also referred to as "embedding vector").

Embedding 806 is a learned numerical representation (such as, for example, a vector) of a token that captures some semantic meaning of the text segment represented by the token 802. Embedding 806 represents the text segment corresponding to token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, embedding 806 corresponding to the "write" token will be closer to another embedding corresponding to the "jot down" token in the vector space as compared to the distance between the embedding 806 corresponding to the "write" token and another embedding corresponding to the "summary" token.

The vector space may be defined by the dimensions and values of the embedding vectors. Various techniques may be used to convert token 802 into embedding 806. For example, another trained ML model may be used to convert token 802 into embedding 806. In particular, another trained ML model may be used to convert token 802 into embedding 806 in a way that encodes additional information into embedding 806 (e.g., a trained ML model may encode positional information about the position of token 802 in the text sequence into the embedding 806). In some implementations, the numerical value of token 802 may be used to look up the corresponding embedding in an embedding matrix 804, which may be learned during training of transformer 812.

The generated embeddings, e.g., such as embedding 806, are input into the encoder 808. Encoder 808 serves to encode embedding 806 into feature vectors 814 that represent the latent features of embedding 806. Encoder 808 can encode positional information (i.e., information about the sequence of the input) in feature vectors 814. Feature vectors 814 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that may be generated by encoder 808 may be referred to as a latent space or feature space.

Conceptually, decoder 810 is designed to map the features represented by feature vectors 814 into meaningful output, which may depend on the task that was assigned to transformer 812. For example, if transformer 812 is used for a translation task, decoder 810 may map feature vectors 814 into text output in a target language different from the language of the original tokens 802. Generally, in a generative language model, decoder 810 serves to decode feature vectors 814 into a sequence of tokens. Decoder 810 may generate output tokens 816 one by one. Each output token 816 may be fed back as input to decoder 810 in order to generate the next output token 816. By feeding back the generated output and applying self-attention, decoder 810 may generate a sequence of output tokens 816 that has sequential meaning (e.g., the resulting output text sequence is understandable as a sentence and obeys grammatical rules). Decoder 810 may generate output tokens 816 until a special [EOT] token (indicating the end of the text) is generated. The resulting sequence of output tokens 816 can then be converted to a text sequence in post-processing. For example, each output token 816 may be an integer number that corresponds to a vocabulary index. By looking up the text segment using the vocabulary index, the text segment corresponding to each output token 816 may be retrieved, the text segments may be concatenated together, and the final output text sequence can be obtained.

In some implementations, the input provided to transformer 812 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt may optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

Figure 9:
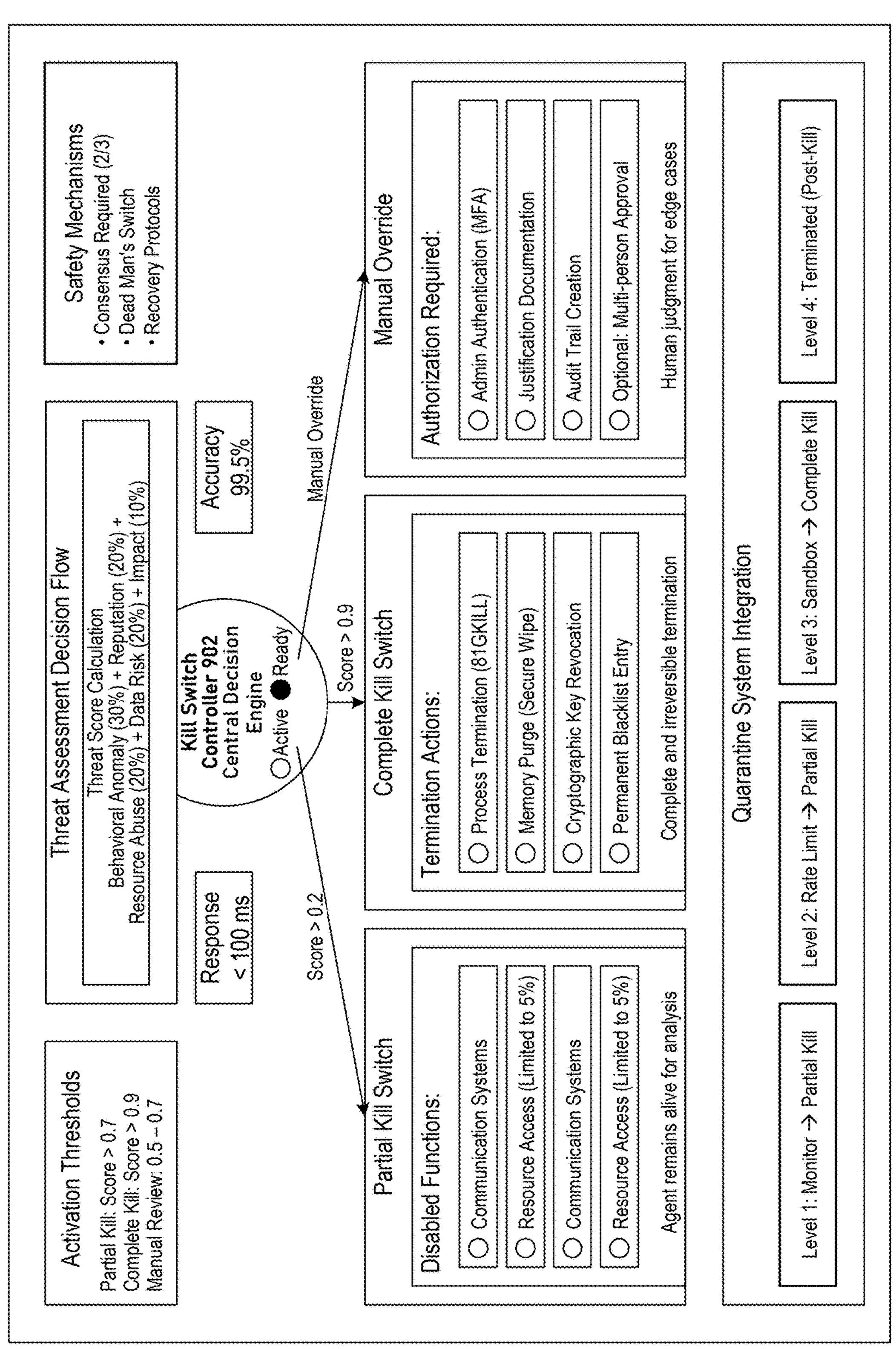
FIG. 9 illustrates an agent termination system, in accordance with one or more embodiments of this disclosure.

In some implementations, AI agents may be deactivated or partially deactivated based on the level of malfunction detected. Referring to FIG. 9, an agent termination system 900 may provide comprehensive graduated response capabilities for managing compromised or malfunctioning artificial intelligence agents within distributed environment 200. Agent termination system 900 may implement sophisticated threat assessment mechanisms that enable proportional responses ranging from partial deactivation to complete agent termination based on the severity and nature of detected security threats. The system may operate as an advanced component of malfunction response subsystem 166, providing automated decision-making capabilities that can respond to critical threats at machine speed while maintaining human oversight for complex scenarios. Agent termination system 900 may detect a malfunction within an artificial intelligence agent and a malfunction level associated with the malfunction based on one or more of: a resource utilization, data exfiltration probability, or reputation degradation rate associated with the artificial intelligence agent. The malfunction detection process may analyze multiple behavioral indicators to generate comprehensive threat assessments that inform appropriate termination responses.

A kill switch controller 902 within agent termination system 900 may function as the central decision-making engine that orchestrates all termination operations based on comprehensive threat analysis and established security policies. Kill switch controller 902 may implement a threat scoring algorithm that calculates threat scores using weighted factors including behavioral anomaly score, reputation degradation rate, resource abuse score, data exfiltration risk, and system impact assessment. The threat scoring algorithm may employ mathematical formulations that combine multiple risk indicators into unified threat assessments, such as calculating threat scores through weighted combinations where behavioral anomaly scores may contribute thirty percent, reputation factors may contribute twenty percent, resource abuse indicators may contribute twenty percent, data exfiltration risks may contribute twenty percent, and system impact assessments may contribute ten percent of the overall threat evaluation. Kill switch controller 902 may process threat assessments in real-time, typically completing response decisions within close to real-time while maintaining a high percentage accuracy rate in threat classification.

Agent termination system 900 may determine, based on the malfunction level associated with the artificial intelligence agent, whether the artificial intelligence agent is to be partially deactivated through graduated response mechanisms that provide proportional containment measures. The partial deactivation process may involve disabling, for the artificial intelligence agent, an application programming interface used to communicate with the artificial intelligence agent, rendering the artificial intelligence agent unable to receive requests while maintaining the agent's operational state for analysis purposes. The system may implement this communication disabling by identifying one or more operating system processes associated with the artificial intelligence agent and modifying permissions associated with the one or more operating system processes associated with the artificial intelligence agent to prevent the one or more operating system processes from using required network resources. For example, kill switch controller 902 may modify network access control lists to block specific agent processes from accessing communication ports while maintaining system monitoring capabilities.

The partial deactivation procedures may also include blocking access to a plurality of computational resources including one or more of network resources, computing resources, or data resources to prevent potentially compromised agents from causing system damage or data theft. The data resource blocking may involve identifying one or more retrieval-augmented generation data sources used by the artificial intelligence agent and modifying permissions on the one or more retrieval-augmented generation data sources to block the artificial intelligence agent from accessing the one or more retrieval-augmented generation data sources.

Retrieval-augmented data sources may represent external knowledge repositories that artificial intelligence agents can dynamically access during task execution to enhance their operational capabilities beyond their pre-trained knowledge base. These data sources may include structured databases containing factual information, document collections with domain-specific content, knowledge graphs representing relationships between entities, real-time data feeds providing current information, and specialized repositories containing technical documentation or procedural knowledge. The retrieval-augmented data sources may be configured to provide agents with access to information that was not available during their initial training phases or that requires frequent updates to maintain accuracy and relevance.

In large language model implementations, retrieval-augmented data sources may be integrated through retrieval-augmented generation frameworks that enable models to query external information repositories based on input prompts or contextual requirements. The integration process may involve the artificial intelligence agent first analyzing the incoming request to identify information gaps or areas where external knowledge may enhance response quality, then executing search queries against configured data sources to retrieve relevant information. The retrieved information may be processed and incorporated into the agent's response generation workflow, allowing the model to ground its outputs in verified external knowledge rather than relying exclusively on pre-trained parameters. This approach may enable artificial intelligence agents to provide more accurate and current responses while reducing the likelihood of generating incorrect or outdated information based solely on their training data.

In some implementations, agent termination system 900 may generate a prompt for the artificial intelligence agent that forces the artificial intelligence agent to prevent participation of the artificial intelligence agent in collective decision making with other artificial intelligence agents, and execute the prompt using administrator access to ensure compliance with isolation requirements. The system may implement these resource restrictions through operating system-level permission modifications, network firewall rule updates, and database access control adjustments that maintain security while preserving forensic capabilities.

Agent termination system 900 may implement complete termination procedures when threat levels exceed thresholds that indicate severe security risks or irreparable agent compromise. Based on determining that the artificial intelligence agent is to be fully deactivated, the system may execute stopping one or more agent processes associated with the artificial intelligence agent, such that the one or more agent processes may include one or more of: network processes or computing processes that define the agent's operational capabilities. The complete termination process may involve generating an agent representation representing an agent state associated with the artificial intelligence agent, such that the agent representation may include an artificial intelligence state representing one or more states of one or more machine learning models associated with the artificial intelligence agent, and a resource state representing resources in use by the artificial intelligence agent. Agent termination system 900 may revoke one or more cryptographic keys and one or more authentication tokens associated with the artificial intelligence agent to prevent any possibility of unauthorized system access using compromised credentials.

The malfunction detection capabilities within agent termination system 900 may implement comprehensive threat assessment mechanisms that analyze multiple behavioral and operational indicators. The system may detect the malfunction level associated with the malfunction by determining an anomaly score associated with a plurality of responses generated by the artificial intelligence agent or a malicious pattern associated with the artificial intelligence agent. The detection process may also involve detecting data exfiltration associated with the artificial intelligence agent and an attack signature through analysis of communication patterns, data access behaviors, and resource utilization metrics that deviate from established baseline patterns. Kill switch controller 902 may correlate these multiple threat indicators to generate comprehensive malfunction assessments that inform appropriate termination responses, ranging from enhanced monitoring to complete agent removal from the system.

Agent termination system 900 may include safety mechanisms comprising a dead man's switch requiring regular heartbeat signals, consensus requirements with Byzantine fault tolerant consensus requiring minimum two-thirds agreement, and recovery protocols with encrypted agent state backups. The dead man's switch mechanism may require agents to regularly transmit heartbeat signals that confirm continued legitimate operation, such that absence of expected heartbeat transmissions may trigger investigation procedures or automated containment measures. The consensus requirements may implement Byzantine fault tolerant decision-making processes that require agreement from multiple monitoring nodes before executing termination procedures, preventing single points of failure or malicious manipulation of termination decisions. The recovery protocols may maintain encrypted agent state backups that enable restoration of legitimate agents that may have been incorrectly terminated due to false positive detections or system errors.

The consensus-based decision-making within agent termination system 900 may determine whether the artificial intelligence agent is to be partially deactivated by receiving a plurality of deactivation messages from a plurality of security nodes, such that each message of the plurality of deactivation messages may include a deactivation signal and a deactivation type. The system may determine whether the artificial intelligence agent is to be partially deactivated using the plurality of deactivation messages aggregated using a computing operation that combines multiple security assessments into unified termination decisions. The aggregation process may employ voting mechanisms, weighted consensus algorithms, or statistical analysis techniques that account for the reliability and expertise of different security nodes contributing to the termination decision. This distributed decision-making approach may prevent individual security nodes from making unilateral termination decisions while ensuring that legitimate security threats receive appropriate responses from multiple independent assessment sources.

Agent termination system 900 may implement comprehensive recovery and restoration capabilities that enable correction of false positive terminations or restoration of agents following successful remediation procedures. The system may identify a date when the artificial intelligence agent was not malfunctioning through analysis of historical behavioral data and performance metrics that establish baseline operational periods. The recovery process may involve retrieving, from a backup system, backup instances of the one or more machine learning models associated with the artificial intelligence agent that represent clean operational states from before malfunction detection occurred. Agent termination system 900 may replace current machine learning models associated with the artificial intelligence agent with the one or more machine learning models from the backup system, enabling restoration of agent functionality while eliminating potentially compromised or corrupted model parameters. The recovery mechanisms may include comprehensive validation procedures that verify restored agent functionality before returning agents to full operational status within distributed environment 200.

Figure 10:
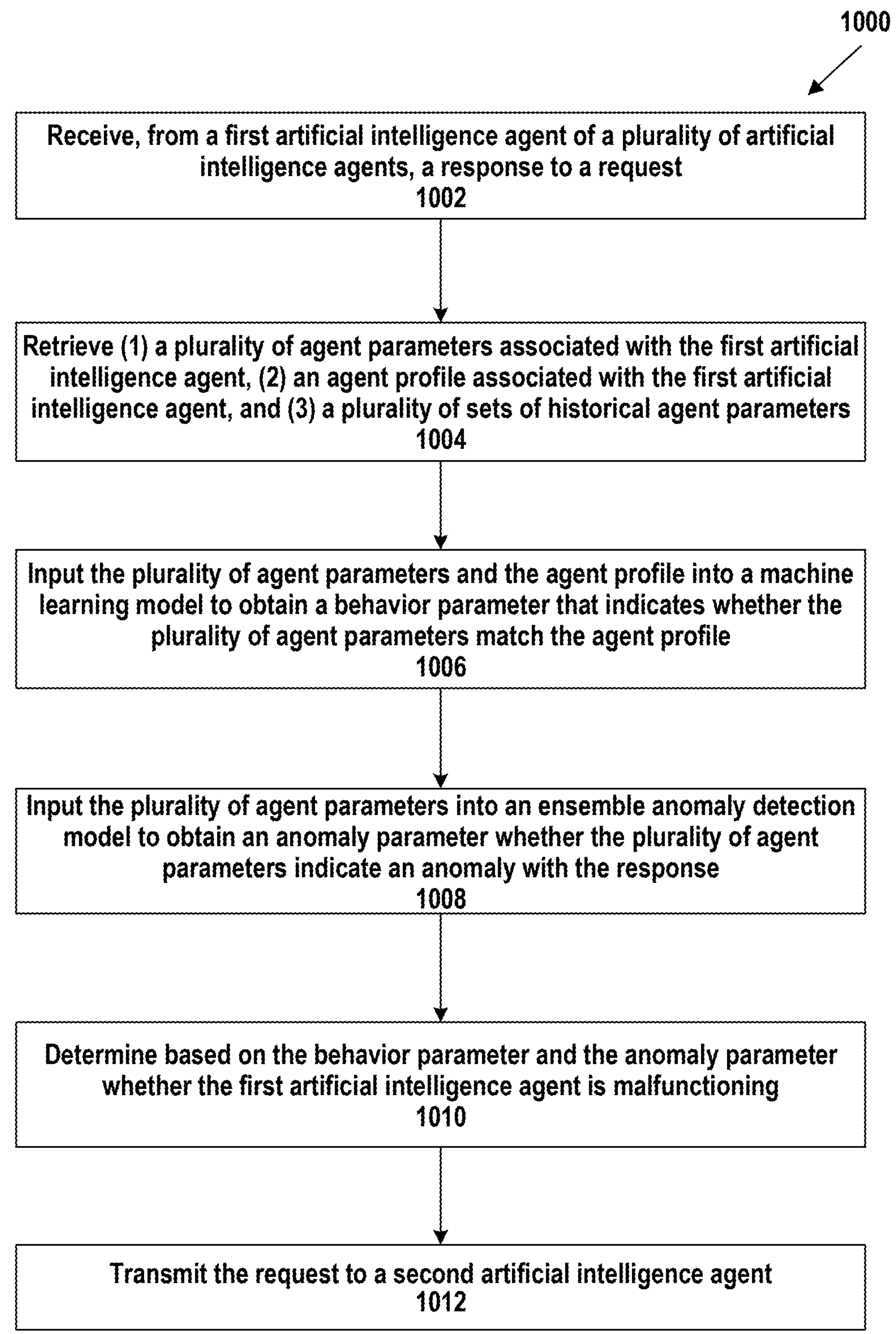
FIG. 10 is a flowchart of operations for detecting malfunctions in AI agents, in accordance with one or more embodiments of this disclosure.

Referring to FIG. 10, a process 1000 may provide comprehensive malfunction detection capabilities for artificial intelligence agents operating within distributed environment 200. Process 1000 may implement systematic evaluation mechanisms that analyze agent behaviors, performance characteristics, and operational patterns to identify potential malfunctions, security threats, or performance degradation that may require intervention. The malfunction detection methodology may operate continuously within malfunction detection subsystem 164, processing incoming agent responses and correlating behavioral data with established baseline patterns to generate accurate assessments of agent operational status. Process 1000 may enable early identification of problematic agents before malfunctions can cause system disruption or compromise distributed operations within environment 100.

The malfunction detection process may begin with systematic collection and analysis of agent communications to establish baseline behavioral patterns and identify deviations that may indicate operational problems. At 1002, malfunction interdiction system 160 may receive, from a first artificial intelligence agent of a plurality of artificial intelligence agents, a response to a request. The response reception process may involve communication subsystem 162 monitoring network 140 to capture incoming messages, data transmissions, and computational results generated by AI agent 130, AI agent 150, or AI agent 170 during task execution. Communication subsystem 162 may implement protocol analysis capabilities that parse response formats, validate message integrity, and extract relevant behavioral indicators from agent communications. For example, communication subsystem 162 may monitor HTTP response headers to extract timing information, analyze JSON payload structures to identify response patterns, and validate digital signatures to confirm agent authenticity during the response collection process. The response may be received via network interface 640 and stored in system memory 620.

The system may implement comprehensive data retrieval mechanisms that gather multiple categories of behavioral information necessary for accurate malfunction assessment and pattern recognition analysis. At 1004, malfunction interdiction system 160 may retrieve a plurality of agent parameters associated with the first artificial intelligence agent, an agent profile associated with the first artificial intelligence agent, and a plurality of sets of historical agent parameters. The plurality of agent parameters may include one or more of communication parameters, resource parameters or timing parameters. The agent profile may include one or more of a communications profile, a resource profile, or a timing profile. Data collection layer 303 within behavioral monitoring system 300 may execute (e.g., via processor 610*a*, processor 610*b*, and or processor 610*n*) the parameter retrieval process by accessing behavioral profile store 309 to obtain historical behavioral data and current operational metrics. Stream processing pipeline 306 may coordinate the data retrieval operations by querying distributed databases, accessing agent monitoring logs, and correlating temporal data streams to assemble comprehensive parameter sets. For example, data collection layer 303 may execute database queries to retrieve communication frequency statistics from the past thirty days, access system monitoring APIs to collect current memory utilization metrics, and parse log files to extract response timing patterns that characterize the agent's operational behavior.

Process 1000 may employ sophisticated machine learning analysis to evaluate whether current agent behaviors align with established operational patterns and baseline characteristics. At 1006, malfunction interdiction system 160 may input the plurality of agent parameters and the agent profile into a machine learning model (e.g., machine learning model 702 or transformer 812) to obtain a behavior parameter that indicates whether the plurality of agent parameters match the agent profile. The machine learning model may be trained, using historical communication data, historical resource data, and historical timing data associated with the first artificial intelligence agent, to recognize patterns within the plurality of agent parameters to match with corresponding patterns within the agent profile. Pattern recognition engine 312 within behavioral monitoring system 300 may execute the machine learning analysis by processing normalized parameter data through trained neural networks, decision trees, or ensemble algorithms that compare current behaviors against learned baseline patterns. Defense system core 204 may coordinate the model execution process by allocating computational resources, managing model inference pipelines, and aggregating results from multiple analytical algorithms. For example, pattern recognition engine 312 may execute a trained neural network that processes communication frequency vectors, resource utilization time series, and timing pattern matrices to generate similarity scores between current agent behavior and established baseline profiles.

The malfunction detection methodology may incorporate advanced anomaly detection capabilities that identify subtle behavioral deviations and potential security threats through ensemble machine learning analysis. At 1008, malfunction interdiction system 160 may input the plurality of agent parameters into an ensemble anomaly detection model (e.g., machine learning model 702 or transformer 812) to obtain an anomaly parameter that indicates whether the plurality of agent parameters indicate an anomaly with the response. The ensemble anomaly detection model may be trained to identify anomalies between the plurality of agent parameters and timeseries data associated with the historical agent parameters. Anomaly detection network 400 may execute the ensemble analysis by processing agent parameters through isolation forest module 404, autoencoder module 406, LSTM module 408, graph neural network 410, support vector machine 412, and transformer module 414 operating in parallel to generate comprehensive anomaly assessments. Input feature module 402 may prepare the parameter data through normalization procedures, dimensionality reduction techniques, and feature engineering processes that optimize the data for analysis by multiple machine learning algorithms. For example, anomaly detection network 400 may execute isolation forest algorithms to identify outliers in communication patterns, process temporal sequences through LSTM networks to detect timing anomalies, and analyze interaction graphs through graph neural networks to identify unusual collaboration behaviors.

Process 1000 may implement comprehensive decision-making mechanisms that correlate multiple analytical results to generate accurate malfunction assessments and determine appropriate response actions. At 1010, malfunction interdiction system 160 may determine (e.g., via processor 610*a*, 610*b*, and/or 610*n*) based on the behavior parameter and the anomaly parameter whether the first artificial intelligence agent is malfunctioning. The determination process may involve malfunction detection subsystem 164 analyzing the quantitative outputs from both the machine learning model and the ensemble anomaly detection model to identify agents exhibiting significant deviations from normal operational patterns. Defense system core 204 may implement correlation algorithms that combine behavior parameters with anomaly parameters using weighted scoring mechanisms, threshold comparisons, and confidence interval analysis to generate comprehensive malfunction assessments. The decision-making process may account for temporal variations, operational context, and historical performance patterns to minimize false positive detections while maintaining sensitivity to genuine security threats. For example, malfunction detection subsystem 164 may execute correlation algorithms that combine behavior similarity scores with anomaly detection confidence levels, apply dynamic thresholds based on operational context, and generate malfunction probability assessments that account for agent reputation scores and recent performance history.

The malfunction detection process may conclude with automated response mechanisms that ensure system continuity while addressing identified security threats or operational problems. At 1012, malfunction interdiction system 160 may transmit (e.g., via network interface 640) the request to a second artificial intelligence agent based on determining that the first artificial intelligence agent is malfunctioning. The request redirection process may involve malfunction response subsystem 166 selecting alternative agents from agent pool 202 based on capability matching, availability assessment, and reputation scoring to ensure continued task processing despite the detected malfunction. Communication subsystem 162 may coordinate the request transmission by establishing secure communication channels with the selected alternative agent, formatting request data according to the target agent's specifications, and monitoring the response generation process to ensure successful task completion. The system may maintain detailed audit logs of all malfunction detection events and response actions to support forensic analysis and continuous improvement of detection algorithms. For example, malfunction response subsystem 166 may execute agent selection algorithms that identify AI agent 150 or AI agent 170 as suitable alternatives based on computational capabilities, current workload, and historical performance metrics, then coordinate secure request transmission through network 140 while logging all detection and response activities for subsequent analysis.

Figure 11:
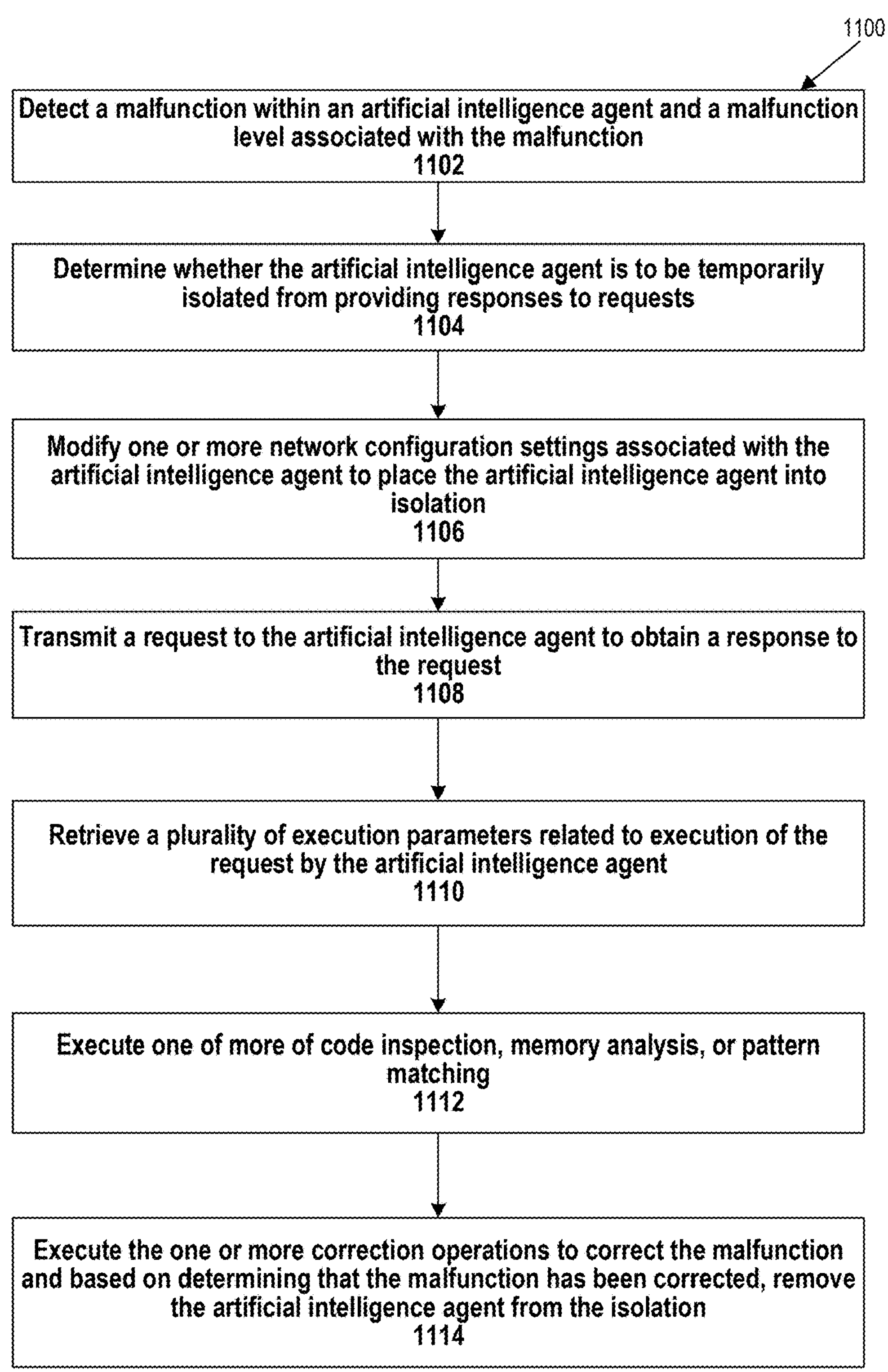
FIG. 11 is a flowchart of operations for quarantining malfunctioning AI agents, in accordance with one or more embodiments of this disclosure.

Referring to FIG. 11, a process 1100 may provide comprehensive quarantine capabilities for managing malfunctioning artificial intelligence agents within distributed environment 200. Process 1100 may implement systematic containment and remediation procedures that enable malfunction interdiction system 160 to safely isolate compromised agents while attempting corrective measures to restore normal operational functionality. The quarantine methodology may operate through quarantine analysis system 500 and sandbox environment 502 to provide controlled environments where suspicious agents can be analyzed and potentially repaired without posing risks to the broader distributed system. Process 1100 may enable graduated response mechanisms that balance security requirements with operational continuity by implementing detection, isolation, analysis, and correction procedures that collectively address agent malfunctions through systematic intervention strategies.

The detection procedure may initiate the quarantine process by identifying agents exhibiting behavioral anomalies or security violations that indicate potential compromise or operational degradation. At 1102, malfunction interdiction system 160 detects (e.g., via processors 610*a*, 610*b* and/or 610*n*), using a plurality of machine learning models, a malfunction within an artificial intelligence agent and a malfunction level associated with the malfunction. The detection process may employ "behavioral deviation analysis" and "threat severity assessment" terminology to characterize the nature and intensity of identified malfunctions through quantitative scoring mechanisms. Anomaly detection network 400 may execute (e.g., via processors 610*a*, 610*b* and/or 610*n*) the detection procedure by processing agent behavioral data through isolation forest module 404, autoencoder module 406, LSTM module 408, graph neural network 410, support vector machine 412, and transformer module 414 to generate comprehensive malfunction assessments. The detection procedure may contribute to safe containment by providing early identification of problematic agents before malfunctions can propagate to other system components or compromise distributed operations within environment 100.

The isolation determination procedure may evaluate detected malfunctions to determine appropriate containment strategies based on threat severity and operational context. At 1104, malfunction interdiction system 160 determines (e.g., via processors 610*a*, 610*b* and/or 610*n*), based on the malfunction level associated with the artificial intelligence agent, whether the artificial intelligence agent is to be temporarily isolated from providing responses to requests. The isolation determination process may employ "risk stratification" and "containment threshold analysis" terminology to classify agents according to their potential impact on system security and operational stability. Defense system core 204 may coordinate the isolation determination by analyzing malfunction scores against predetermined thresholds, evaluating operational context factors, and selecting appropriate containment measures from graduated response options. The isolation determination procedure may contribute to safe containment by ensuring that containment measures are proportional to detected threats while maintaining operational capabilities for agents that pose minimal security risks.

The network isolation procedure may implement secure containment measures that prevent potentially compromised agents from accessing production systems while maintaining connectivity to analysis infrastructure. At 1106, malfunction interdiction system 160 modifies (e.g., via processors 610*a*, 610*b* and/or 610*n*) one or more network configuration settings associated with the artificial intelligence agent to place the artificial intelligence agent into isolation resulting in blocking the artificial intelligence agent from communicating with network devices while allowing the artificial intelligence agent to communicate with malfunction monitoring devices. The network isolation process may employ "selective network segmentation" and "controlled communication channels" terminology to describe the creation of secure isolation environments that prevent lateral movement while enabling forensic analysis. Quarantine sandbox 206 may execute the network isolation procedure by implementing firewall rule modifications, routing table updates, and access control list adjustments that create secure communication pathways between isolated agents and monitoring systems. The network isolation procedure may contribute to safe containment by preventing compromised agents from accessing sensitive data or communicating with other system components while preserving the ability to monitor and analyze agent behaviors within controlled environments.

The behavioral analysis procedure may systematically evaluate isolated agents through controlled testing scenarios that reveal operational characteristics and potential security threats. At 1108, malfunction interdiction system 160 transmits (e.g., via network interface 640) a request to the artificial intelligence agent to obtain a response to the request while the agent operates within the controlled isolation environment. The behavioral analysis process may employ "controlled stimulus testing" and "response pattern evaluation" terminology to describe systematic evaluation of agent behaviors under various operational conditions. Sandbox environment 502 may coordinate the behavioral analysis procedure by providing simulated interaction environments, honeypot data sources, and controlled testing scenarios that enable comprehensive evaluation of agent operational characteristics. The behavioral analysis procedure may contribute to safe containment and repair assessment by revealing the nature and extent of agent malfunctions while providing insights into potential remediation strategies that may restore normal operational functionality.

The forensic data collection procedure may gather comprehensive operational information that enables detailed analysis of agent behaviors and identification of malfunction root causes. At 1110, malfunction interdiction system 160 retrieves (e.g., via processors 610*a*, 610*b* and/or 610*n*) a plurality of execution parameters related to execution of the request by the artificial intelligence agent. The plurality of execution parameters may include one or more of packet capture data, application programming interface call data, or execution trace data. The forensic data collection process may employ "comprehensive telemetry capture" and "multi-dimensional behavioral profiling" terminology to describe the systematic gathering of operational evidence from isolated agents. Data collection layer 303 may execute the forensic data collection procedure by implementing network monitoring tools, API logging mechanisms, and process tracing utilities that capture detailed information about agent internal processing, communication patterns, and resource utilization behaviors. The forensic data collection procedure may contribute to repair assessment by providing detailed operational evidence that enables identification of specific malfunction causes and potential correction strategies.

The diagnostic analysis procedure may process collected execution parameters to identify specific malfunction causes and determine appropriate correction strategies for restoring agent functionality. At 1112, malfunction interdiction system 160 executes (e.g., via processors 610*a*, 610*b* and/or 610*n*), using the plurality of execution parameters, one or more of code inspection, memory analysis, or pattern matching to determine whether the malfunction is correctable and to obtain one or more correction operations in relation to the artificial intelligence agent to correct the malfunction. The diagnostic analysis process may employ "root cause identification" and "remediation strategy formulation" terminology to describe systematic evaluation of malfunction evidence and development of targeted correction procedures. Quarantine analysis system 500 may coordinate the diagnostic analysis procedure by implementing static code analysis tools, dynamic memory analysis utilities, and signature-based detection algorithms that identify malicious modifications, corrupted algorithms, or security vulnerabilities within isolated agents. The diagnostic analysis procedure may contribute to agent repair by identifying specific malfunction causes and formulating targeted correction strategies that address underlying operational problems while preserving legitimate agent functionality.

The correction implementation procedure may execute remediation strategies designed to restore normal agent functionality while validating the effectiveness of applied corrections. At 1114, malfunction interdiction system 160 executes (e.g., via processors 610*a*, 610*b* and/or 610*n*) the one or more correction operations to correct the malfunction and, based on determining that the malfunction has been corrected, remove the artificial intelligence agent from the isolation thereby unblocking the artificial intelligence agent from communicating with network devices. The correction implementation process may employ "targeted remediation deployment" and "functional validation testing" terminology to describe systematic application of correction procedures and verification of restored operational capabilities. Agent termination system 900 may support the correction implementation procedure by providing backup restoration capabilities, model retraining mechanisms, and validation testing frameworks that enable comprehensive agent rehabilitation. The correction implementation procedure may contribute to agent repair by systematically applying identified correction strategies, validating restored functionality through comprehensive testing, and safely reintegrating rehabilitated agents into distributed environment 200 while maintaining continuous monitoring to ensure sustained operational stability.

Figure 12:
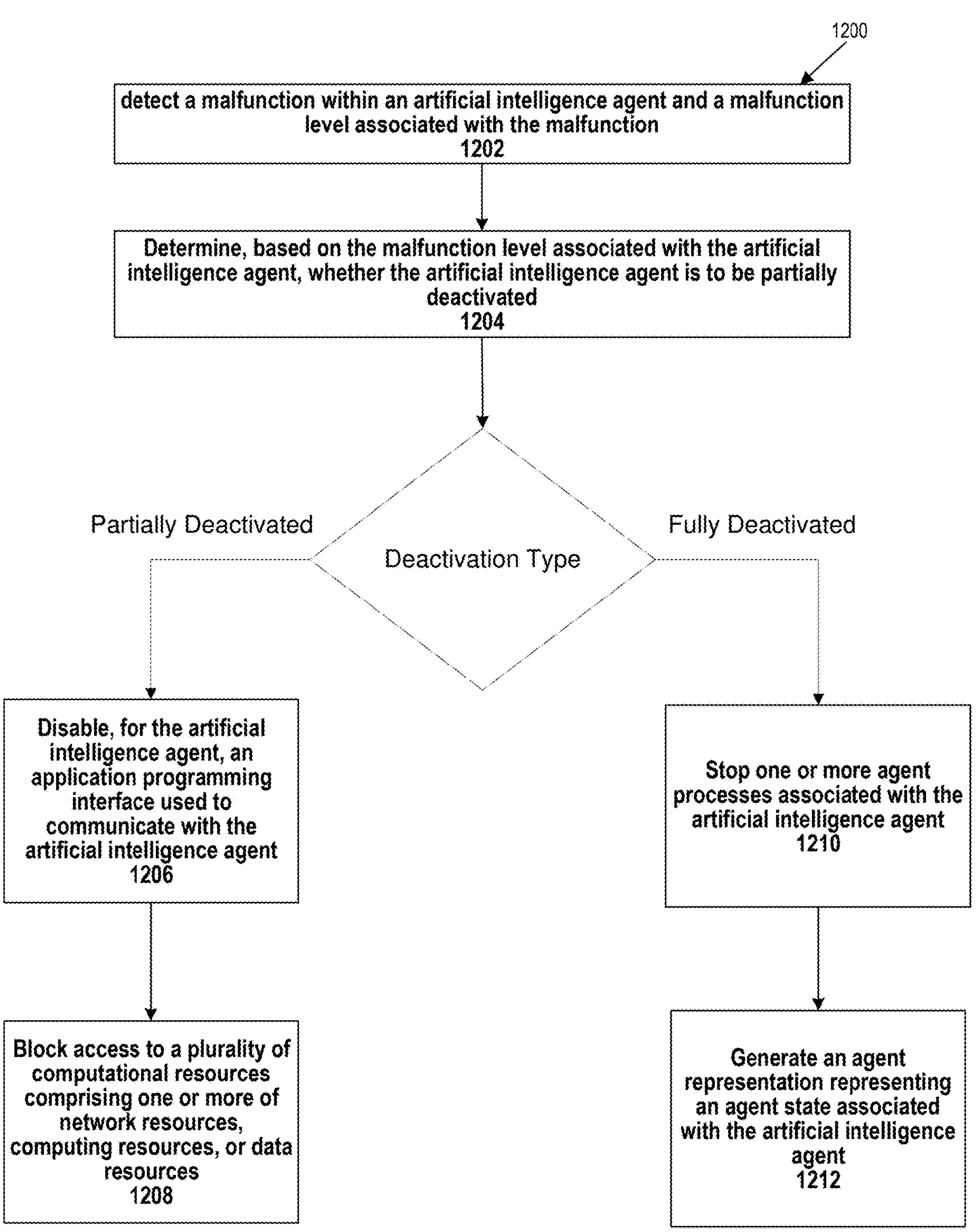
FIG. 12 is a flowchart of operations for deactivating malfunctioning AI agents, in accordance with one or more embodiments of this disclosure.

Referring to FIG. 12, a process 1200 may provide comprehensive deactivation capabilities for managing malfunctioning artificial intelligence agents through graduated response mechanisms that enable proportional containment measures based on threat severity assessments. Process 1200 may implement systematic evaluation and response procedures that analyze detected malfunctions to determine appropriate deactivation levels ranging from partial operational restrictions to complete agent termination. The deactivation methodology may operate through agent termination system 900 and kill switch controller 902 to provide automated decision-making capabilities that can respond to security threats while maintaining operational continuity for legitimate agents within distributed environment 200. Process 1200 may enable malfunction interdiction system 160 to implement targeted interventions that address specific security risks without unnecessarily disrupting system operations or compromising the functionality of non-compromised agents operating within environment 100.

The malfunction detection procedure may initiate the deactivation process by identifying agents exhibiting behavioral anomalies, security violations, or operational degradation that may indicate compromise or system threats. At 1202, malfunction interdiction system 160 detects (e.g., using processor 610*a*, 610*b*, and/or 610*n*) a malfunction within an artificial intelligence agent and a malfunction level associated with the malfunction based on one or more of: a resource utilization, data exfiltration probability, or reputation degradation rate associated with the artificial intelligence agent. The malfunction detection process may analyze multiple behavioral indicators including communication patterns, resource consumption metrics, and performance degradation trends to generate comprehensive threat assessments that inform appropriate deactivation responses. Anomaly detection network 400 may contribute to the detection procedure by processing agent behavioral data through isolation forest module 404, autoencoder module 406, LSTM module 408, graph neural network 410, support vector machine 412, and transformer module 414 to identify deviations from established operational baselines. For example, malfunction interdiction system 160 may execute threat scoring algorithms that combine resource abuse indicators with data exfiltration risk assessments and reputation degradation measurements to calculate comprehensive malfunction scores that quantify the severity and nature of detected security threats.

The deactivation level determination procedure may evaluate detected malfunctions against established thresholds to select appropriate containment strategies that balance security requirements with operational continuity. At 1204, malfunction interdiction system 160 determines (e.g., using processor 610*a*, 610*b*, and/or 610*n*), based on the malfunction level associated with the artificial intelligence agent, whether the artificial intelligence agent is to be partially deactivated. The determination process may employ threat severity analysis mechanisms that compare calculated malfunction scores against predetermined threshold values to classify agents according to their potential impact on system security and operational stability. Kill switch controller 902 may coordinate the deactivation level determination by implementing decision algorithms that evaluate threat scores, operational context factors, and system impact assessments to select appropriate response measures from graduated deactivation options. Defense system core 204 may support the determination procedure by providing threat intelligence data, historical performance metrics, and environmental context information that inform deactivation decisions. For example, kill switch controller 902 may execute threshold comparison algorithms that trigger partial deactivation procedures when malfunction scores exceed moderate threat levels while reserving complete termination responses for agents exhibiting severe security violations or irreparable operational compromise.

The partial deactivation procedure may implement selective operational restrictions that limit agent capabilities while preserving functionality for analysis and potential remediation purposes. At step 1206, malfunction interdiction system 160 disables (e.g., using processor 610*a*, 610*b*, and/or 610n), for the artificial intelligence agent, an application programming interface used to communicate with the artificial intelligence agent, rendering the artificial intelligence agent unable to receive requests. The API disabling process may involve communication subsystem 162 modifying network access controls, routing configurations, and protocol handlers to prevent external systems from transmitting requests to the compromised agent while maintaining internal monitoring capabilities. Malfunction response subsystem 166 may coordinate the API disabling procedure by implementing firewall rule modifications, load balancer configuration changes, and service registry updates that redirect incoming requests to alternative agents while preserving the ability to monitor the restricted agent's operational state. For example, communication subsystem 162 may execute network configuration scripts that remove the compromised agent from active service pools, update DNS routing tables to prevent request delivery, and configure monitoring interfaces that enable continued behavioral observation without exposing the agent to external interactions.

The resource access restriction procedure may implement comprehensive limitations on computational resources to prevent potentially compromised agents from causing system damage or performance degradation. At 1208, malfunction interdiction system 160 blocks (e.g., using processor 610a, 610b, and/or 610n) access to a plurality of computational resources including one or more of network resources, computing resources, or data resources. The resource blocking process may involve malfunction response subsystem 166 modifying operating system permissions, database access controls, and network firewall rules to prevent the restricted agent from accessing sensitive data sources, consuming excessive computational capacity, or communicating with unauthorized network destinations. Agent termination system 900 may support the resource restriction procedure by implementing permission management mechanisms that selectively revoke access privileges while maintaining forensic monitoring capabilities. Quarantine analysis system 500 may coordinate the resource blocking by establishing isolated execution environments that provide controlled access to simulated resources for analysis purposes. For example, malfunction response subsystem 166 may execute permission modification scripts that revoke database access credentials, implement CPU and memory usage quotas through operating system controls, and configure network access control lists that prevent unauthorized communication while maintaining connectivity to monitoring systems within sandbox environment 502.

The complete termination procedure may implement comprehensive agent shutdown mechanisms when threat levels exceed thresholds that indicate severe security risks or irreparable operational compromise. At 1210, malfunction interdiction system 160 stops (e.g., using processor 610a, 610b, and/or 610n) one or more agent processes associated with the artificial intelligence agent. The one or more agent processes may include one or more of: network processes or computing processes that define the agent's operational capabilities. The process termination procedure may involve agent termination system 900 executing operating system commands that halt agent execution threads, terminate network communication handlers, and shutdown computational processing modules to prevent further system interaction. Kill switch controller 902 may coordinate the termination procedure by implementing process management mechanisms that ensure complete shutdown of all agent-related activities while preserving system stability and operational continuity for other system components. For example, agent termination system 900 may execute process termination commands that send shutdown signals to agent runtime environments, force-kill unresponsive processes through operating system controls, and cleanup temporary files and memory allocations associated with the terminated agent to prevent resource leakage or system instability.

The agent state preservation procedure may capture comprehensive operational information before complete termination to support forensic analysis and potential recovery operations. At 1212, malfunction interdiction system 160 generates (e.g., using processor 610a, 610b, and/or 610n) an agent representation representing an agent state associated with the artificial intelligence agent. The agent representation may include an artificial intelligence state representing one or more states of one or more machine learning models associated with the artificial intelligence agent, and a resource state representing resources in use by the artificial intelligence agent. The state preservation process may involve behavioral profile store 309 capturing model parameters, training data references, configuration settings, and operational metrics that characterize the agent's computational state at the time of termination. Quarantine analysis system 500 may coordinate the state preservation procedure by implementing data serialization mechanisms that convert complex agent states into portable formats suitable for storage and subsequent analysis. For example, behavioral profile store 309 may execute state capture algorithms that serialize neural network weights and biases, document active database connections and file handles, record current memory allocations and processing queues, and generate comprehensive snapshots that enable forensic reconstruction of agent operational characteristics for security investigation and potential system recovery procedures.

The malfunction interdiction system may implement comprehensive integration mechanisms that enable seamless coordination between multiple specialized subsystems to provide unified defense capabilities against compromised artificial intelligence agents. The system integration architecture may facilitate continuous data exchange between behavioral monitoring components, anomaly detection algorithms, and response orchestration mechanisms to ensure that threat identification and containment procedures operate with minimal latency and maximum effectiveness. Data flow coordination may enable real-time correlation of behavioral indicators across multiple analytical dimensions, allowing the system to detect sophisticated attack patterns that might evade individual detection mechanisms operating in isolation. The integrated approach may provide comprehensive situational awareness that encompasses communication patterns, resource utilization metrics, decision-making behaviors, and temporal activity profiles to generate holistic assessments of agent trustworthiness and operational integrity.

The behavioral monitoring subsystem may continuously collect multi-dimensional operational data from distributed artificial intelligence agents and transmit processed behavioral indicators to the anomaly detection network through standardized data pipelines that maintain temporal correlation and contextual information. Stream processing mechanisms may aggregate communication parameters, resource utilization metrics, and timing characteristics into normalized feature vectors that enable consistent analysis across different detection algorithms. The data transmission process may employ buffering mechanisms that ensure continuous data availability while managing computational load balancing across multiple analytical components. Real-time data synchronization may enable the anomaly detection network to process current behavioral indicators against historical baseline patterns while maintaining awareness of evolving operational contexts that may influence normal behavioral ranges.

The anomaly detection network may process incoming behavioral data through ensemble machine learning algorithms that generate quantitative threat assessments and transmit anomaly scores to the response orchestration subsystem for correlation with reputation management data and cryptographic verification results. Ensemble voting mechanisms may combine outputs from isolation forest algorithms, autoencoder reconstruction analysis, temporal sequence processing, interaction pattern evaluation, boundary detection, and attention-based analysis to generate comprehensive anomaly assessments that account for multiple behavioral dimensions. The scoring aggregation process may weight individual algorithm contributions based on confidence levels, historical accuracy metrics, and environmental context factors to produce reliable threat indicators that minimize false positive rates while maintaining sensitivity to genuine security threats.

The reputation management subsystem may maintain continuous correlation with behavioral monitoring data to update agent trustworthiness scores based on recent performance indicators and historical accuracy measurements. Reputation scoring algorithms may process response accuracy information, timing performance data, and collaborative effectiveness metrics to generate dynamic trust assessments that reflect both long-term behavioral patterns and recent operational changes. The reputation correlation process may implement temporal weighting mechanisms that emphasize recent behavioral indicators while maintaining awareness of historical performance trends that may indicate gradual degradation or improvement in agent operational capabilities. Integration with the anomaly detection network may enable reputation scores to influence anomaly threshold calculations and response decision-making processes.

The cryptographic verification subsystem may operate in parallel with behavioral analysis mechanisms to provide independent validation of agent authenticity and communication integrity throughout the threat assessment process. Digital signature verification may occur simultaneously with behavioral pattern analysis to ensure that detected anomalies correspond to legitimate agent communications rather than impersonation attempts or message tampering incidents. The verification process may generate authentication status indicators that combine with behavioral anomaly scores and reputation assessments to provide comprehensive agent trustworthiness evaluations. Integration with the response orchestration subsystem may enable cryptographic verification failures to trigger immediate containment procedures regardless of behavioral analysis results.

The response orchestration subsystem may correlate inputs from behavioral monitoring, anomaly detection, reputation management, and cryptographic verification components to generate unified threat assessments that inform graduated response decisions. Decision-making algorithms may process multiple analytical inputs through weighted scoring mechanisms that account for threat severity, operational context, and potential system impact to select appropriate containment measures from available response options. The orchestration process may coordinate simultaneous execution of multiple response mechanisms, such as request redirection, network isolation, and enhanced monitoring, to ensure comprehensive threat containment while maintaining operational continuity for legitimate agents. Real-time coordination may enable dynamic adjustment of response strategies based on evolving threat conditions and the effectiveness of implemented containment measures.

The quarantine and analysis subsystem may receive isolated agents from the response orchestration system and coordinate with behavioral monitoring mechanisms to conduct detailed forensic analysis within controlled sandbox environments. Data collection coordination may enable continuous monitoring of quarantined agent behaviors while preventing access to production systems or sensitive data sources. The analysis process may correlate execution parameters, behavioral observations, and environmental responses to generate comprehensive threat intelligence that informs both immediate remediation decisions and broader system security improvements. Integration with the response orchestration subsystem may enable dynamic adjustment of quarantine conditions based on ongoing analysis results and threat evolution patterns.

The threat intelligence network may aggregate security insights from multiple system deployments to enhance detection capabilities and response effectiveness across distributed environments. Federated learning mechanisms may enable sharing of behavioral patterns, attack signatures, and remediation strategies while preserving privacy and operational confidentiality. The intelligence sharing process may update local detection algorithms with insights from broader threat landscapes, improving the accuracy and coverage of anomaly detection mechanisms. Integration with behavioral monitoring and anomaly detection subsystems may enable real-time incorporation of threat intelligence updates to enhance detection sensitivity and reduce false positive rates.

The system integration architecture may implement comprehensive audit and logging mechanisms that capture all inter-component communications, decision-making processes, and response actions to support forensic analysis and regulatory compliance requirements. Audit trail generation may correlate activities across multiple subsystems to provide complete operational histories that document threat detection timelines, response decision rationales, and containment effectiveness measurements. The logging integration may enable reconstruction of complex security incidents that span multiple system components and operational phases. Compliance reporting mechanisms may aggregate audit data from all integrated subsystems to generate comprehensive security assessments that demonstrate system effectiveness and regulatory adherence.

The adaptive learning integration may enable continuous improvement of system performance through correlation of detection accuracy, response effectiveness, and operational outcomes across all integrated subsystems. Machine learning model updates may propagate throughout the integrated architecture to ensure that behavioral baselines, anomaly detection thresholds, and response decision criteria evolve based on observed threat patterns and system performance metrics. The learning integration process may implement feedback mechanisms that enable successful threat containment strategies to influence future response decisions while unsuccessful approaches trigger algorithmic adjustments. Cross-subsystem learning may enable insights from quarantine analysis to improve behavioral monitoring sensitivity, while reputation management trends may inform anomaly detection threshold adjustments.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

A number of implementations have been described. Nevertheless, it will be understood that various modifications may be made without departing from the spirit and scope of the disclosure. Accordingly, other implementations are within the scope of the following claims.

1. An embodiment comprising: receiving, from a first artificial intelligence agent of a plurality of artificial intelligence agents, a response to a request, wherein each artificial intelligence agent of the plurality of artificial intelligence agents is associated with a corresponding computer-executable operation set configured to be autonomously executed by a corresponding artificial intelligence agent on a software application set; retrieving (1) a plurality of agent parameters associated with the first artificial intelligence agent, (2) an agent profile associated with the first artificial intelligence agent, and (3) a plurality of sets of historical agent parameters, wherein the plurality of agent parameters comprises one or more of communication parameters, resource parameters or timing parameters, and wherein the agent profile comprises one or more of a communications profile, a resource profile, or a timing profile; inputting the plurality of agent parameters and the agent profile into a machine learning model to obtain a behavior parameter that indicates whether the plurality of agent parameters match the agent profile, wherein the machine learning model is trained, using historical communication data, historical resource data, and historical timing data associated with the first artificial intelligence agent, to recognize patterns within the plurality of agent parameters to match with corresponding patterns within the agent profile; inputting the plurality of agent parameters into an ensemble anomaly detection model to obtain an anomaly parameter whether the plurality of agent parameters indicate an anomaly with the response, wherein the ensemble anomaly detection model is trained to identify anomalies between the plurality of agent parameters and timeseries data associated with the historical agent parameters; determining based on the behavior parameter and the anomaly parameter whether the first artificial intelligence agent is malfunctioning; and based on determining that the first artificial intelligence agent is malfunctioning, transmitting the request to a second artificial intelligence agent.

2. The method of any preceding embodiments, further comprising: retrieving, using a first agent identifier associated with the first artificial intelligence agent, reputation data associated with the first artificial intelligence agent, wherein the reputation data comprises response accuracy information for a plurality of responses received from the first artificial intelligence agent; and inputting the reputation data into a reputation machine learning model to obtain a reputation parameter associated with the first artificial intelligence agent, wherein the reputation machine learning model has been trained to output a corresponding reputation parameter based on a degree of accuracy of past responses and recency of the past responses, wherein the reputation parameter is used to determine whether the first artificial intelligence agent is malfunctioning.

3. The method of any preceding embodiments, further comprising: transmitting the request to the first artificial intelligence agent, wherein the request comprises a task and a parameter query, wherein the parameter query requests the first artificial intelligence agent to respond with one or more estimates for communication load, resource load, and action sequence load for performing the task; and in response to determining that the communication load, the resource load, or the action sequence load meets a threshold, transmit a cancel request to the first artificial intelligence agent.

4. The method of any preceding embodiments, wherein the ensemble anomaly detection model: generates, using an isolation forest model, outlier data that indicates whether one or more outliers are present in the timeseries data associated with the historical agent parameters of the first artificial intelligence agent, wherein the isolation forest model is trained to detect outliers within datasets; generates, using an autoencoder model, reconstruction error data, wherein the autoencoder model is trained to minimize error values for the historical agent parameters of the first artificial intelligence agent; generates, using a long term short term memory network, temporal anomaly data indicating whether one or more temporal anomalies exist within the timeseries data associated with the historical agent parameters of the first artificial intelligence agent; generates, using a graph neural net, interaction anomaly data indicating whether one or more anomalies exist in interaction patterns between the first artificial intelligence agent and other entities; generates, using a support vector machine model, boundary data indicating whether one or more boundaries exist with the timeseries data associated with the historical agent parameters of the first artificial intelligence agent, wherein the one or more boundaries indicate one or more anomalies within the timeseries data; generates, using a transformer model, attention data indicating whether one or more attention anomalies exist within the historical agent parameters of the first artificial intelligence agent, wherein the one or more attention anomalies indicate disproportionate focus on a portion of the historical agent parameters of the first artificial intelligence agent; and determines, using the outlier data, the reconstruction error data, the temporal anomaly data, the interaction anomaly data, the boundary data, and the attention data, that one or more anomalies associated with the first artificial intelligence agent.

5. The method of any preceding embodiments, further comprising: extracting a cryptographic signature from the response received from the first artificial intelligence agent, wherein the cryptographic signature has been generated using a private key associated with the first artificial intelligence agent; retrieving a public key associated with the first artificial intelligence agent; determining, using the public key associated with the first artificial intelligence agent, whether the cryptographic signature is valid; and based on determining that the cryptographic signature is invalid, removing the response and transmitting the request to the second artificial intelligence agent.

6. The method of any preceding embodiments, further comprising: periodically receiving, from the first artificial intelligence agent, a corresponding set of agent parameters comprising corresponding communication parameters, corresponding resource parameters, corresponding decision parameters timing parameters and corresponding application programming interface parameters for the first artificial intelligence agent; match a first set of agent parameters to processing of the request; and generate the plurality of agent parameters based on the first set of agent parameters.

7. The method of any preceding embodiments, further comprising: generating, using historical message frequency data, historical payload size data, and historical response destination data associated with the first artificial intelligence agent, a communication profile for the first artificial intelligence agent, wherein the communication profile is generated by aggregating the historical message frequency data, the historical payload size data, and the historical response destination data; and generating, using historical processor usage data, historical memory pattern data, and historical input-output data, the resource profile for the first artificial intelligence agent, wherein the resource profile is generated by aggregating the historical processor usage data, the historical memory pattern data, and the historical input-output data.

8. The method of any preceding embodiments, further comprising: generating, for the first artificial intelligence agent using vote data accuracy data and timing data, a decision profile for the first artificial intelligence agent; determining, for the first artificial intelligence agent, a plurality of temporal cycles, a plurality of bursts, and a plurality of trends based on historical data generated when processing a plurality of requests; adding the plurality of temporal cycles, the plurality of bursts, and the plurality of trends into a temporal profile; and generating the agent profile by aggregating the communication profile, the resource profile, the decision profile and the temporal profile.

9. A method comprising: detecting, using a plurality of machine learning models, (1) a malfunction within an artificial intelligence agent and (2) a malfunction level associated with the malfunction, wherein the artificial intelligence agent is associated with a corresponding computer-executable operation set configured to be autonomously executed by a corresponding artificial intelligence agent on a software application set; determining, based on the malfunction level associated with the artificial intelligence agent whether the artificial intelligence agent is to be temporarily isolated from providing responses to requests; and based on determining that the malfunction level indicates that the artificial intelligence agent is to be temporarily isolated: modifying one or more network configuration settings associated with the artificial intelligence agent to place the artificial intelligence agent into isolation resulting in blocking the artificial intelligence agent from communicating with network devices while allowing the artificial intelligence agent to communicate with malfunction monitoring devices; transmitting a request to the artificial intelligence agent to obtain a response to the request; retrieving a plurality of execution parameters related to execution of the request by the artificial intelligence agent wherein the plurality of execution parameters comprises one or more of packet capture data, application programming interface call data, or execution trace data; executing, using the plurality of execution parameters, one or more of code inspection, memory analysis, or pattern matching to determine whether the malfunction is correctable and to obtain one or more correction operations in relation to the artificial intelligence agent to correct the malfunction; and executing the one or more correction operations to correct the malfunction and based on determining that the malfunction has been corrected, remove the artificial intelligence agent from the isolation thereby unblocking the artificial intelligence agent from communicating with the network devices.

10. The method of any preceding embodiments, wherein detecting the malfunction level associated with the malfunction further comprises: determining an anomaly score associated with a plurality of responses generated by the artificial intelligence agent, a malicious pattern associated with the artificial intelligence agent; and detecting data exfiltration associated with the artificial intelligence agent and an attack signature.

11. The method of any preceding embodiments, further comprising: prior to transmitting the request to the artificial intelligence agent, determining, based on agent capabilities of the artificial intelligence agent, that the artificial intelligence agent is capable of completing the request; transmitting the request to a second artificial intelligence agent to obtain an additional response to the request; inputting the response and the additional response into a similarity machine learning model to obtain a degree of similarity between the response and the additional response; and based on determining that the degree of similarity matches a threshold, determining, using the degree of similarity, whether to remove the artificial intelligence agent from the isolation.

12. The method of any preceding embodiments, further comprising: periodically identifying, based on agent capabilities of the artificial intelligence agent, a plurality of task requests for the artificial intelligence agent, wherein the plurality of task requests has been sent to one or more other artificial intelligence agents, wherein the one or more other artificial intelligence agents have sent a plurality of responses to the plurality of task requests; transmitting the plurality of task requests to the artificial intelligence agent to obtain a second plurality of responses to the plurality of task requests; determining, based on comparing using a similarity machine learning model, whether a similarity metric between corresponding responses within the plurality of responses and the second plurality of responses meets a threshold; and based on determining that the similarity metric between the corresponding responses within the plurality of responses and the second plurality of responses does not meet the threshold, generating and transmit an alert to an operator indicating that the artificial intelligence agent is still malfunctioning.

13. The method of any preceding embodiments, further comprising: based on determining that the malfunction level indicates that the artificial intelligence agent is to be limited: generating a set of parameters for the artificial intelligence agent comprising a quota parameter that limits the response of the artificial intelligence agent, a throttled communication parameter that limits a volume of data allowed to be sent by the artificial intelligence agent, a resource limit parameter that limits an amount of computing resources the artificial intelligence agent is allowed to use, and a priority parameter that reduces a priority associated with the artificial intelligence agent; and transmitting a command to the artificial intelligence agent to implement the set of parameters.

14. The method of any preceding embodiments, further comprising: while the artificial intelligence agent is isolated, periodically communicating to the artificial intelligence agent a corresponding inaccurate date and time, thereby generating an accelerated timeline for the artificial intelligence agent; periodically transmitting task requests to the artificial intelligence agent, wherein the artificial intelligence agent responds to the task requests using the accelerated timeline; determining whether a response pattern changes over time based on the accelerated timeline; and based on determining that the response pattern changes over time based on the accelerated timeline, generating and transmitting an alert to an operator.
15. The method of any preceding embodiments, wherein executing the one or more correction operations to correct the malfunction further comprises: transmitting one or more training datasets to the artificial intelligence agent to retrain one or more machine learning models associated with the artificial intelligence agent; resending one or more tasks to the artificial intelligence agent for testing; and based on a plurality of responses from the artificial intelligence agent, determining whether the malfunction has been corrected.
16. A method comprising: detecting (1) a malfunction within an artificial intelligence agent and (2) a malfunction level associated with the malfunction based on one or more of: a resource utilization, data exfiltration probability, or reputation degradation rate associated with the artificial intelligence agent, wherein the artificial intelligence agent is associated with a corresponding computer-executable operation set configured to be autonomously executed by a corresponding artificial intelligence agent on a software application set; determining, based on the malfunction level associated with the artificial intelligence agent, whether the artificial intelligence agent is to be partially deactivated; based on determining that the artificial intelligence agent is to be partially deactivated: disabling, for the artificial intelligence agent, an application programming interface used to communicate with the artificial intelligence agent, rendering the artificial intelligence agent unable to receive requests; and blocking access to a plurality of computational resources comprising one or more of network resources, computing resources, or data resources; and based on determining that the artificial intelligence agent is to be fully deactivated: stopping one or more agent processes associated with the artificial intelligence agent, wherein the one or more agent processes comprise one or more of: network processes or computing processes; and generating an agent representation representing an agent state associated with the artificial intelligence agent, wherein the agent representation comprises (1) an artificial intelligence state representing one or more states of one or more machine learning models associated with the artificial intelligence agent, and (2) a resource state representing resources in use by the artificial intelligence agent.
17. The method of any preceding embodiments, wherein detecting the malfunction level associated with the malfunction further comprises: determining an anomaly score associated with a plurality of responses generated by the artificial intelligence agent or a malicious pattern associated with the artificial intelligence agent; and detecting data exfiltration associated with the artificial intelligence agent and an attack signature.
18. The method of any preceding embodiments, wherein disabling the application programming interface used to communicate with the artificial intelligence agent further comprises: based on determining that the artificial intelligence agent is to be partially deactivated, identifying one or more operating system processes associated with the artificial intelligence agent; and modifying permissions associated with the one or more operating system processes associated with the artificial intelligence agent to prevent the one or more operating system processes from using required network resources.
19. The method of any preceding embodiments, further comprising: based on determining that the artificial intelligence agent is to be partially deactivated, generating a prompt for the artificial intelligence agent that forces the artificial intelligence agent to prevent participation of the artificial intelligence agent in collective decision making with other artificial intelligence agents; and executing the prompt using administrator access.
20. The method of any preceding embodiments, wherein blocking access to the data resources further comprises: identifying one or more retrieval-augmented generation data sources used by the artificial intelligence agent; and modifying permissions on the one or more retrieval-augmented generation data sources to block the artificial intelligence agent from accessing the one or more retrieval-augmented generation data sources.
21. The method of any preceding embodiments, further comprising: based on determining that the artificial intelligence agent is to be fully deactivated, revoking one or more cryptographic keys and one or more authentication tokens associated with the artificial intelligence agent.
22. The method of any preceding embodiments, wherein determining whether the artificial intelligence agent is to be partially deactivated further comprises: receiving a plurality of deactivation messages from a plurality of security nodes, wherein each message of the plurality of deactivation messages comprises a deactivation signal and a deactivation type; and determining whether the artificial intelligence agent is to be partially deactivated using the plurality of deactivation messages aggregated using a computing operation.
23. The method of any preceding embodiments, further comprising: identifying a date when the artificial intelligence agent was not malfunctioning; retrieving, from a backup system, backup instances of the one or more machine learning models associated with the artificial intelligence agent; and replacing current machine learning models associated with the artificial intelligence agent with the one or more machine learning models from the backup system.

The invention claimed is:

1. One or more non-transitory computer-readable storage media having instructions stored thereon, the instructions causing one or more processors to perform operations comprising:

receiving, from a first artificial intelligence agent of a plurality of artificial intelligence agents, a response to a request, wherein each artificial intelligence agent of the plurality of artificial intelligence agents is associated with a corresponding computer-executable operation set configured to be autonomously executed by a corresponding artificial intelligence agent on a software application set;

retrieving (1) a plurality of agent parameters associated with the first artificial intelligence agent, (2) an agent profile associated with the first artificial intelligence agent, and (3) a plurality of sets of historical agent parameters, wherein the plurality of agent parameters comprises one or more of communication parameters, resource parameters or timing parameters, and wherein the agent profile comprises one or more of a communications profile, a resource profile, or a timing profile;

inputting the plurality of agent parameters and the agent profile into a machine learning model to obtain a behavior parameter that indicates whether the plurality of agent parameters match the agent profile, wherein the machine learning model is trained, using historical communication data, historical resource data, and historical timing data associated with the first artificial intelligence agent, to recognize patterns within the plurality of agent parameters to match with corresponding patterns within the agent profile;

inputting the plurality of agent parameters into an ensemble anomaly detection model to obtain an anomaly parameter whether the plurality of agent parameters indicate an anomaly with the response, wherein the ensemble anomaly detection model is trained to identify anomalies between the plurality of agent parameters and timeseries data associated with the plurality of sets of historical agent parameters;

determining based on the behavior parameter and the anomaly parameter whether the first artificial intelligence agent is malfunctioning; and based on determining that the first artificial intelligence agent is malfunctioning, transmitting the request to a second artificial intelligence agent.

2. The one or more non-transitory computer-readable storage media of claim 1, wherein the instructions further cause the one or more processors to perform operations comprising:

retrieving, using a first agent identifier associated with the first artificial intelligence agent, reputation data associated with the first artificial intelligence agent, wherein the reputation data comprises response accuracy information for a plurality of responses received from the first artificial intelligence agent; and inputting the reputation data into a reputation machine learning model to obtain a reputation parameter associated with the first artificial intelligence agent, wherein the reputation machine learning model has been trained to output a corresponding reputation parameter based on degree of accuracy of past responses and recency of the past responses, and wherein the reputation parameter is used to determine whether the first artificial intelligence agent is malfunctioning.

3. The one or more non-transitory computer-readable storage media of claim 2, wherein the instructions further cause the one or more processors to perform operations comprising:

transmitting the request to the first artificial intelligence agent, wherein the request comprises a task and a parameter query, and wherein the parameter query requests the first artificial intelligence agent to respond with one or more estimates for communication load, resource load, and action sequence load for performing the task; and in response to determining that the communication load, the resource load, or the action sequence load meets a threshold, transmit a cancel request to the first artificial intelligence agent.

4. The one or more non-transitory computer-readable storage media of claim 1, wherein the ensemble anomaly detection model:

generates, using an isolation forest model, outlier data that indicates whether one or more outliers are present in the timeseries data associated with the plurality of sets of historical agent parameters of the first artificial intelligence agent, wherein the isolation forest model is trained to detect outliers within datasets;

generates, using an autoencoder model, reconstruction error data, wherein the autoencoder model is trained to minimize error values for the historical agent parameters of the first artificial intelligence agent;

generates, using a long term short term memory network, temporal anomaly data indicating whether one or more temporal anomalies exist within the timeseries data associated with the plurality of sets of historical agent parameters of the first artificial intelligence agent;

generates, using a graph neural net, interaction anomaly data indicating whether one or one or more anomalies exist in interaction patterns between the first artificial intelligence agent and other entities;

generates, using a support vector machine model, boundary data indicating whether one or more boundaries exist with the timeseries data associated with the plurality of sets of historical agent parameters of the first artificial intelligence agent, wherein the one or more boundaries indicate one or more anomalies within the timeseries data;

generates, using a transformer model, attention data indicating whether one or more attention anomalies exist within the historical agent parameters of the first artificial intelligence agent, wherein the one or more attention anomalies indicate disproportionate focus on a portion of the historical agent parameters of the first artificial intelligence agent; and determines, using the outlier data, the reconstruction error data, the temporal anomaly data, the interaction anomaly data, the boundary data, and the attention data, that one or more anomalies associated with the first artificial intelligence agent.

5. The one or more non-transitory computer-readable storage media of claim 1, wherein the instructions further cause the one or more processors to perform operations comprising:

extracting a cryptographic signature from the response received from the first artificial intelligence agent, wherein the cryptographic signature has been generated using a private key associated with the first artificial intelligence agent;

retrieving a public key associated with the first artificial intelligence agent;

determining, using the public key associated with the first artificial intelligence agent, whether the cryptographic signature is valid; and based on determining that the cryptographic signature is invalid, removing the response and transmitting the request to the second artificial intelligence agent.

6. The one or more non-transitory computer-readable storage media of claim 1, wherein the instructions further cause the one or more processors to perform operations comprising:

periodically receiving, from the first artificial intelligence agent, a corresponding set of agent parameters comprising corresponding communication parameters, corresponding resource parameters, corresponding decision parameters timing parameters and corresponding application programming interface parameters for the first artificial intelligence agent;

match a first set of agent parameters to processing of the request; and generate the plurality of agent parameters based on the first set of agent parameters.

7. The one or more non-transitory computer-readable storage media of claim 1, wherein the instructions further cause the one or more processors to perform operations comprising:

generating, using historical message frequency data, historical payload size data, and historical response destination data associated with the first artificial intelligence agent, a communication profile for the first artificial intelligence agent, wherein the communication profile is generated by aggregating the historical message frequency data, the historical payload size data, and the historical response destination data; and generating, using historical processor usage data, historical memory pattern data, and historical input-output data, the resource profile for the first artificial intelligence agent, wherein the resource profile is generated by aggregating the historical processor usage data, the historical memory pattern data, and the historical input-output data.

8. The one or more non-transitory computer-readable storage media of claim 7, wherein the instructions further cause the one or more processors to perform operations comprising:

generating, for the first artificial intelligence agent using vote data accuracy data and timing data, a decision profile for the first artificial intelligence agent;

determining, for the first artificial intelligence agent, a plurality of temporal cycles, a plurality of bursts, and a plurality of trends based on historical data generated when processing a plurality of requests;

adding the plurality of temporal cycles, the plurality of bursts, and the plurality of trends into a temporal profile; and generating the agent profile by aggregating the communication profile, the resource profile, the decision profile and the temporal profile.

9. A method for detecting malfunctions in artificial intelligence agents, the method comprising:

receiving, from a first artificial intelligence agent of a plurality of artificial intelligence agents, a response to a request, wherein each artificial intelligence agent of the plurality of artificial intelligence agents is associated with a corresponding computer-executable operation set configured to be autonomously executed by a corresponding artificial intelligence agent on a software application set;

retrieving (1) a plurality of agent parameters associated with the first artificial intelligence agent, (2) an agent profile associated with the first artificial intelligence agent, and (3) a plurality of sets of historical agent parameters, wherein the plurality of agent parameters comprises one or more of communication parameters, resource parameters or timing parameters, and wherein the agent profile comprises one or more of a communications profile, a resource profile, or a timing profile;

inputting the plurality of agent parameters and the agent profile into a machine learning model to obtain a behavior parameter that indicates whether the plurality of agent parameters match the agent profile, wherein the machine learning model is trained, using historical communication data, historical resource data, and historical timing data associated with the first artificial intelligence agent, to recognize patterns within the plurality of agent parameters to match with corresponding patterns within the agent profile;

inputting the plurality of agent parameters into an ensemble anomaly detection model to obtain an anomaly parameter whether the plurality of agent parameters indicate an anomaly with the response, wherein the ensemble anomaly detection model is trained to identify anomalies between the plurality of agent parameters and timeseries data associated with the plurality of sets of historical agent parameters;

determining based on the behavior parameter and the anomaly parameter whether the first artificial intelligence agent is malfunctioning; and based on determining that the first artificial intelligence agent is malfunctioning, transmitting the request to a second artificial intelligence agent.

10. The method of claim 9, further comprising:

retrieving, using a first agent identifier associated with the first artificial intelligence agent, reputation data associated with the first artificial intelligence agent, wherein the reputation data comprises response accuracy information for a plurality of responses received from the first artificial intelligence agent; and inputting the reputation data into a reputation machine learning model to obtain a reputation parameter associated with the first artificial intelligence agent, wherein the reputation machine learning model has been trained to output a corresponding reputation parameter based on degree of accuracy of past responses and recency of the past responses, and wherein the reputation parameter is used to determine whether the first artificial intelligence agent is malfunctioning.

11. The method of claim 10, further comprising:

transmitting the request to the first artificial intelligence agent, wherein the request comprises a task and a parameter query, and wherein the parameter query requests the first artificial intelligence agent to respond with one or more estimates for communication load, resource load, and action sequence load for performing the task; and in response to determining that the communication load, the resource load, or the action sequence load meets a threshold, transmit a cancel request to the first artificial intelligence agent.

12. The method of claim 9, wherein the ensemble anomaly detection model:

generates, using an isolation forest model, outlier data that indicates whether one or more outliers are present in the timeseries data associated with the plurality of sets of historical agent parameters of the first artificial intelligence agent, wherein the isolation forest model is trained to detect outliers within datasets;

generates, using an autoencoder model, reconstruction error data, wherein the autoencoder model is trained to minimize error values for the historical agent parameters of the first artificial intelligence agent;

generates, using a long term short term memory network, temporal anomaly data indicating whether one or more temporal anomalies exist within the timeseries data associated with the plurality of sets of historical agent parameters of the first artificial intelligence agent;

generates, using a graph neural net, interaction anomaly data indicating whether one or one or more anomalies exist in interaction patterns between the first artificial intelligence agent and other entities;

generates, using a support vector machine model, boundary data indicating whether one or more boundaries exist with the timeseries data associated with the plurality of sets of historical agent parameters of the first artificial intelligence agent, wherein the one or more boundaries indicate one or more anomalies within the timeseries data;

generates, using a transformer model, attention data indicating whether one or more attention anomalies exist within the historical agent parameters of the first artificial intelligence agent, wherein the one or more attention anomalies indicate disproportionate focus on a portion of the historical agent parameters of the first artificial intelligence agent; and determines, using the outlier data, the reconstruction error data, the temporal anomaly data, the interaction anomaly data, the boundary data, and the attention data, that one or more anomalies associated with the first artificial intelligence agent.

13. The method of claim 9, further comprising:

extracting a cryptographic signature from the response received from the first artificial intelligence agent, wherein the cryptographic signature has been generated using a private key associated with the first artificial intelligence agent;

retrieving a public key associated with the first artificial intelligence agent;

determining, using the public key associated with the first artificial intelligence agent, whether the cryptographic signature is valid; and based on determining that the cryptographic signature is invalid, removing the response and transmit the request to the second artificial intelligence agent.

14. The method of claim 9, further comprising:

periodically receiving, from the first artificial intelligence agent, a corresponding set of agent parameters comprising corresponding communication parameters, corresponding resource parameters, corresponding decision parameters timing parameters and corresponding application programming interface parameters for the first artificial intelligence agent;

match a first set of agent parameters to processing of the request; and generate the plurality of agent parameters based on the first set of agent parameters.

15. The method of claim 9, further comprising:

generating, using historical message frequency data, historical payload size data, and historical response destination data associated with the first artificial intelligence agent, a communication profile for the first artificial intelligence agent, wherein the communication profile is generated by aggregating the historical message frequency data, the historical payload size data, and the historical response destination data; and generating, using historical processor usage data, historical memory pattern data, and historical input-output data, the resource profile for the first artificial intelligence agent, wherein the resource profile is generated by aggregating the historical processor usage data, the historical memory pattern data, and the historical input-output data.

16. The method of claim 15, further comprising:

generating, for the first artificial intelligence agent using vote data accuracy data and timing data, a decision profile for the first artificial intelligence agent;

determining, for the first artificial intelligence agent, a plurality of temporal cycles, a plurality of bursts, and a plurality of trends based on historical data generated when processing a plurality of requests;

adding the plurality of temporal cycles, the plurality of bursts, and the plurality of trends into a temporal profile; and generating the agent profile by aggregating the communication profile, the resource profile, the decision profile and the temporal profile.

17. A system for detecting malfunctions in artificial intelligence agents, the system comprising:

one or more processors; and one or more memories storing instructions, which when executed by the one or more processors cause the one or more processors to perform operations comprising:

receiving, from a first artificial intelligence agent of a plurality of artificial intelligence agents, a response to a request, wherein each artificial intelligence agent of the plurality of artificial intelligence agents is associated with a corresponding computer-executable operation set configured to be autonomously executed by a corresponding artificial intelligence agent on a software application set;

retrieving (1) a plurality of agent parameters associated with the first artificial intelligence agent, (2) an agent profile associated with the first artificial intelligence agent, and (3) a plurality of sets of historical agent parameters, wherein the plurality of agent parameters comprises one or more of communication parameters, resource parameters or timing parameters, and wherein the agent profile comprises one or more of a communications profile, a resource profile, or a timing profile;

inputting the plurality of agent parameters and the agent profile into a machine learning model to obtain a behavior parameter that indicates whether the plurality of agent parameters match the agent profile, wherein the machine learning model is trained, using historical communication data, historical resource data, and historical timing data associated with the first artificial intelligence agent, to recognize patterns within the plurality of agent parameters to match with corresponding patterns within the agent profile;

inputting the plurality of agent parameters into an ensemble anomaly detection model to obtain an anomaly parameter whether the plurality of agent parameters indicate an anomaly with the response, wherein the ensemble anomaly detection model is trained to identify anomalies between the plurality of agent parameters and timeseries data associated with the plurality of sets of historical agent parameters;

determining based on the behavior parameter and the anomaly parameter whether the first artificial intelligence agent is malfunctioning; and based on determining that the first artificial intelligence agent is malfunctioning, transmitting the request to a second artificial intelligence agent.

18. The system of claim 17, wherein the instructions further cause the one or more processors to perform operations comprising:

retrieving, using a first agent identifier associated with the first artificial intelligence agent, reputation data associated with the first artificial intelligence agent, wherein the reputation data comprises response accuracy information for a plurality of responses received from the first artificial intelligence agent; and inputting the reputation data into a reputation machine learning model to obtain a reputation parameter associated with the first artificial intelligence agent, wherein the reputation machine learning model has been trained to output a corresponding reputation parameter based on degree of accuracy of past responses and recency of the past responses, and wherein the reputation parameter is used to determine whether the first artificial intelligence agent is malfunctioning.

19. The system of claim 18, wherein the instructions further cause the one or more processors to perform operations comprising:

transmitting the request to the first artificial intelligence agent, wherein the request comprises a task and a parameter query, and wherein the parameter query requests the first artificial intelligence agent to respond with one or more estimates for communication load, resource load, and action sequence load for performing the task; and in response to determining that the communication load, the resource load, or the action sequence load meets a threshold, transmit a cancel request to the first artificial intelligence agent.

20. The system of claim 17, wherein the instructions further cause the one or more processors to perform operations comprising:

extracting a cryptographic signature from the response received from the first artificial intelligence agent, wherein the cryptographic signature has been generated using a private key associated with the first artificial intelligence agent;

retrieving a public key associated with the first artificial intelligence agent;

determining, using the public key associated with the first artificial intelligence agent, whether the cryptographic signature is valid; and based on determining that the cryptographic signature is invalid, removing the response and transmit the request to the second artificial intelligence agent.

* * * * *